US010928793B2

United States Patent
Belgera et al.

(10) Patent No.: US 10,928,793 B2
(45) Date of Patent: Feb. 23, 2021

(54) ENERGY MANAGEMENT APPARATUS, INFORMATION DEVICE MANAGEMENT APPARATUS, MANAGEMENT SYSTEM, POWER CONSUMPTION REDUCTION METHOD AND PROGRAM

(71) Applicants: Kabushiki Kaisha Toshiba, Minato-ku (JP); Toshiba Infrastructure Systems & Solutions Corporation, Kawasaki (JP)

(72) Inventors: Angela Siega Belgera, Yokohama (JP); Nobutaka Nishimura, Koganei (JP)

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 46 days.

(21) Appl. No.: 15/757,532

(22) PCT Filed: Mar. 14, 2017

(86) PCT No.: PCT/JP2017/010166
§ 371 (c)(1),
(2) Date: Mar. 5, 2018

(87) PCT Pub. No.: WO2017/203800
PCT Pub. Date: Nov. 30, 2017

(65) Prior Publication Data
US 2018/0284708 A1    Oct. 4, 2018

(30) Foreign Application Priority Data

May 25, 2016   (JP) .............................. JP2016-104507

(51) Int. Cl.
G05B 19/042   (2006.01)
G07C 9/00     (2020.01)
(Continued)

(52) U.S. Cl.
CPC ........... *G05B 19/042* (2013.01); *G05B 15/02* (2013.01); *G06F 1/32* (2013.01); *G06F 1/3231* (2013.01);
(Continued)

(58) Field of Classification Search
None
See application file for complete search history.

(56) References Cited

U.S. PATENT DOCUMENTS

2013/0085609 A1*  4/2013  Barker ................ G05B 15/02
                                                  700/276
2015/0057820 A1   2/2015  Kefayati et al.

FOREIGN PATENT DOCUMENTS

JP   2012-103757 A   5/2012
JP   2013-099141     5/2013
(Continued)

OTHER PUBLICATIONS

International Search Report dated May 23, 2017, in PCT/JP2017/010166, filed Mar. 14, 2017.
(Continued)

*Primary Examiner* — Mohammad Ali
*Assistant Examiner* — Saad M Kabir
(74) *Attorney, Agent, or Firm* — Oblon, McClelland, Maier & Neustadt, L.L.P.

(57) ABSTRACT

An energy management apparatus according to an embodiment is used in a management system including an information device management apparatus which has a first storage storing an information device table indicating a relationship between an information device identifier for identifying at least one information device and a zone identifier for each of zones and controls the information device based on the information device table and data received from the energy management apparatus. The
(Continued)

energy management apparatus has an acquisitor, a data processor, a second storage and a communicator. The acquisitor acquires, regarding the zones, presence-absence information indicating a presence or absence of a person in each of the zones. The data processor generates the data based on the presence-absence information acquired by the acquisitor and the zone identifier.

15 Claims, 32 Drawing Sheets

(51) Int. Cl.
  *G06F 1/3231* (2019.01)
  *G06Q 10/00* (2012.01)
  *G06F 1/32* (2019.01)
  *G05B 15/02* (2006.01)
(52) U.S. Cl.
  CPC ............... *G06Q 10/00* (2013.01); *G07C 9/00* (2013.01); *G05B 2219/2639* (2013.01); *G05B 2219/2642* (2013.01); *G07C 2009/00634* (2013.01); *Y02D 10/00* (2018.01)

(56) References Cited

FOREIGN PATENT DOCUMENTS

| | | |
|---|---|---|
| JP | 2014-16920 A | 1/2014 |
| JP | 2014-56312 A | 3/2014 |
| JP | 2015-41379 A | 3/2015 |
| JP | 2015-043189 | 3/2015 |
| WO | 2015/114500 A2 | 8/2015 |

OTHER PUBLICATIONS

Extended European Search Report dated Jan. 9, 2020 in European Application No. 17802402.2.

* cited by examiner

FIG. 2

| DETECTION RESULTS TABLE | |
|---|---|
| ZONE ID | PERSON PRESENT/ABSENT |
| ZONE #1 | PRESENT |
| ZONE #2 | ABSENT |
| ⋮ | ⋮ |
| ZONE #m | PRESENT |

FIG. 3

| ENTRY-EXIT TABLE | |
|---|---|
| PERSONAL ID | STATE |
| PERSON #1 | IN BUILDING |
| PERSON #2 | IN BUILDING |
| ⋮ | ⋮ |
| PERSON #n | EXITED BUILDING |

FIG. 6

| ZONE ID | INFORMATION DEVICE POWER | | | FACILITY DEVICE POWER | | | TOTAL POWER | INFORMATION DEVICE ELECTRIC ENERGY | FACILITY DEVICE ELECTRIC ENERGY | TOTAL ELECTRIC ENERGY |
|---|---|---|---|---|---|---|---|---|---|---|
| | PC | SHARED DEVICE | OTHER | AIR-CONDITIONING EQUIPMENT | LIGHTING DEVICE | OTHER | | | | |
| ZONE #1 | Pw11 | Pw12 | Pw13 | Pw14 | Pw15 | Pw16 | Pw1 | Ee11 | Ee12 | Ee1 |
| ZONE #2 | Pw21 | Pw22 | Pw23 | Pw24 | Pw25 | Pw26 | Pw2 | Ee21 | Ee22 | Ee2 |
| ... | ... | ... | ... | ... | ... | ... | ... | ... | ... | ... |
| ZONE #m | Pwm1 | Pwm2 | Pwm3 | Pwm4 | Pwm5 | Pwm6 | Pwm | Eem1 | Eem2 | Eem |

FIG. 7

Information Device Table (511)

| INFORMATION DEVICE ID | ZONE ID |
|---|---|
| PC #1 | ZONE #1 |
| SHARED DEVICE #2 | ZONE #1 |
| ⋮ | ⋮ |
| PC #t | ZONE #m |

FIG. 8

Device Used Table (512)

| PERSONAL ID | INFORMATION DEVICE ID |
|---|---|
| PERSON #1 | PC #1 |
| PERSON #2 | PC #2 |
| ⋮ | ⋮ |
| PERSON #n | PC #s |

FIG. 22

ENTRY-EXIT TABLE _3112_

| PERSONAL ID | TENANT ID | STATE |
|---|---|---|
| PERSON #1 | TENANT #1 | IN BUILDING |
| PERSON #2 | TENANT #1 | IN BUILDING |
| ⋮ | ⋮ | ⋮ |
| PERSON #n | TENANT #h | EXITED BUILDING |

FIG. 23

TENANT TABLE _3113_

| ZONE ID | TENANT ID |
|---|---|
| ZONE #1 | TENANT #1 |
| ZONE #2 | TENANT #1 |
| ⋮ | ⋮ |
| ZONE #m | TENANT #h |

FIG. 26

| ZONE ID | INFORMATION DEVICE POWER | | | FACILITY DEVICE POWER | | | TOTAL POWER | INFORMATION DEVICE ELECTRIC ENERGY | FACILITY DEVICE ELECTRIC ENERGY | TOTAL ELECTRIC ENERGY |
|---|---|---|---|---|---|---|---|---|---|---|
| | PC | SHARED DEVICE | OTHER | AIR-CONDITIONING EQUIPMENT | LIGHTING DEVICE | OTHER | | | | |
| ZONE #1 | Pw11 | Pw12 | Pw13 | Pw14 | Pw15 | Pw16 | Pw1 | Ee11 | Ee12 | Ee1 |
| ZONE #2 | Pw21 | Pw22 | Pw23 | Pw24 | Pw25 | Pw26 | Pw2 | Ee21 | Ee22 | Ee2 |
| ... | ... | ... | ... | ... | ... | ... | ... | ... | ... | ... |
| ZONE #m | Pwm1 | Pwm2 | Pwm3 | Pwm4 | Pwm5 | Pwm6 | Pwm | Eem1 | Eem2 | Eem |

| INFORMATION DEVICE TABLE 6511 |||
|---|---|---|
| INFORMATION DEVICE ID | ZONE ID | TENANT ID |
| PC#1 | ZONE #1 | TENANT #1 |
| SHARED DEVICE #2 | ZONE #1 | TENANT #1 |
| ⋮ | ⋮ | ⋮ |
| PC#t | ZONE #m | TENANT #h |

| INFORMATION DEVICE TABLE | |
|---|---|
| PERSONAL ID | INFORMATION DEVICE ID |
| PERSON #1 | PC#1 |
| PERSON #2 | PC#2 |
| ⋮ | ⋮ |
| PERSON #n | PC#s |

ENERGY MANAGEMENT APPARATUS, INFORMATION DEVICE MANAGEMENT APPARATUS, MANAGEMENT SYSTEM, POWER CONSUMPTION REDUCTION METHOD AND PROGRAM

TECHNICAL FIELD

Embodiments described herein relate generally to an energy management apparatus, an information device management apparatus, a management system, a power consumption reduction method and a program.

BACKGROUND ART

In investigations of reducing the energy consumed in a building such as an office building, how the energy consumed by facility devices such as air-conditioning equipment and lighting devices that are installed in the building is reduced has gained attention, and with improvements having been made with regard to this point, the proportion of energy consumed by information devices such as computers, printers, and copiers, when seen in the context of the overall building, has recently been on the increase. However, although energy savings has been conventionally done with respect to the individual information devices, investigation to consider the relationship with the persons using the information devices has sot been done.

CITATION LIST

Patent Literature

[Patent Literature 1]
Japanese Unexamined Patent Application, First Publication No. 2015-041379

SUMMARY OF INVENTION

Technical Problem

An object to be solved by the present invention is to provide an energy management apparatus, an information device management apparatus, a management system and a power consumption reduction method that can efficiently reduce the amount of energy consumed by various devices in a building.

Solution to Problem

An energy management apparatus according to an embodiment is used in a management system including an information device management apparatus which has a first storage storing an information device table indicating a relationship between an information device identifier for identifying at least one information device and a zone identifier for each of zones and controls the information device based on the information device table and data received from the energy management apparatus. The energy management apparatus has an acquisitor, a data processor, a second storage and a communicator. The acquisitor acquires, regarding the zones, presence-absence information indicating a presence or absence of a person in each of the zones. The data processor generates the data based on the presence-absence information acquired by the acquisitor and the zone identifier. The second storage stores, for each of the zones, an amount of electric power consumed by the at least one information device controlled by the information device management apparatus. The communicator transmits the data to the information device management apparatus.

BRIEF DESCRIPTION OF DRAWINGS

FIG. 2 illustrates an example of a detection results table in the first embodiment.

FIG. 3 illustrates an example of an entry-exit table in the first embodiment.

FIG. 6 illustrates an example of a power consumption database in the first embodiment.

FIG. 7 illustrates an example of an information device table in the first embodiment.

FIG. 8 illustrates an example of a device used table in the first embodiment.

FIG. 22 illustrates an example of an entry-exit table in the second embodiment.

FIG. 23 illustrates an example of a tenant table in the second embodiment.

FIG. 26 illustrates an example of a power consumption database in the second embodiment.

DESCRIPTION OF EMBODIMENTS

Figure 1:
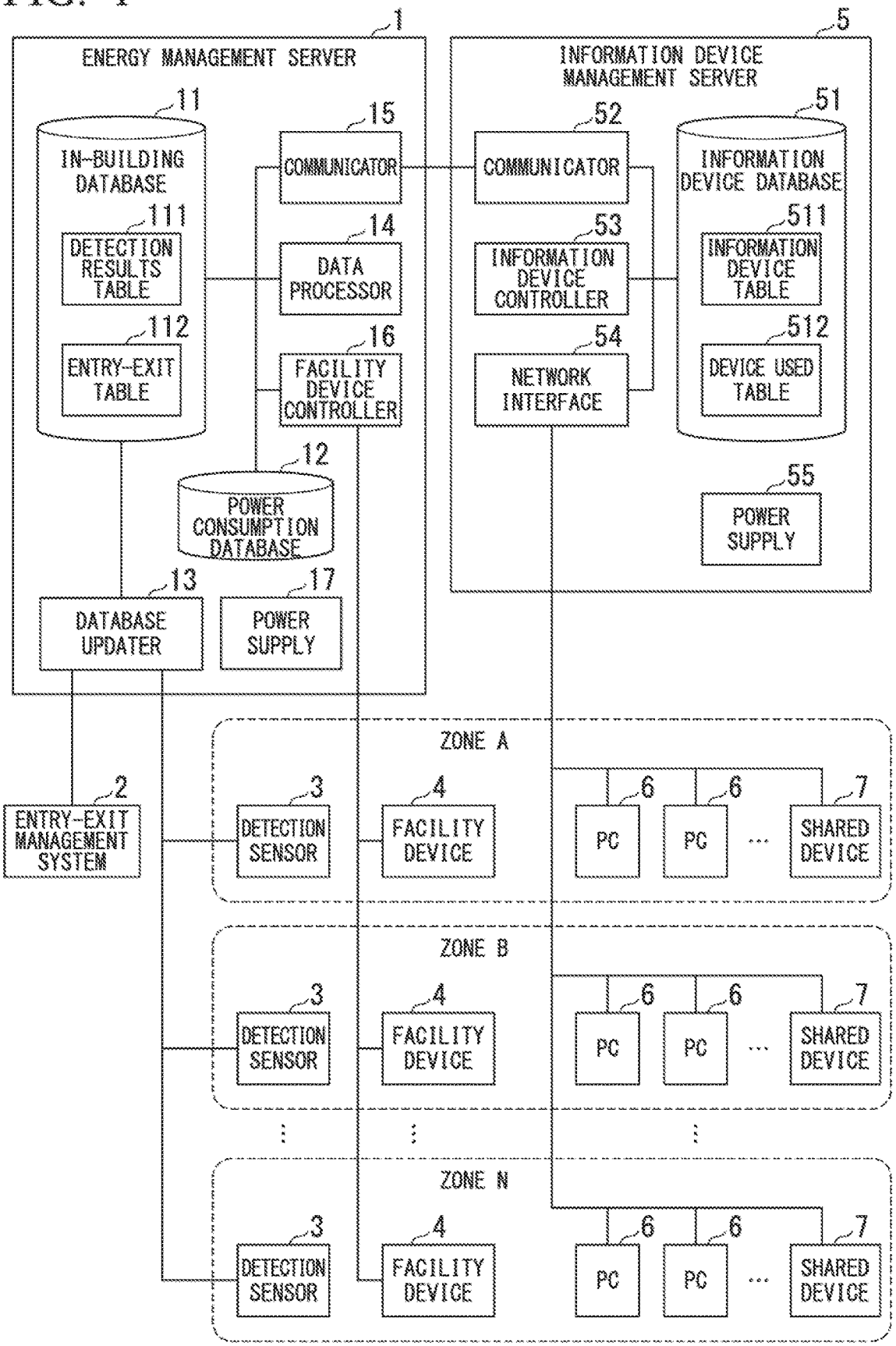
FIG. 1 is a block diagram illustrating an example of the configuration of a management system in a first embodiment.

An energy management apparatus, an information device management apparatus, a management system, a power consumption reduction method and a program of embodiments will be described below, with references make to drawings. In the following embodiments, it is assumed that the portions attached the same reference numerals perform the same operation, and duplicate explanation will be omitted.

First Embodiment

FIG. 1 is a block diagram illustrating an example of the configuration of a management system of a first embodiment. The management system reduces the energy consumed by facility devices provided in a building and the energy consumed by at least one information device used in the building. The facility devices in the following embodiments include not only devices provided within the building, but also devices provided outside the building, such as the outside unit of air-conditioning equipment. The same is true for information devices. The building being managed by the management system is, for example, an office building. Although the description to follow is for the case of the building being an office building, in the management system, the building using information devices may be, for example, a library, a research facility, or a university building. An information device is a desktop or laptop personal computer (PC), a printer, a copier, a multifunction printer, or a cable or wireless network device enabling communication between IP telephones and between computers.

The management system has an energy management server 1, an entry-exit management system 2, a plurality of detection sensors 3, a plurality of facility devices 4, and an information device management server 5. The energy management server 1 may be provided in a building that is targeted for energy reduction by the management system, or may be provided in a location different from the building. If the energy management server 1 is provided in a location different from the building, the energy management server 1 communicates with the detection sensor 3 and the facility device 4 provided in the building via a network constituted using one or both of a cable circuit or a wireless circuit. The information device management server 5, similar to the energy management server 1, may be provided in the building or in a location different from the building. One or both of the energy management server 1 and the information device management server 5 may be constituted using cloud computing. The building that is the target of energy reduction by the management system may be multiple, may be a group of a plurality of office buildings, or may be a plurality of buildings constructed in some region.

The energy management server 1 acquires entry-exit information regarding entering and exiting the building from the entry-exit management system 2. The entry-exit management system 2 detects a person entering the building that is being managed and a person exiting from the building, and generates entry-exit information based on the detection result. The energy management server 1 acquires presence-absence information from each of a plurality of detection sensors 3 provided within the building. The detection sensors 3 are provided in each of a plurality of zones regarding the building. Each of the detection sensors 3 determines the presence or absence of a person or persons in the zone, and generates presence-absence information based on the determination result. The presence-absence information includes information identifying the zone and information indicating whether or not a person or persons are in the zone. A detection sensor 3 has, for example, an image sensor or an infrared sensor, and detects the presence/absence or the movement of a person or persons, based on the output from the sensor. If the detection accuracy of the detection sensor 3 is high and can detect the number of persons, the detection sensor 3 may notify the energy management server 1 of presence-absence information that indicates the number of persons, rather than the presence/absence of a person or persons. The presence-absence information is also referred as presence information.

A zone is established as a prescribed region of a building, based on the positions of a plurality of PCs 6 and shared devices 7 used within the building. Zones may be established by dividing building into regions, or may be established so that there exist partial regions in which there is overlap between neighboring zones. Zones may be established in accordance with the positions of information devices that are divided into groups based on a policy of energy reduction. Specifically, if the regions of the building are the floors on each level of the building, one or a plurality of zones are established on each floor.

The energy management server 1 controls the facility devices 4 provided in each zone, based on entry-exit information acquired from the entry-exit management system 2 and the presence-absence information acquired from the detection sensors 3. The facility devices 4 are provided in the building, for which the consumed electrical power changes directly or indirectly in response to the operation state. A facility device 4 is, for example, a lighting device or air-conditioning equipment, an air intake or exhaust fan, a water-feed pump, a hot-water supplier, or blinds provided at a window. Although blinds are not a device that constantly consumes energy, the amount of sunlight from the window is changed by opening and closing the blinds, thereby indirectly changing the power consumed by air-conditioning equipment and the like.

The energy management server 1 collects the entry-exit information and the presence-absence information and transmits the data obtained by the collecting to the information device management server 5 as collection results. The energy management server 1 and the information device management server 5 are connected to enable communication. The energy management server 1 and the information device management server 5 may be connected by a dedicated circuit or a local area network, or may be connected via the Internet. If the energy management server 1 and the information device management server 5 communicate via the Internet, the energy management server 1 and the information device management server 5 may use a VPN (virtual private network) to communicate.

The information device management server 5 acquires the presence/absence of a person in each zone in the building and the entry and exit to and from the building from the collection results. The information device management server 5, based on information regarding persons in each zone, controls the information devices belonging to each zone and reduces the power consumed by the information devices in the building. An information device is a PC 6 or shared device 7 used by a person or persons. The PC 6 is a laptop or a desktop computer. A shared device 7 is a printer, a copier, a multifunction printer, a hub enabling communication between computers, a network device such as a switch or wireless LAN access point, or a device shared by a plurality of persons, such as an IP telephone. The information device management server 5 acquires state information indicating the power or electric energy consumed by the PCs 6 and the shared devices 7 and feeds back the acquired information to the energy management server 1. At least one detection sensor 3 and one or a plurality of facility devices 4 are provided in each zone of the building, and one or both of a PC 6 and shared device 7 belong to at least one zone. The information device management server 5 and the PCs 6 and shared devices 7 may be connected by a dedicated circuit or a local area network, or may be connected via the Internet. If the information device management server 5 and the PCs 6 and shared devices 7 communicate via the Internet, the information device management server 5 and the PCs 6 and shared devices 7 may use a VPN to communicate.

The energy management server 1 has an in-building database 11, a power consumption database 12, a database updater 13, a data processor 14, a communicator 15, a facility device controller 16, and a power supply 17. The in-building database 11 stores, as information regarding persons in the building, a detection results table 111 and an entry-exit table 112. The detection results table 111 stores information indicating the presence/absence of persons in each zone. The entry-exit table 112 stores the state of entry-exit for each person using the building or the presence or absence of a person in the building.

FIG. 2 illustrates an example of the detection results table 111. The detection results table 111 includes columns for the Zone ID item and the Person Present/Absent item. Rows exist for each zone. The Zone ID item stores a zone ID that uniquely distinguishes a zone (for example, ZONE #1). The Person Present/Absent item stores whether a person is present or absent in the zone indicated by the zone ID in the same row. Present indicates that at least one person is detected. Absent indicates that no person is detected. For example, the detection results table 111 in FIG. 2 stores that a person is absent from the zone indicated by ZONE #2. Although the detection results table 111 in FIG. 2 is an example of columns having the two items Zone ID and Person Present/Absent, the detection results table 111 may include columns of other items. For example, a Time column of the time that the Person Present/Absent item was updated, and a column of the number of persons when the detection sensor 3 can detect the number of persons may be included.

FIG. 3 illustrates an example of the entry-exit table 112. The entry-exit table 112 includes columns for Personal ID item and for the State of entry-exit item. Rows exist for each individual person who enters and exits the building. The Personal ID item stores a personal ID that uniquely distinguishes a person (for example PERSON #1) who enters and exits the building. The State item of the entry-exit state stores whether a person indicated by the personal ID of the same row is in the building or has already exited the building, with "IN BUILDING" and "EXITED BUILDING". For example, the entry-exit table 112 of FIG. 3 stores that the person distinguished by PERSON #2 is currently in the building. Although the entry-exit table 112 as the example illustrated in FIG. 3 has columns of the two items indicating the personal ID and the entry-exit state, the entry-exit table may include columns of other items. For example, it may include a column of the time at which the entry-exit state was updated.

Figure 4:
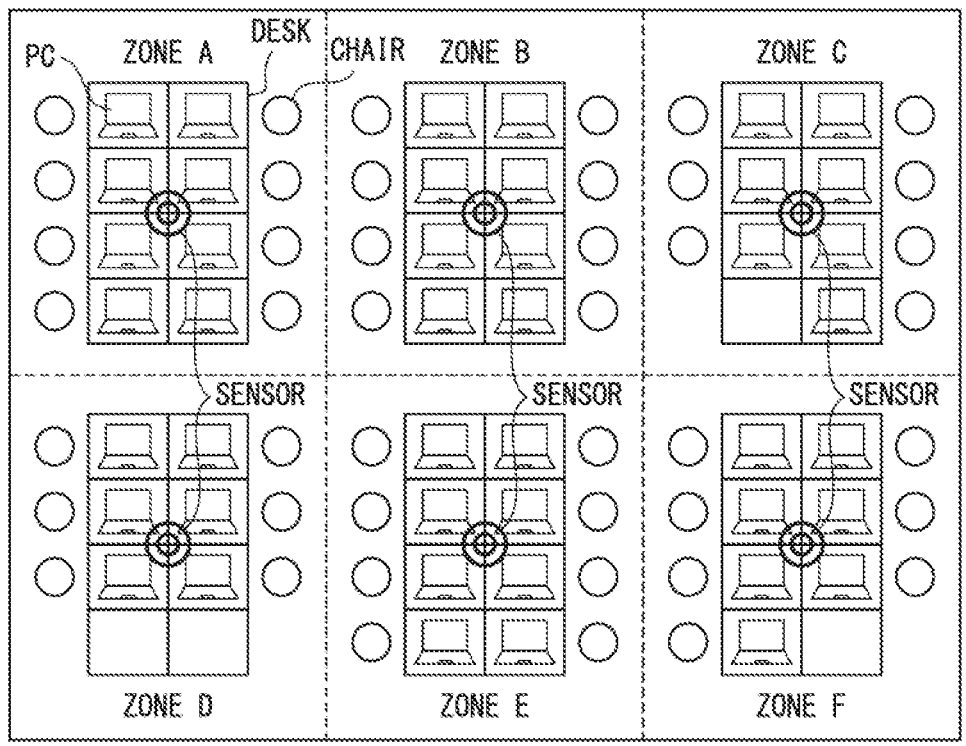
FIG. 4 is a drawing illustrating an example of zones in a building in the first embodiment.
Figure 5:
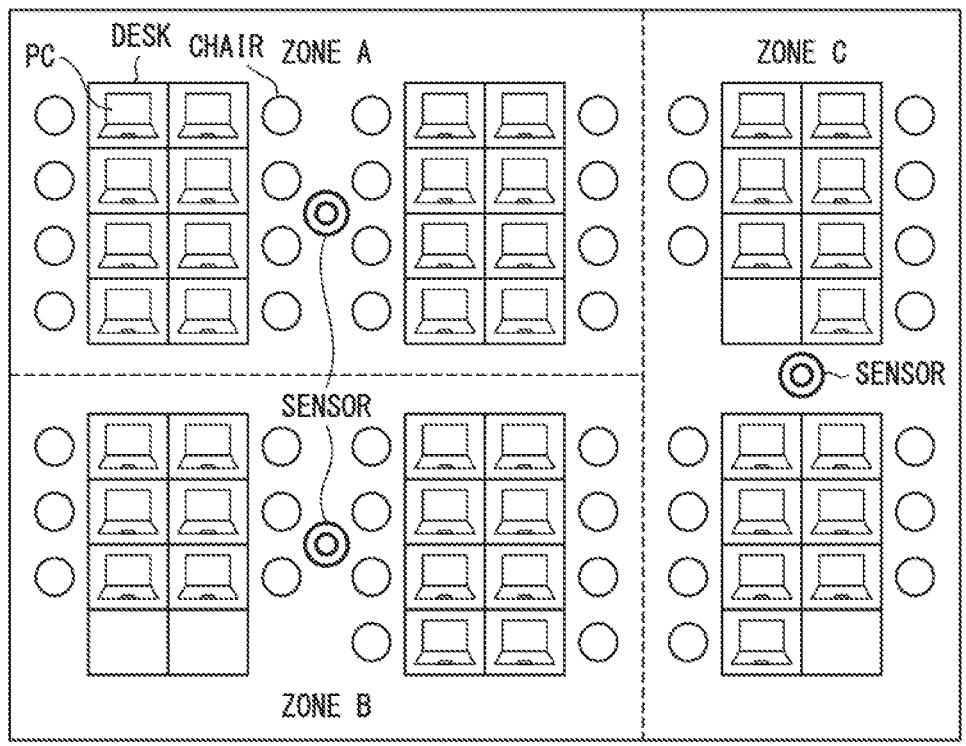
FIG. 5 is a drawing illustrating an example of zones in a building in the first embodiment.

The zones into which the region inside a building is divided will now be described. FIG. 4 and FIG. 5 illustrate examples of zones in the building FIG. 4 and FIG. 5 illustrate examples of division into zones, based on desks, chairs, and PCs provided on the desks used in an office. In the example illustrated in FIG. 4, one zone is established for each collection of desks provided with PCs, the office being divided into the six zones A to F. In the example illustrated in FIG. 5, one zone is established for each two collections of desks provided with PCs, the office being divided into the three zones A to C. A zone is established based on the location of information devices such as the PCs 6. The detection sensors 3 provided in each zone as sensors are, for example, mounted to the ceiling and sense the presence or absence of persons in the zone.

Referring back to FIG. 1, the description of the management system will be continued. The power consumption database 12 stores, for each zone, the electric power consumption and the electric energy consumption within the building. The power consumption and the electric energy consumption of each zone are separated into the power consumption and the electric energy consumption of the facility devices 4 and the power consumption and the electric energy consumption of the information devices such as the PCs 6 and the shared devices 7 controlled by the information device management server 5. The electric energy consumption, for example, is stored with a collection unit of time of 3 hours, 12 hours, 1 day, or 1 week. The power consumption and the electric energy consumption of the facility devices 4 in the power consumption database 12 are collected with a fixed period and reflected in the power consumption database 12.

FIG. 6 illustrates an example of a power consumption database 12. The power consumption database 12 includes columns for each of the items of the zone IDs, the power of the information devices including PCs and shared devices, the power of facility devices including air-conditioning equipment and lighting devices, the total power, the electric energy of the information devices, the electric energy of the facility devices, and the total electric energy. Rows exist for each of the zones. The zone IDs are stored in the Zone ID items. The Information Device Power item includes items for PCs and shared devices and the like included in the information devices, and the values of the power consumed by PCs and shared devices and the like is stored therein. The facility device power item includes items for the air-conditioning equipment and lighting devices included in the facility devices, and the values of the power consumed by the air-conditioning equipment and light devices and the like is stored therein. The Total Power items stores total values of power consumed by the information devices and facility devices provided in the building. The Information Device Electric Energy item stores the value of the electric energy consumed by information devices in a period of time that is the collection unit. The Facility Device Electric Energy item stores the values of the electric energy consumed by facility devices in a period of time that is the collection unit.

Although in the power consumption database 12 illustrated in FIG. 6 the information devices are divided into PCs, shared devices, and other, other items may be included in the information devices. Also, although the facility devices are divided into air-conditioning equipment, lighting devices, and other, other items may be included in the facility devices. The values of power consumed by PCs and shared devices in the power consumption database 12, rather than being the value of the total of the power consumption of the PCs and shared devices belonging to a zone, may be the values of power consumed by the individual PCs or shared devices.

Referring back to FIG. 1, the description of the management system will be continued. When the database updater 13 acquires entry-exit information from the entry-exit management system 2, the database updater 13 updates the entry-exit table 112, based on the entry-exit information. The entry-exit information includes a personal ID that uniquely identifies a person who has entered or exited the building and information indicating whether that person has entered or exited the building. The database updater 13 updates the state (entry-exit) in the entry-exit table 112 corresponding with the personal ID included in the entry-exit information, based on the entry-exit information. When the database updater 13 acquires presence-absence information from the detection sensors 3 provided in each of the zones, the database updater 13 updates the detection results table 11, based on the presence-absence information. The presence-absence information includes a zone ID that uniquely identifies the zone, and information indicating the presence or absence of a person or persons in that zone. The database updater 13 updates whether or not a person associated with the zone ID included in the presence-absence information is present/absence (Present or Absent), based on the presence-absence information.

The data processor 14 generates data, based on the presence-absence information acquired by the database updater 13 and on the zone IDs of a plurality of zones of the building. Specifically, the data processor 14 collects information stored in the detection results table I 11 and the entry-exit table 112 and detects the zone IDs for which a change occurred in the information or personal IDs for the person. The data processor 14 may collect information at a fixed interval, or may collect information in response to a request from the information device management server 5.

The data processor 14 outputs to the communicator 15 the collection results including the zone 1D or the personal ID corresponding to information that has changed and makes a request to the communicator 15 to transmit the collection results. The data processor 14 may further include into the collection results the zone IDs of zones in which persons are present. The data processor 14 collects the detection results table 111 and the entry-exit table 112 in the in-building database 11 at a fixed interval and generates the collection results as data. In this case, the collection results include information indicating the zones in which persons are present and the zones in which persons are not present and the personal IDs of persons currently in the building. The communicator 15 transmits to the information device management server 5 the collection results output from the data processor 14.

The facility device controller 16 controls the facility devices 4 in each zone of the building based on the detection results table 111. For example, if there is no person in zone A, the facility device controller 16 stops facility devices 4 provided in zone A or lowers the operating level of the facility devices 4 so as to reduce the power consumption. For example, if the facility device 4 is air-conditioning equipment, and performs cooling operation, lowering the operating level of the facility device 4 would be increasing the temperature of the air supplied from the air-conditioning equipment. If the facility device 4 is a lighting device, it would be extinguishing the lighting device, weakening the light emitted from the lighting device, or extinguishing the lighting device after a prescribed amount of time has elapsed without a person being detected. If the facility device 4 is an air intake/exhaust fan that circulates air or the like in the building or a water-feeding pump that supplies cooling water or hot water in the building, it would be reducing the amount of flow per unit time or switching from continuous operation to intermittent operation.

If the facility device 4 is blinds, it would be blocking sunlight from entering a room from the window, raising the cooling rate, and lowering the operating level of the air-conditioning equipment, or letting sunlight enter the mom from the window, raising the heating rate, and lowering the operating level of the air-conditioning equipment. Also, the lighting level by a lighting device is lowered in response to opening and closing the blinds. The facility device controller 16 may control the opening and closing of the blinds so as to suppress a change in the room temperature with respect to a zone in which no persons are present.

The facility device controller 16 acquires the power and the electric energy consumed by the facility devices 4 in the building, and updates the power and the electric energy of the facility device in each zone stored in the power consumption database 12.

The power supply 17 supplies power received from an external generator or commercial power mains to the in-building database 11, the power consumption database 12, the database updater 13, the data processor 14, the communicator 15, and the facility device controller 16 provided in the energy management server 1. The power supply 17 may have a secondary battery or the like sc that the power supply 17 can continue to supply of power, if the power supply 17 cannot receive power from the external generator or commercial power mains.

The information device management server 5 has an information device database 51, a communicator 52, an information device controller 53, a network interface 54, and a power supply 55. The information device database 51 stores an information device table 511 and a device used table 512. The information device table 511 stores the zones to which the PCs 6 and the shared devices 7 belong. Specifically, it stores combinations of information device IDs that uniquely distinguish the PCs 6 and the shared devices 7 and zone IDs that indicate the zones to which the PCs 6 or shared devices 7 belong. For example, even if the PC 6 is a laptop computer that a person can carry around and use, the PC 6 belongs to some zone. For example, a laptop PC 6 is made to belong to the zone in which it is mainly used. That is, all of the PCs 6 and all of the shared devices 7 belong to some zone. The device used table 512 stores information indicating the PCs that are used by persons. Specifically, the device used table 512 stores combinations of personal IDs of persons and information device IDs that uniquely distinguish the PCs 6.

FIG. 7 illustrates an example of an information device table 511. The information device table 511 includes columns for the Information Device ID item and for the Zone ID item. Rows exist for each information device. The Information Device ID item stores an information device ID that distinguishes an information device (for example PC #1). The Zone ID item stores a zone ID indicating the zone to which the information device distinguished by the information device ID of the same row belongs. That is, the information device table 511 stores combinations of information device IDs of information devices and zone IDs of zones to which the information devices belong. For example, the information device table 511 of FIG. 7 stores that the information device distinguished as SHARED DEVICE #2 is mainly used in the zone indicated by ZONE #1. Although an example is illustrated in which there is a one-to-one correspondence between information device IDs and zone IDs in FIG. 7, a plurality of zone IDs may be associated with an information device ID.

FIG. 8 illustrates an example of the device used table 512. The device used table 512 includes columns for the Personal ID item and the Information Device ID item. Rows exist for each person entering and exiting the building. The Personal ID item stores personal IDs (for example, PERSON #1). The Information Device ID item stores information device IDs that indicate information devices used by a person identified by the personal ID in the same row. For example, the device used table 512 of FIG. 8 stores that the person distinguished as PERSON #1 uses the information device distinguished as PC #1. Although an example has been illustrated in which there is a one-to-one correspondence between the personal IDs and the information device IDs in FIG. 8, if a person uses a plurality of information devices, a plurality of information device IDs may be associated with a personal ID.

Referring back to FIG. 1, the description of the management system will be continued. The communicator 52 communicates with the energy management server 1. The communicator 52 receives the collection results as data transmitted from the energy management server 1, and outputs the collection results to the information device controller 53. The information device controller 53, based on the information device table 511 and the device used table 512 stored in the information device database 51, and collection results as data, selects a PC 6 or a shared device 7 as a target for reduction of power consumption. The information device controller 53 controls the selected PC 6 or shared device 7 so as to suppress the power consumed by the PC 6 or the shared device 7. The information device controller 53 acquires from the PCs 6 and the shared devices 7 state information after controlling the PCs 5 or the shared devices 7. The information device controller 53 transmits the acquired state information to the energy management server 1, via the communicator 52. The state information includes information device IDs identifying PCs 6 or the shared devices 7 that were targets for reduction of power consumption, the zone IDs of zones to which the PCs 6 and the shared devices 7 belong, and information indicating reduced power consumption.

The network interface 54 communicates with PCs 6 and shared devices 7 located inside the building. The network interface 54 transmits the control information generated by the information device controller 53 to a PC 6 or a shared device 7. The network interface 54 receives state information from the PC 6 or the shared device 7 that is the control target and makes a request to the communicator 52 to transmit the received state information to the energy management server 1.

The power supply 55 supplies power received from an external generator or commercial power mains to the information device database 51, the communicator 52, the information device controller 53, and the network interface 54 of the information device management server 5. Similar to the power supply 17 provided in the energy management server 1, the power supply 55 may have a secondary battery or the like, so that the power supply 55 can continue to supply of power, if the power supply 55 cannot receive power from the external generator or commercial power mains.

Figure 9:
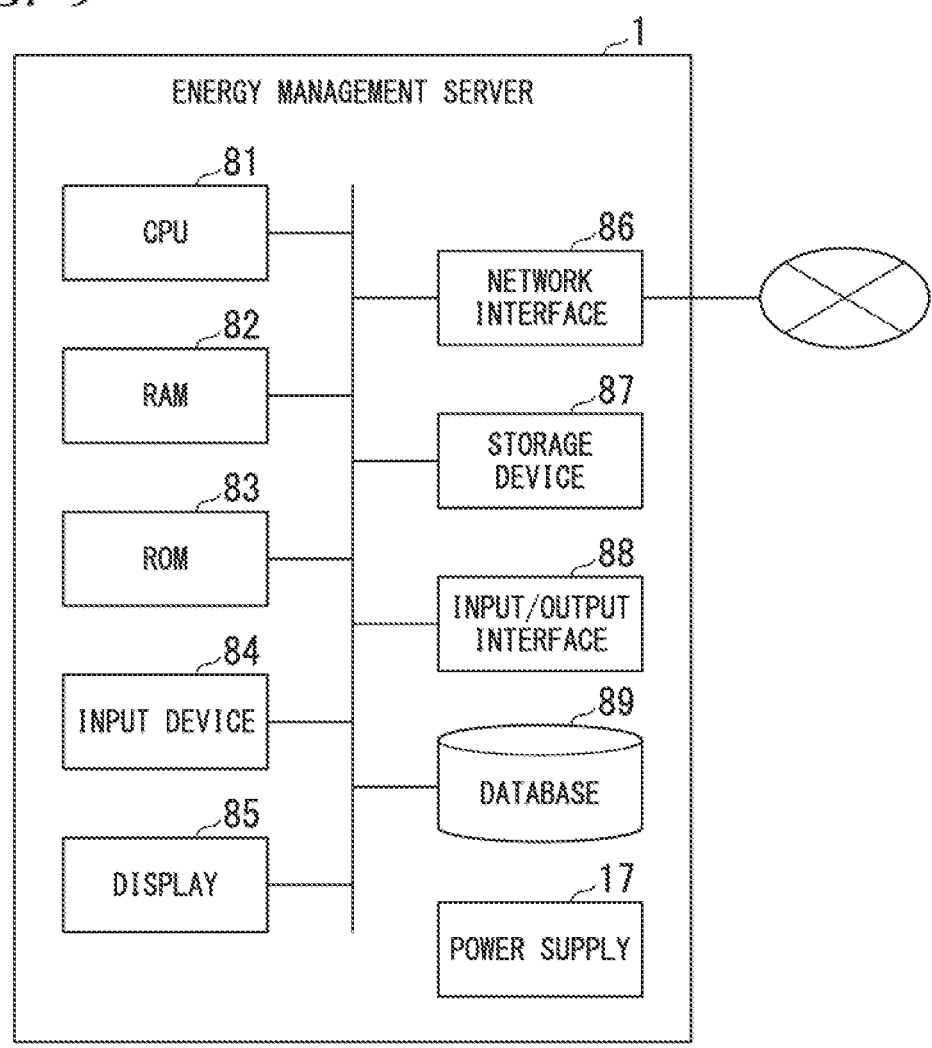
FIG. 9 is a block diagram illustrating an example of the hardware configuration of an energy management server.

FIG. 9 is a block diagram illustrating an example of the hardware configuration of the energy management server 1. The energy management server 1 has a CPU 81, a RAM 82, a ROM 83, an input device 84, a display 85, a network interface 86, a storage device 87, an input/output interface 88, a database 89, and a power supply 17. The CPU 81 reads out a program stored non-temporarily in the storage device 87, which is constituted by a HDD or SSD (solid-state drive), or in the ROM 83 into the RAM 82, and executes the read-out program. The CPU 81, by executing processing in response to operation by a user or administrator input using the input device 84, such as a mouse or keyboard, operates as the database updater 13, the data processor 14, and the facility device controller 16. The network interface 86 operates as the communicator 15. The database 89 operates as the in-building database 11 and the power consumption database 12.

The CPU 81, via the input/output interface 88, acquires entry-exit information from the entry-exit management system 2 and acquires presence-absence information from each of the detection sensors 3. The CPU 81 operating as the database updater 13, based on the acquired entry-exit information and presence-absence information, updates the information stored in the database 89 operating as the in-building database 1 and the power consumption database 12. The CPU 81 operating as the data processor 14 collects information stored in the database 89 operating as the in-building database 11 and the power consumption database 12. The network interface 86 operating as the communicator 15 transmits the collection results obtained by the collection to the information device management server 5. The display 85 displays information of the power consumption database 12 included in the database 89. The display 85, for example, displays the table illustrated in FIG. 6. By displaying for each zone the power consumed by the facility devices and the information devices, the energy management server 1 enables monitoring of the power consumed by all devices related to the building. In this manner, the energy management server 1 may be implemented by hardware having the CPU 81 that executes a program.

Similar to the energy management server 1, the information device management server 5 may be implemented by hardware having a CPU that executes a program. In that case, the CPU 81 operates as the information device controller 53, by executing processing in response to an operation by a user or administrator input to the input device 84 such as a mouse or keyboard.

Figure 10:
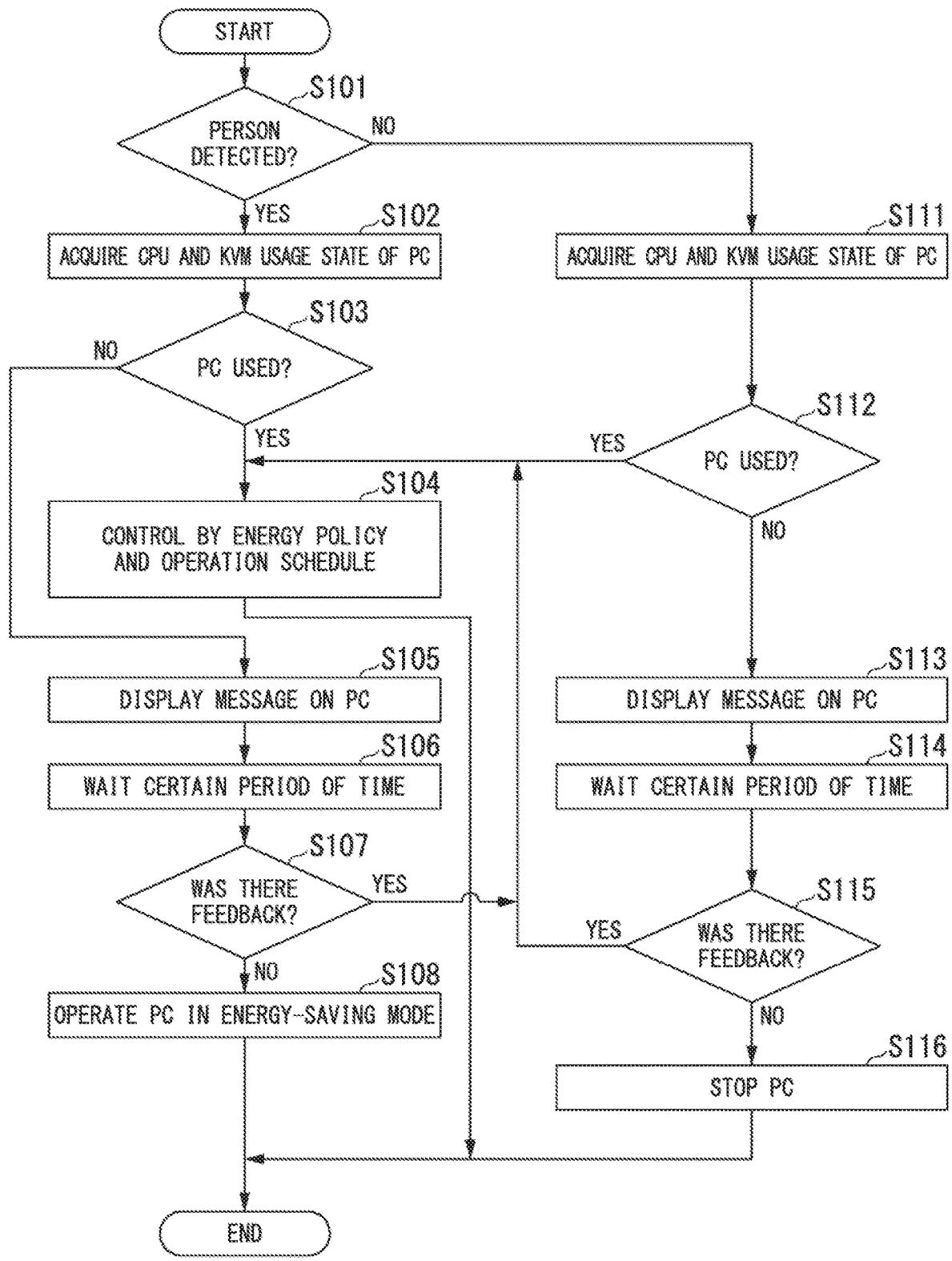
FIG. 10 is a flowchart illustrating the operation of a first power consumption reducing processing.

The processing by the information device management server 5 to reduce the power consumption of the PCs 6 and the shared devices 7 will now be described. FIG. 10 is a flowchart illustrating the operation of the first power consumption reducing processing. The first power consumption reducing processing is performed by the information device management server 5 to reduce the power consumption of a PC 6. Upon acquiring the collection results from the energy management server 1, the information device management server 5 performs, by each zone, the first power consumption reducing processing, using the presence or absence of a person in each of the zones included in the collection results.

In the information device management server 5, the information device controller 53 determines whether or not a person is detected in a processing target zone (step S101). If a person is detected in the processing target zone (YES at step S101), the information device controller 53 reads out an information device ID of a PC 6 belonging to the processing target zone from the information device table 511, and acquires the usage state of the CPU and KVM in the PC 6 identified by the read-out information device ID (step S102). KVM, as used herein, means keyboard, video, and mouse.

Based on the usage state of the CPU and the KVM, the information device controller 53 determines whether or not the PC 6 is being used by a person (step S103). In the determination at step S103, for example, if the usage rate of the CPU exceeds a threshold or if the KVM is used at least one time over a certain period of time, the information device controller 53 determines that the PC is being used. If, however, the usage rate of the CPU is below the threshold and also the KVM has not been used for a certain period of time, the information device controller 53 determines that the PC is not being used.

If the PC 6 is determined to be in use (YES at step S103), the information device controller 53, based on a pre-established energy policy and an operation schedule with respect to PCs 6 and shared devices 7, performs control of the PC 6 (step S104) and ends the processing. In this case, the energy policy is, for example, a policy of reducing consumption energy of the information devices belonging to a zone if the power consumption of information devices in the zone exceeds a certain amount, or a policy of driving a PC 6 having a secondary battery using the secondary battery if the power consumption in a zone exceeds a certain amount. An operation schedule indicates operation according to the time in which, rather than reducing the power consumption of PCs 6 during working hours, the PCs 6 are stopped or placed in the stopped state outside of working hours.

If the determination at step S103 is that the PC is not being used (NO at step S103), the information device controller 53 determines that, although the PC 6 is not being used, there is a possibility that a PC 6 will be used because of a person being in the zone, and causes display on the PC 6 of a message indicating a change of the operating mode of the PC 6 to the energy-saving mode (step S105), and waits for a certain period of time (step S106). The information device controller 53 determines whether or not there is feedback from the PC 6 on which the message was displayed while waiting for the certain period of time (step S107).

If there had been feedback (YES at step S107), the information device controller 53 determines that the PC 6 will be used shortly and proceeds to the processing of step S104. If there has been no feedback (NO at step S107), the information device controller 53 determines that the PC 6 will not be used for a while, performs control to operate the PC 6 in the energy-saving operating mode (step S108), and ends the processing. In this case, the operating of the PC 6 in the energy-saving mode means, for example, changing the operating mode of the PC 6 to the sleep mode or the hibernation mode.

If a person has not been detected in the processing target zone at step S101 (NO at step S101), the information device controller 53 reads out the information device ID of the PC 6 belonging to the processing target zone from the information device table 511 and acquires the usage state of the CPU and KVM in the PC 6 identified by the read-out information device ID (step S111). Based on the usage state of the CPU and KVM, the information device controller 53 determines whether or not the PC 6 is being used by a person (step S112). If the determination is that the PC 6 is being used (YES at step S112), the information device controller 53 proceeds to the processing of step S104.

If the determination at step S112 is that the PC is not being used (NO at step S112), the information device controller 53 causes display on the PC 6 of a message indicating a change of the operating mode of the PC 6 to the energy-saving mode (step S113), and waits for a certain period of time (step S114). The information device controller 53 determines whether or not there is feedback from the PC 6 on which the message was displayed while waiting for the certain period of time (step S115).

If there had been feedback (YES at step S115), the information device controller 53 determines that the PC 6 will be used shortly and proceeds to the processing of step S104. If there had been no feedback (NO at step S15), the information device controller 53 determines that there is no person in the zone to which the PC 6 belongs and also that the PC 6 is not being used, performs control to stop the PC 6 (step S116), and ends the processing. In this case, stopping the PC 6 may mean ending all of the applications running on the PC 6 and shutting down the PC 6 to make the power consumption substantially zero.

The first power consumption reducing processing illustrated in FIG. 10 is performed for each zone. The processing from step S102 to step S116 is performed with respect to each of the PCs 6 for which there is correspondence between zone stored in the information device table 511 and the processing target zone. The information device management server 5 performs the first power consumption reducing processing, thereby enabling a reduction of the power consumption of PCs 6, based on the presence or absence of a person in each of the zones.

After verifying the usage state of the CPU and the KVM with respect to the PC 6 belonging to a zone, of the plurality of zones, in which a person is not detected, the information device management server 5 performs control to stop the PC 6. By verifying the usage state in this manner, the power consumption can be reduced without losing convenience for a person using a PC 6 temporarily in a zone other than the processing target zone. By the information device management server 5 verifying not only the results of the detection sensor 3 detecting a person but also the usage state of each PC 6 and KVM, it is possible to control the operating mode of the PCs 6 appropriately, even if the detection sensor 3 made an erroneous detection or if a person simply passing through a zone was detected.

In the first power consumption reducing processing, the information device management server 5 may use entry-exit information included in the collection results. For example, the information device management server 5 identifies, of PCs 6 belonging to a zone, of the plurality of zones, in which a person is not detected, a PC 6 currently being used by a person in the building, based on entry-exit information and the device used table 512, and may exclude the identified PC 6 from the control targets.

Figure 11:
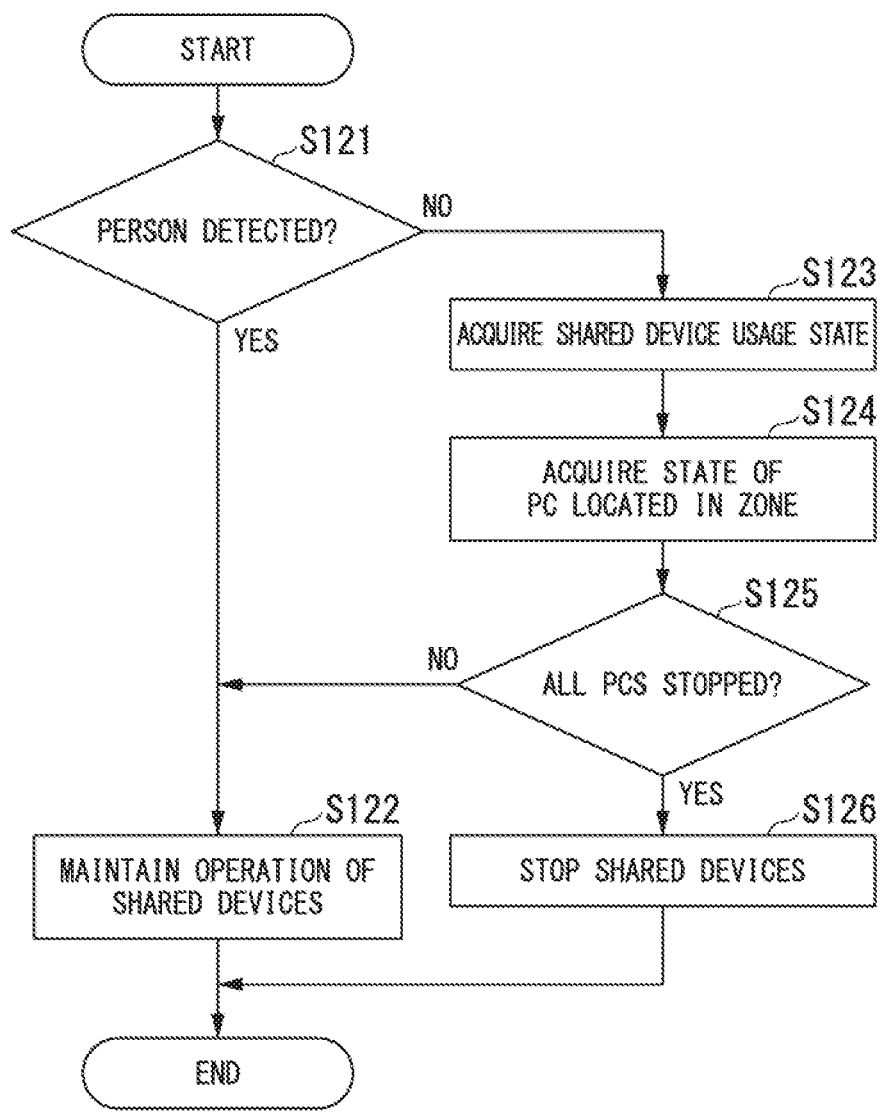
FIG. 11 is a flowchart illustrating the operation of a second power consumption reducing processing.

FIG. 11 is a flowchart illustrating the operation of the second power consumption reducing processing, which is performed by the information device management server 5 for the purpose of reducing the power consumption of the shared devices 7. Upon acquiring the collection results from the energy management server 1, the information device management server 5 starts the second power consumption reducing processing for each zone, using the presence and absence of persons in each zone included in the collection results.

In the information device management server 5, the information device controller 53 determines whether or not a person is detected in a processing target zone (step S121). If a person is detected in the processing target zone (YES at step S121), the information device controller 53 determines that the shared devices 7 belonging to the processing target zone is to be operated as is (step S122) and ends the processing. The information device controller 53 identifies the shared device 7 belonging to the processing target zone by using the information device table 51.

If a person is not detected in the processing target zone (NO at step S121), the information device controller 53 acquires the usage state of the shared device 7 belonging to the processing target zone (step S123). The information device controller 53 acquires the state of the PC 6 belonging to the processing target zone (step S124). In order to acquire the state of the PC 6, the information device controller 53 transmits a control signal for acquisition of the status of each of the PCs 6 via the network interface 54 and receives the response thereto.

The information device controller 53 determines whether or not all of the PCs 6 belonging to the processing target zone are stopped and also the shared devices 7 have not been used over a certain period of time (step S125). If all of the PCs 6 are stopped and also the shared devices 7 have not been used over a certain period of time (YES at step S125), the information device controller 53 stops the shared devices 7 belonging to the processing target zone (step S126) and ends the processing.

If at least one PC 6 belonging to the processing target zone is operating or the shared device 7 is used during the certain period of time (NO at step S125), the information device controller 53 proceeds to the processing of step S122. If a PC 6 belonging to the processing target zone is operating, there is a possibility that a person has temporarily left that zone and will return to the zone and use the shared device 7. For that reason, even if a person is not detected in the zone, the information device management server 5, based on the state of the PC 6 and the usage state of the shared device 7 in that zone, determines whether or not to stop the shared device 7. This enables the information device management server 5 to reduce the power consumption in a zone, while maintaining the convenience for the person.

Figure 12:
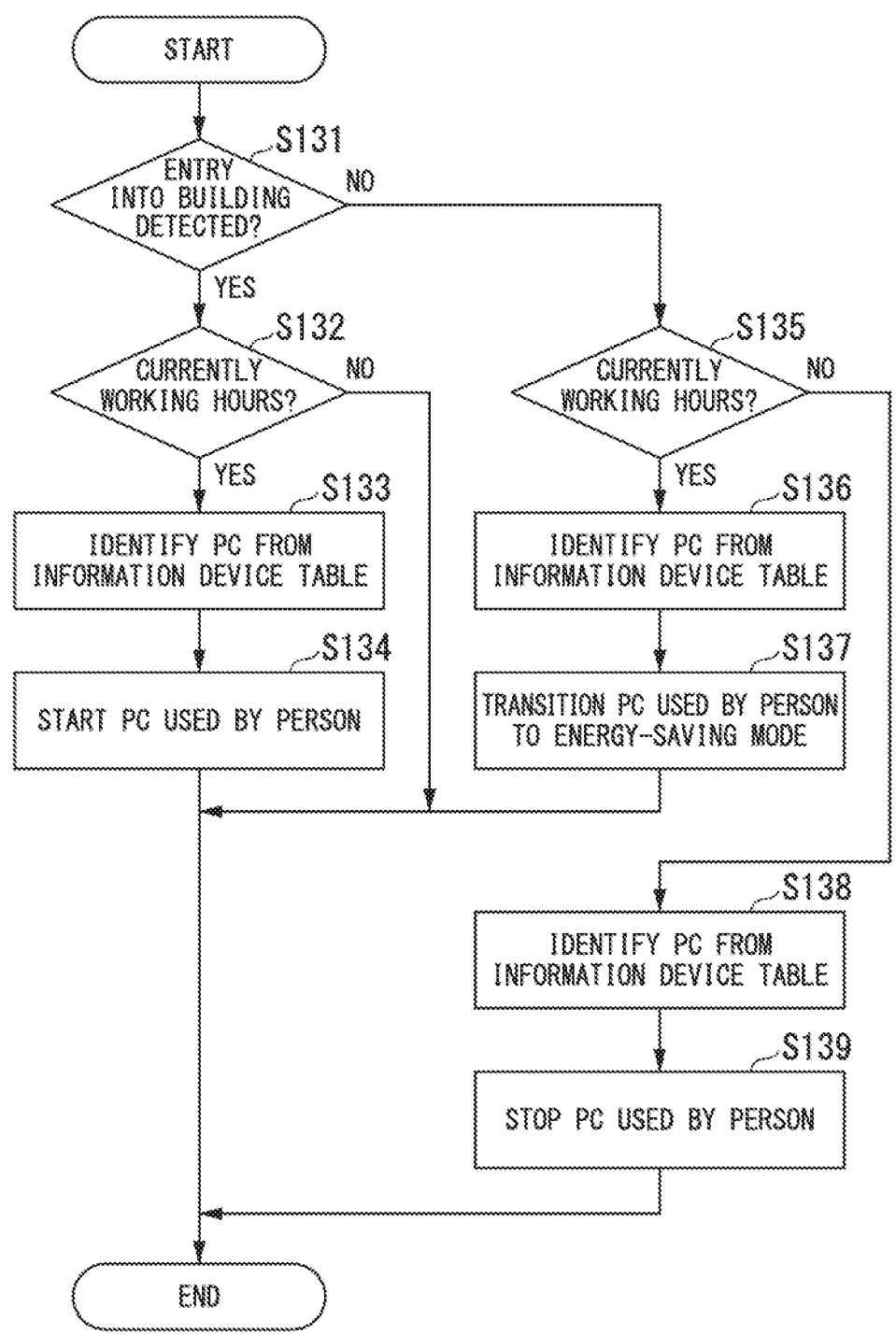
FIG. 12 is a flowchart illustrating an operation of a third power consumption reducing processing.

FIG. 12 is a flowchart illustrating the operation of the third power consumption reducing processing, which is performed by the information device management server 5 to reduce the power consumption of the PCs 6. Upon acquiring the collection results from the energy management server 1, the information device management server 5 starts the third power consumption reducing processing for each person, using the entry-exit information included in the collection results.

In the information device management server 5, the information device controller 53 determines whether or not the entry of a person into the building has been detected, based on the entry-exit information (step S131). If entry of a person into the building has been detected (YES at step S131), the information device controller 53 determines whether the current time is during working hours (step S132). Working hours are established beforehand and registered into the information device management server 5. Working hours are established, for example, as being from 9 AM until 6 PM on weekdays.

If the current time is within working hours (YES at step S132), the information device controller 53, based on the device used table 512, identifies the PC 6 used by the person who entered the building (step S133). The information device controller 53 starts the PC 6 identified at step S133 (step S134) and ends the processing. If the current time is not within working hours (NO at step S132), the information device controller 53 ends the processing.

If exit of a person has been detected at step S131 (NO at step S131), the information device controller 53 determines whether or not the current time is within working hours (step S135). If the current time is within working hours (YES at step S135), the information device controller 53 identifies the PC 6 used by the person who has exited the building, based on the device used table 512 (step S136). The information device controller 53 operates the PC 6 identified at step S133 in the energy-saving mode and ends the processing (step S137).

If the current time was not within working hours at step S135 (NO at step S135), the information device controller 53 identifies the PC 6 used by the person who has exited the building, based on the device used table 512 (step S138). The information device controller 53 stops the PC 6 identified at step S138 (step S139) and ends the processing.

By the information device management server 5 performing the third power consumption reducing processing based on the entering and exiting of a person into and out of a building, the power consumed by the PCs 6 can be reduced, without losing the convenience for persons. Specifically, because a person who has exited the building during working hours might return to within the building during working hours, the information device management server 5 operates the PC 6 used by the person in the energy-saving mode without stopping, thereby providing convenience for the person and also reducing the power consumption. Because a person who exits the building outside of working hours has a low possibility of returning to within the building, the information device management server 5 stops the PC 6 used by the person, so as to reduce the power consumption.

Figure 13:
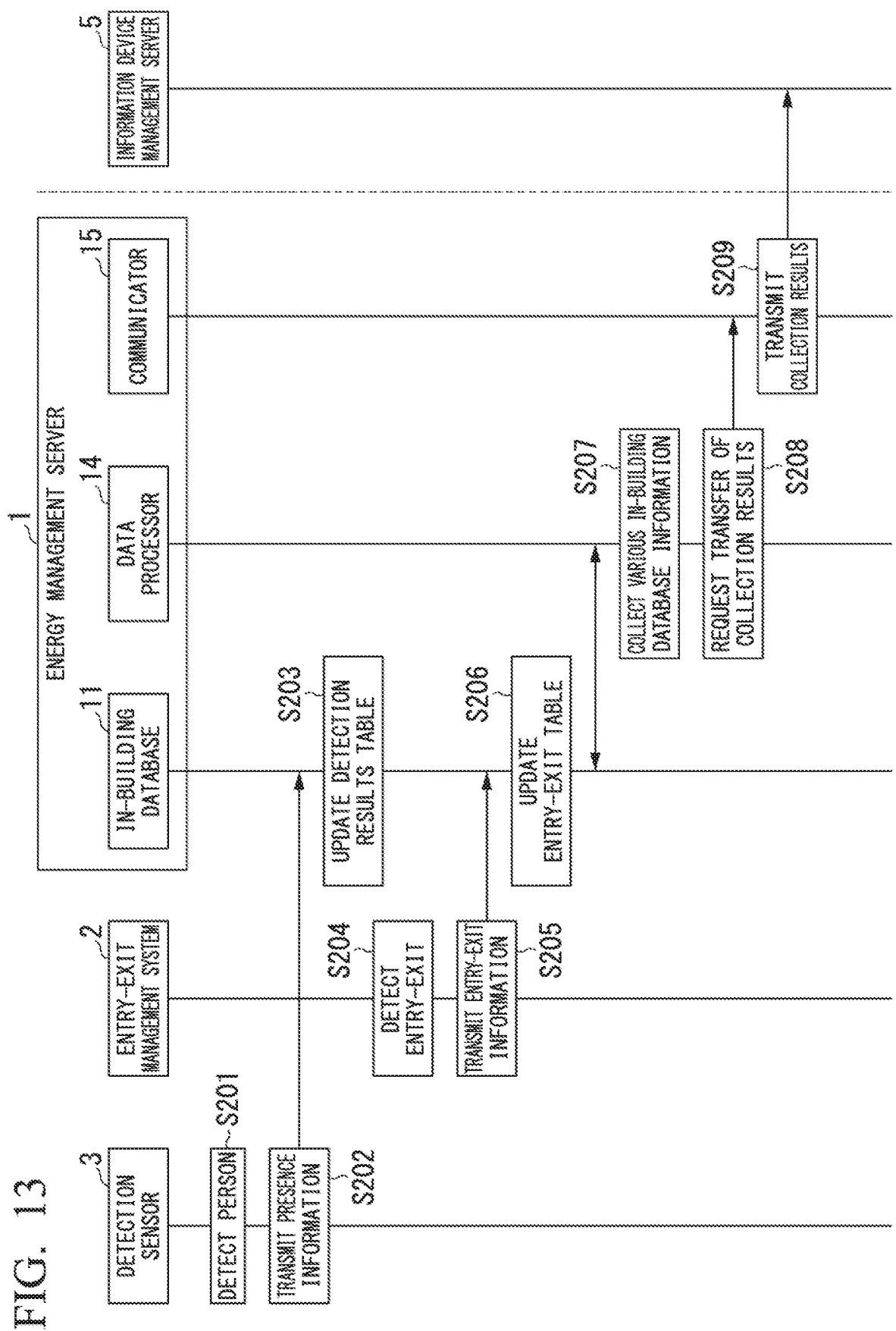
FIG. 13 is a first sequence diagram illustrating the operation in the overall management system of the first embodiment.
Figure 14:
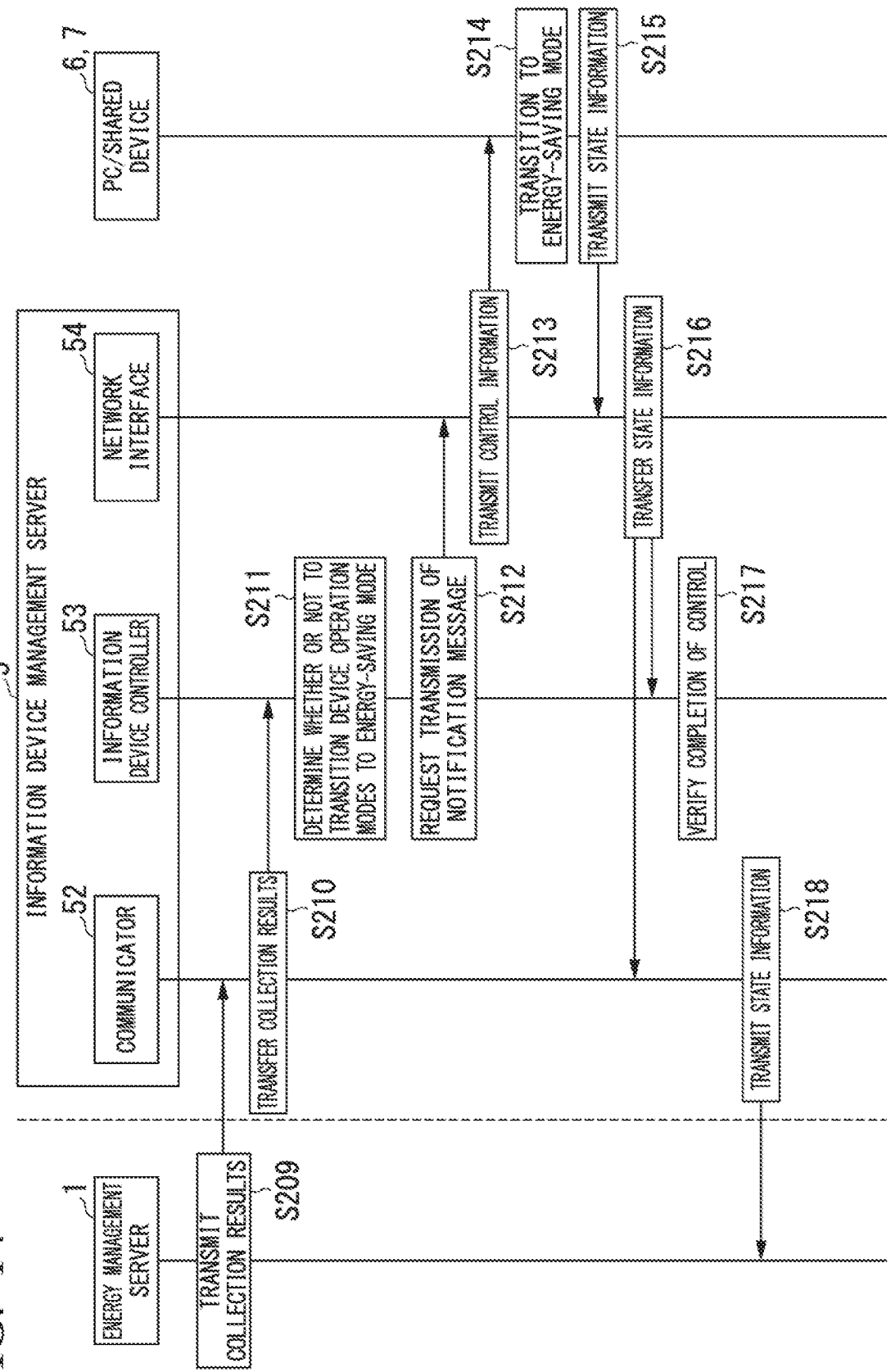
FIG. 14 is a second sequence diagram illustrating the operation in the overall management system of the first embodiment.
Figure 15:
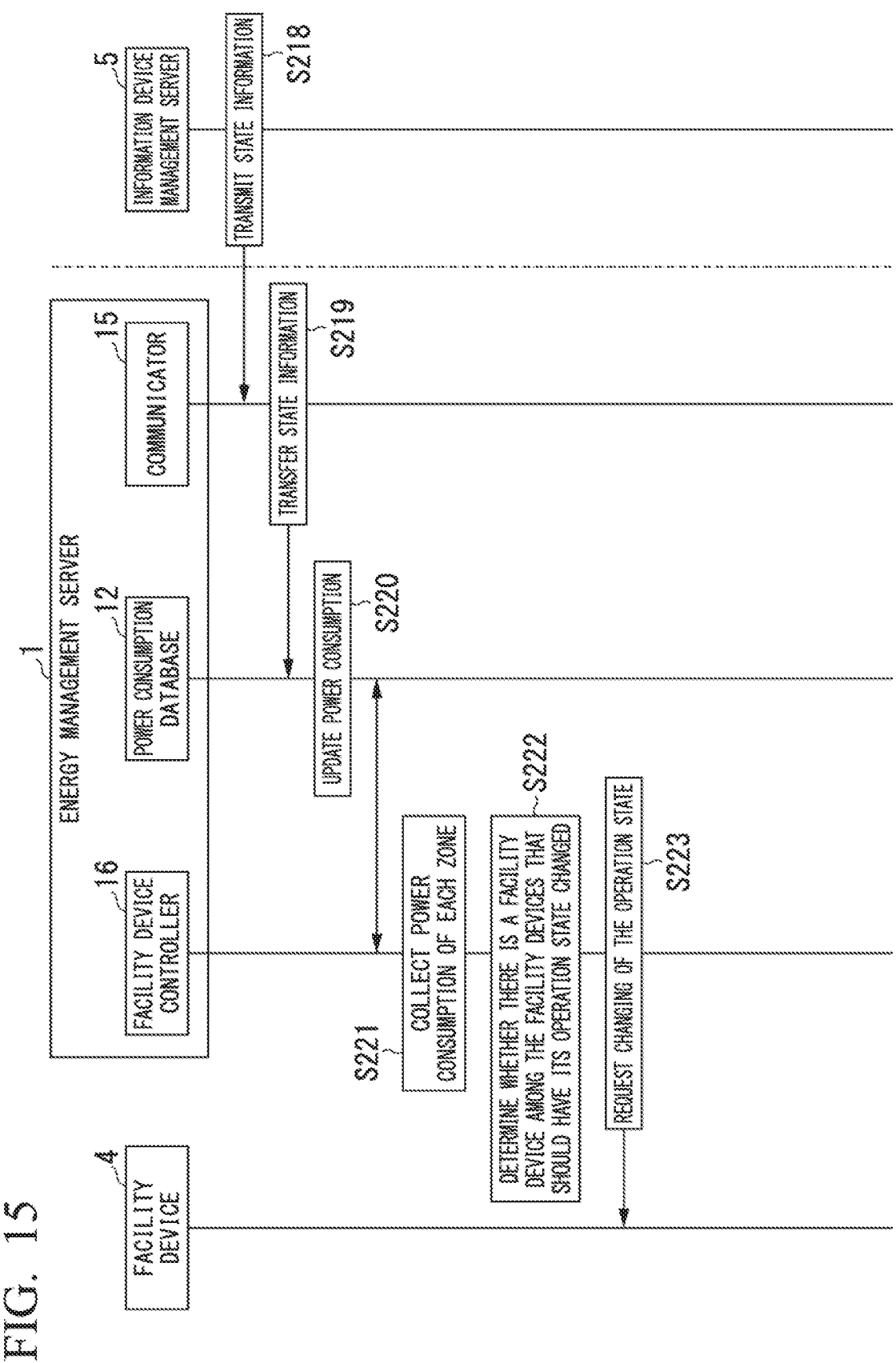
FIG. 15 is a third sequence diagram illustrating the operation in the overall management system of the first embodiment.

The overall operation of a management system of the first embodiment will now be described, with references made to FIG. 13 to FIG. 17. FIG. 13, FIG. 14, and FIG. 15 are sequence diagrams illustrating the processing for the energy management server 1 to transmit the collection results to the information device management server 5 and the information device management server 5 to perform control of the PC 6 or shared device 7, based on the collection results.

When the detection sensor 3 detects a person within a zone (step S201), the detection sensor 3 transmits to the energy management server 1 presence-absence information that includes the zone ID indicating the zone in which the person has been detected and information indicating that a person has been detected (step S202). In the energy management server 1, the database updater 13, based on the presence-absence information received from the detection sensor 3, updates the detection results table 111 (step S203). The detection sensor 3 may also transmit the presence-absence information to the energy management server 1 if there is a change from the state in which a person is detected within a zone to the state in which a person is not detected in the zone.

When the entry-exit management system 2 detects entry of a person into the building or exit of a person from the building (step S204), the entry-exit management system 2 transmits entry-exit information to the energy management server 1 (step S205). In the energy management server 1, the database updater 13 updates the entry-exit table 112, based on the entry-exit information received from the entry-exit management system 2 (step S206).

When either one or both of the detection results table 111 and the entry-exit table 112 of the in-building database 11 is updated, the data processor 14 generates collection results that include the updated information of the detection results table 111 and/or the entry-exit table 112 (step S207). The data processor 14 requests the communicator 15 to transfer the collection results to the information device management server 5 (step S208). The communicator 15 transmits the collection results to the information device management server 5 (step S209).

When the data processor 14 updates the entry-exit table 112, it may include in the collection results a list that includes the personal IDs of all persons in the building. All the persons in the building are obtained by searching for the personal IDs having the state "In building" in the entry-exit table 112.

In the information device management server 5, the communicator 52 transmits to the information device controller 53 the collection results received from the energy management server 1 (step S210). The information device controller 53, based on the collection results, determines whether or not to transition the operating mode of the PC 6 or the shared device 7 to the energy-saving mode or transition to the stopped condition (step S211). If the information device controller 53 selects control to transition to the energy-saving mode or to the stopped state, it requests the network interface 54 to transfer to the PC 6 or the shared device 7 control information indicating the selected control (step S212). The network interface 54 transmits control information to the PC 6 or the shared device 7 that is the control target (step S213). The operations in step S211 to step S213 correspond to the second power consumption reducing processing illustrated in FIG. 11 or the third power consumption reducing processing illustrated in FIG. 12.

The PC 6 or shared device 7, in accordance with the control information received from the information device management server 5, transitions to operation in the energy-saving mode (step S214) and transmits to the information device management server 5 state information indicating the state of operating in the energy-saving mode (step S215). The state information includes, for example, information indicating the current power consumption and the operating mode.

In the information device management server 5, the network interface 54 transfers the state information received from the PC 6 or the shared device 7 to the information device controller 53 and the communicator 52 (step S216). Upon acquiring the state information, the information device controller 53 verifies that the control to transition to the energy-saving mode has been completed (step S217). If state information has not been obtained within a certain period of time from the PC 6 or the shared device 7 controlled using the control information, the information device controller 53 may transmit the control information once again. The communicator 52, via the network interface 54, transmits the acquired state information to the energy management server 1 (step S218).

In the energy management server 1, the communicator 15 transfers to the power consumption database 12 the state information received from the information device management server 5 (step S219). The power consumption database 12, based on the state information, updates the power consumption in each zone in the building (step S220). The facility device controller 16 collects power consumption information of the PCs 6 and shared devices 7 in each zone (step S221) to determine whether or not there is a facility device 4 operating in a zone in which PCs 6 and shared devices 7 are not being used (step S222). If there is a facility device 4 operating in a zone determined that the PCs 6 and the shared devices 7 are not used, the facility device controller 16 makes a request to stop or lower the operating level to the facility device 4 operating in that zone (step S223).

A zone in which it is determined that a PC 6 and a shared device 7 are not used is, for example, a zone in which the total value of power consumption of the PCs 6 and shared devices 7 is less than a certain value, and a zone that is determined that no person is using. The energy management server 1, based on the operation state of the PCs 6 and the shared devices 7 controlled by the information device management server 5, can reduce the power consumption without losing person's convenience, by stopping or reducing the operating level of facility devices 4 in the zone.

Figure 16:
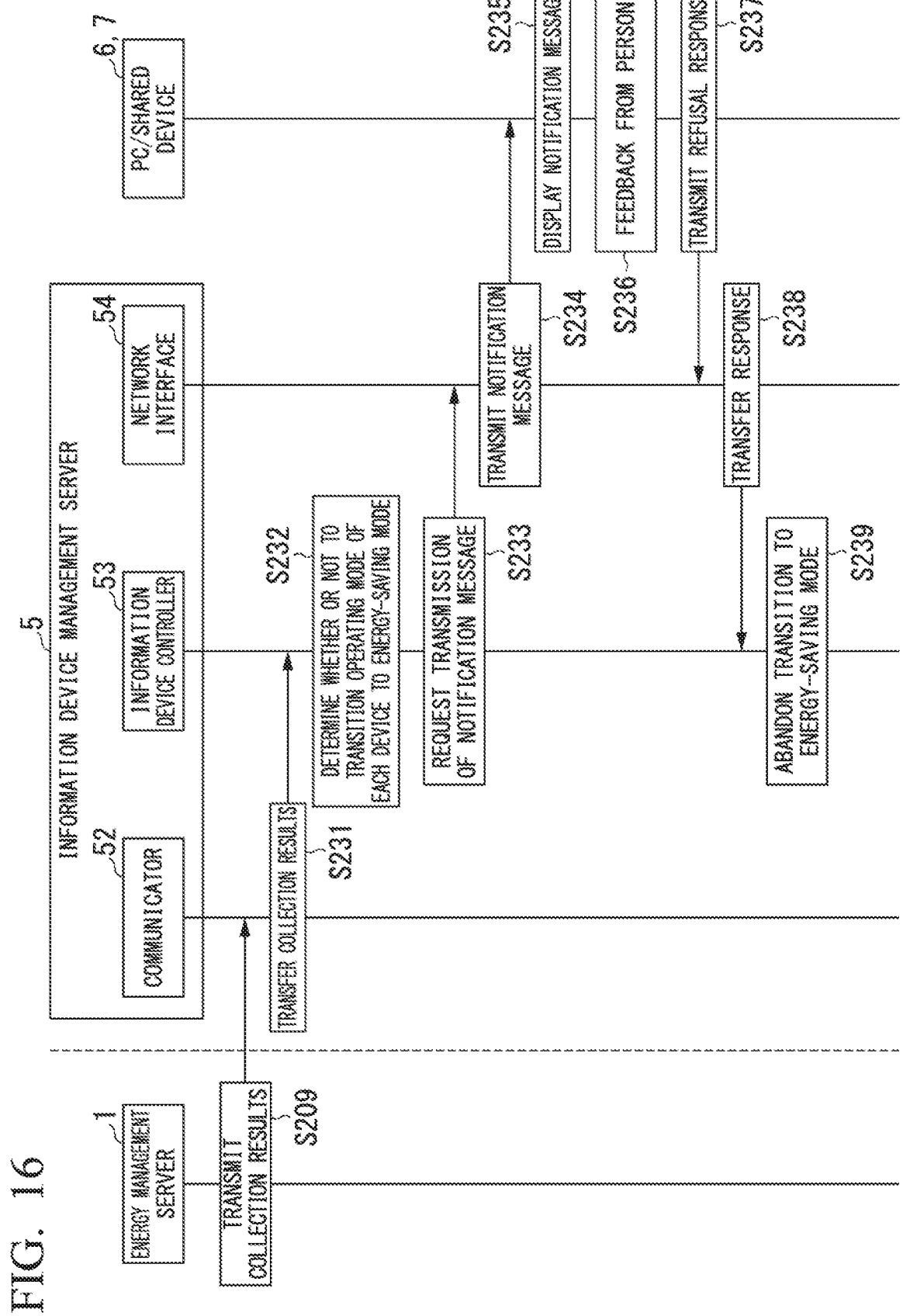
FIG. 16 is a fourth sequence diagram illustrating the operation in the overall management system of the first embodiment.

FIG. 16 is a sequence diagram illustrating the processing of the information device management server 5 controlling PCs 6 or shared devices 7, based on the collection results. The sequence illustrated in FIG. 6 corresponds to the case in which, in the first power consumption reducing processing illustrated in FIG. 10, there is feedback from the PC 6. The operation up until the information device management server 5 receives the collection results from the energy management server 1 is the same as the operation from step S201 to step S209 illustrated in FIG. 13.

In the information device management server 5, the communicator 52 transfers to the information device controller 53 the collection results received from the energy management server 1 (step S231). The information device controller 53, based on the collection results, determines whether or not to transition the operating mode of the PC 6 and the shared device 7 to the energy-saving mode or stopped state (step S232). If the information device controller 53 selects control to transition to the energy-saving mode or control to the stopped state, it requests the network interface 54 to transfer a notification message indicating execution of the selected control (step S233). The network interface 54 transmits the notification message to the PC 6 or the shared device 7 that is the control target (step S234).

The PC 6 or shared device 7 displays the notification message received from the information device management server 5 (step S235) and waits for a certain period of time for acceptance of feedback from the person using the PC 6 or the shared device 7. When feedback by the person is accepted (step S236), the PC 6 or shared device 7 transmits to the information device management server 5 a reply that refuses the control (step S237). Feedback by a person is, for example, refusal by the person of the stopping or transitioning to the energy-saving mode of the PC 6 or shared device 7 in order to reduce the power consumption.

In the information device management server 5, the network interface 54 transfers the refusal response received from the PC 6 or the shared device 7 to the information device controller 53 (step S238). Upon acquiring the refusal response, the information device controller 53 abandons the transition to the energy-saving mode with respect to the PC 6 or the shared device 7 that transmitted the refusal response (step S239).

In order to reduce the power consumption, the information device management server 5 transmits a notification message to the PC 6 or the shared device 7 selected as the target for a change of operating mode to query the person using the PC 6 or the shared device 7, so that a power consumption reduction that loses the convenience for the person is not done.

Figure 17:
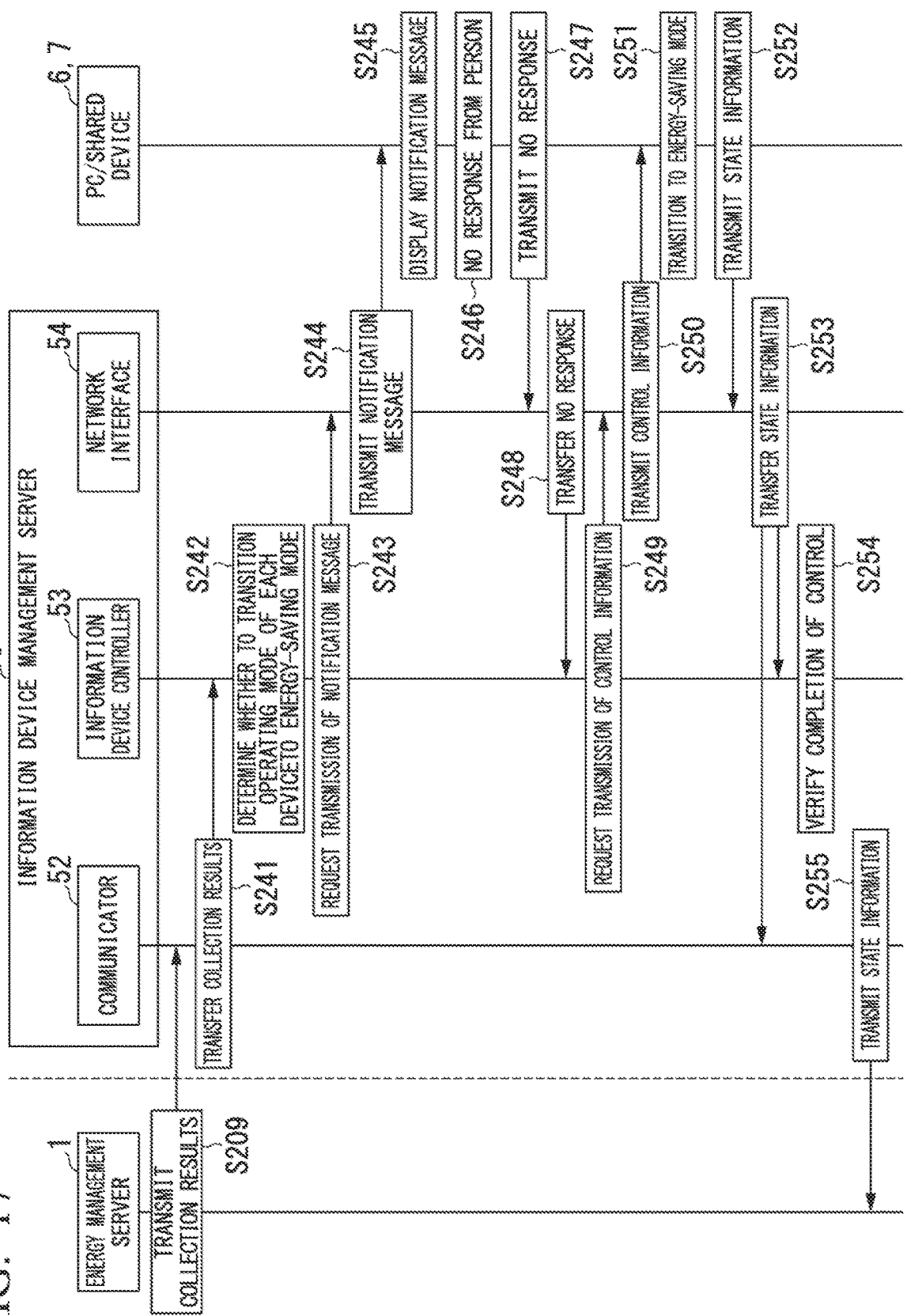
FIG. 17 is a fifth sequence diagram illustrating the operation in the overall management system of the first embodiment.

FIG. 17 is a sequence diagram illustrating the processing of the information device management server 5 controlling a PC 6 or a shared device 7, based on the collection results. The sequence illustrated in FIG. 7 corresponds to the case in which, in the first power consumption reducing processing illustrated in FIG. 10, there is no feedback from the PC 6. The operation up until the information device management server 5 receives the collection results from the energy management server 1 is the same as the operation from step S201 to step S209 illustrated in FIG. 13.

In the information device management server 5, the communicator 52 transfers to the information device controller 53 the collection results received from the energy management server 1 (step S241). The information device controller 53, based on the collection results, determines whether or not to transition the operating mode of the PC 6 and the shared device 7 to the energy-saving mode or stopped state (step S242). If the information device controller 53 selects control to transition to the energy-saving mode or control to the stopped state, it requests the network interface 54 to transfer a notification message indicating execution of the selected control (step S243). The network interface 54 transmits the notification message to the PC 6 or the shared device 7 that is the control target (step S244).

The PC 6 or shared device 7 displays the notification message received from the information device management server 5 (step S245) and waits for a certain period of time for acceptance of feedback from the person using the PC 6 or the shared device 7. If there is no response from the person during the waiting time, the PC 6 or the shared device 7 (step S246) transmits to the information device management server 5 a notification indicating that there has been to response from the person (step S247).

In the information device management server 5, the network interface 54 transfers the notification received from the PC 6 or the shared device 7 to the information device controller 53 (step S248). Upon receiving the notification indicating that there had not been a feedback from the person, the information device controller 53 makes a request to the network interface 54 to transmit control information to the PC 6 or the shared device 7 that is the target of power consumption reduction (step S249), and the network interface 54 transmits the control information to the PC 6 or the shared device 7 (step S250).

The PC 6 or the shared device 7, in accordance with the control information received from the information device management server 5, transitions to operation in the energy-saving mode (step S251) and transmits to the information device management server 5 state information indicating the state of operating in the energy-saving mode (step S252).

In the information device management server 5, the network interface 54 transfers the state information received from the PC 6 or the shared device 7 to the information device controller 53 and the communicator 52 (step S253). Upon acquiring the state information, the information device controller 53 verifies that the control to transition to the energy-saving mode has been completed (step S254). If state information has not been obtained within a certain period of time from the PC 6 or the shared device 7 controlled using the control information, the information device controller 53 may transmit the control information once again. The communicator 52, via the network interface 54, transmits the acquired state information to the energy management server 1 (step S255). The operation in the energy management server 1 after step S255 is the same as the operation from step S219 to step S223 illustrated in FIG. 15.

In order to reduce the power consumption, the information device management server 5 transmits a notification message to the PC 6 or the shared device 7 selected as the target for changing the operating mode and, if there is no response after querying the person, performs control so as to transition the PC 6 or the shared device 7 to the energy-saving mode. This operation enables the information device management server 5 to reduce the power consumption without losing convenience for the person.

The management system of the first embodiment uses information indicating the presence or absence of a person is each of a plurality of zones regarding a building and information indicating the entry and exit to and from the building to suppress the power consumed by information devices such as PCs 6 and shared devices 7 located in each of the zones, enabling reduction of the energy amount consumed regarding the building. By controlling printers, copiers, and multifunction printers provided in zone as the shared devices 7, the management system can reduce the amount of heat generated by the printers, the copiers, and the multifunctional printers, thereby reducing the load on air-conditioning equipment and also reducing the power consumed by the air-conditioning equipment.

At times of the day in which the power used within the building is at a peak, the information device controller 53 may perform power control so as to operate by energy stored in the secondary batteries those of the PCs 6 and the shared devices 7 provided with the secondary batteries. Also, the information device controller 53 may perform power control at times of the day having high electricity fees. The criteria or policy when performing such power control may set by the administrator or the operator of the information device management server 5, or may be set by the information device controller 53, based on the usage state of the KVM and CPU of each PC 6. If the information device controller 53 sets the criteria, for example, a PC 6 having a low frequency of use of the KVM and CPU is stopped, rather than being transitioned to the energy-saving mode.

The data processor 14 may, based on the power consumption or electric energy consumption stored in the power consumption database 12, make request the information device management server 5 to reduce the power consumption of a zone. The zone for which the power consumption reduction request is made, for example, is a zone in which the total value of power consumption of the facility devices 4, the PCs 6, and shared devices 7 exceeds a threshold, or a zone having a total amount of power consumption that is a certain proportion above the total value of power consumption in other zones.

After the information device management server 5 reduces the power consumption with respect to PCs 6 and shared devices 7, the facility device controller 16 may control the facility devices 4 based on the degree of reduction of power consumption in each zone. For example, if the degree of reduction by the information device management server 5 of the power consumption of the of the PCs 6 and the shared devices 7 is smaller than a threshold, the facility device controller 16 may perform control that reduces the power consumption of the facility devices 4 in the zone to which the PCs 6 and the shared devices 7 belong.

The description has been for the case in which, in the information device table 511, one zone ID is associated with an information device ID. However, a plurality of zone IDs may be associated with one information device ID. For example, if the frequency with which a person who uses a laptop computer is in a plurality of zones is high, by associating a plurality of zones with the information device ID of that computer, power consumption can be reduced, while ensuring the convenience for that person.

In the present embodiment, the description has been for a configuration in which, in the energy management server 1, the database updater 13 stores presence-absence information obtained from the detection sensors 3 into the detection results table 11*l*, and the data processor 14 collects information stored in the detection results table 111 and transmits the obtained information to the information device management server 5.

However, the energy management server 1 may transmit to the information device management server 5 presence-absence information obtained from each detection sensor 3. If the information device management server 5 receives presence-absence information, a sensor table into which are stored the combination of a sensor ID that uniquely identifies a detection sensor 3 and the information device ID of an information device located in the person-detection range of the detection sensor 3 may be stored into the information device database 51. By having a sensor table, the information device management server 5 can control the information devices based on the presence-absence information.

Figure 18:
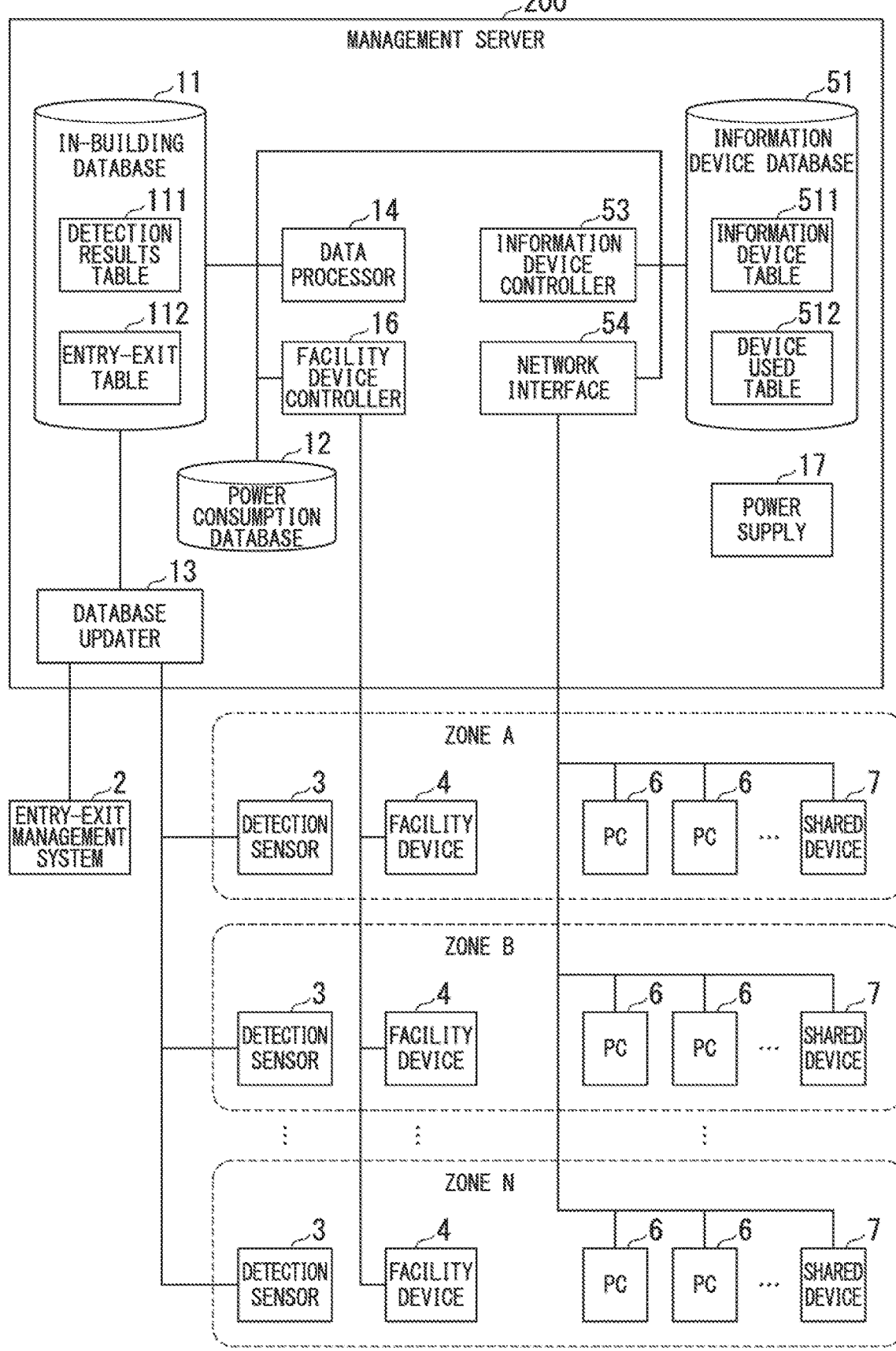
FIG. 18 is a block diagram illustrating another example of the configuration of a management system in the first embodiment.

The management system in the first embodiment may have a management sever 200 instead of having 2 servers of the energy management server 1 and the information device management server 5. FIG. 18 is a block diagram illustrating another example of the configuration of the management system in the first embodiment. The management server 200 has an in-building database 11, a power consumption database 12, a database updater 13, a data processor 14, a facility device controller 16, a power supply 17, an information device database 51, an information device controller 53, and a network interface 54. By configuring the energy management server 1 and the information device management server 5 as one server, the communicators 15 and 52 for communicating between an energy management server 1 and an information device management server 5 are omitted. The power supply 55 is also omitted. By using the management server 200, one server may execute processing performed by the energy management server 1 and the information device management server 5.

Second Embodiment

Figure 19:
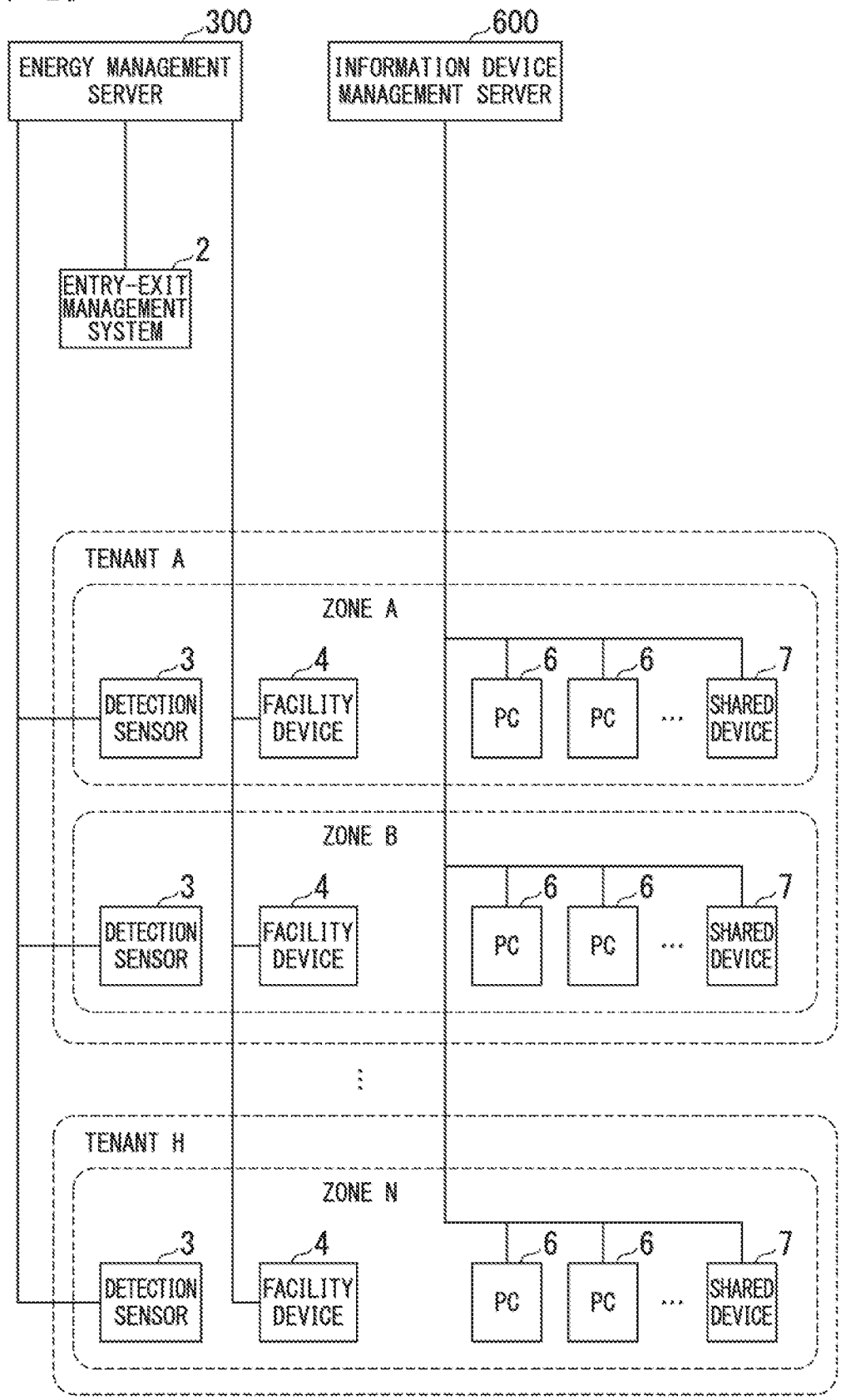
FIG. 19 is a block diagram illustrating an example of the configuration of a management system in a second embodiment.

FIG. 19 is a block diagram illustrating an example of the configuration of a management system of a second embodiment. The management system reduces the energy consumed by facility devices provided in a building and the energy consumed by at least one information device used in the building. In the following description, the case where the building is an office building and a plurality of tenants exist in the office building will be described.

The management system in the second embodiment has an energy management server 300, an entry-exit management system 2, a plurality of detection sensors 3, a plurality of facility devices 4, and an information device management server 600. The energy management server 300 may be provided in a building that is targeted for energy reduction by the management system, or may be provided in a location different from the building. If the energy management server 300 is provided in a location different from the building, the energy management server 300 communicates with the detection sensor 3 and the facility device 4 provided in the building via a network constituted using one or both of a cable circuit or a wireless circuit. The information device management server 600, similar to the energy management server 300, may be provided in the building or in a location different from the building. One or both of the energy management server 300 and the information device management server 600 may be constituted using cloud computing. The building that is the target of energy reduction by the management system may be multiple, may be a group of a plurality of office buildings, or may be a plurality of buildings constructed in some legion.

The energy management server 300 acquires entry-exit information regarding entering and exiting the building from the entry-exit management system 2. The entry-exit management system 2 detects a person entering the building that is being managed and a person exiting from the building, and generates entry-exit information based on the detection result. The energy management server 300 acquires presence-absence information from each of a plurality of detection sensors 3 provided within the building. The detection sensors 3 are provided in each of a plurality of zones regarding the building. Each of the detection sensors 3 determines the presence or absence of a person or persons in the zone, and generates presence-absence information based on the determination result. The presence-absence information includes information identifying the zone and information indicating whether or not a person or persons are in the zone. A detection sensor 3 has, for example, an image sensor or an infrared sensor, and detects the presence/absence or the movement of a person or persons, based on the output from the sensor. If the detection accuracy of the detection sensor 3 is high and can detect the number of persons, the detection sensor 3 may notify the energy management server 300 of presence-absence information that indicates the number of persons, rather than the presence/absence of a person or persons.

Zones in the second embodiment art established based on the section lent to tenants. For example, the floor of each floor in the building may be divided into a plurality of sections, and each section may be defined as a zone. The zone may also be established based on a policy of energy reduction.

The energy management server 300 controls the facility devices 4 provided in each zone, based on entry-exit information acquired from the entry-exit management system 2 and the presence-absence information acquired from the detection sensors 3. The facility devices 4 are provided in the building, for which the consumed electrical power changes directly or indirectly in response to the operation state. A facility device 4 is, for example, a lighting device or air-conditioning equipment, an air intake or exhaust fan, a water-feed pump, a hot-water supplier, or blinds provided at a window. Although blinds are not a device that constantly consumes energy, the amount of sunlight from the window is changed by opening and closing the blinds, thereby indirectly changing the power consumed by air-conditioning equipment and the like.

The energy management server 300 collects the entry-exit information and the presence-absence information and transmits the data obtained by the collecting to the information device management server 600 as collection results. The energy management server 300 and the information device management server 600 are connected to enable communication. The energy management server 300 and the information device management server 600 may be connected by a dedicated circuit or a local area network, or may be connected via the Internet. If the energy management server 300 and the information device management server 600 communicate via the Internet, the energy management server 300 and the information device management server 600 may use a VPN (virtual private network) to communicate.

The information device management server 600 acquires the presence/absence of a person in each zone in the building and the entry and exit to and from the building from the collection results. The information device management server 600, based on information regarding persons in each zone, controls the information devices belonging to each zone and reduces the power consumed by the information devices in the building. An information device is a PC 6 or shared device 7 used by a person or persons. The PC 6 is a laptop or a desktop computer. A shared device 7 is a printer, a copier, a multifunction printer, a hub enabling communication between computers, a network device such as a switch or wireless LAN access point, or a device shared by a plurality of persons, such as an IP telephone. The information device management server 600 acquires state information indicating the power or electric energy consumed by the PCs 6 and the shared devices 7 and feeds back the acquired information to the energy management server 300. At least one detection sensor 3 and one or a plurality of facility devices 4 are provided in each zone of the building, and one or both of a PC 6 and shared device 7 belong to at least one zone. The information device management server 600 and the PCs 6 and shared devices 7 may be connected by a dedicated circuit or a local area network, or may be connected via the Internet. If the information device management server 600 and the PCs 6 and shared devices 7 communicate via the Internet, the information device management server 600 and the PCs 6 and shared devices 7 may use a VPN to communicate.

Figures 20, 21:
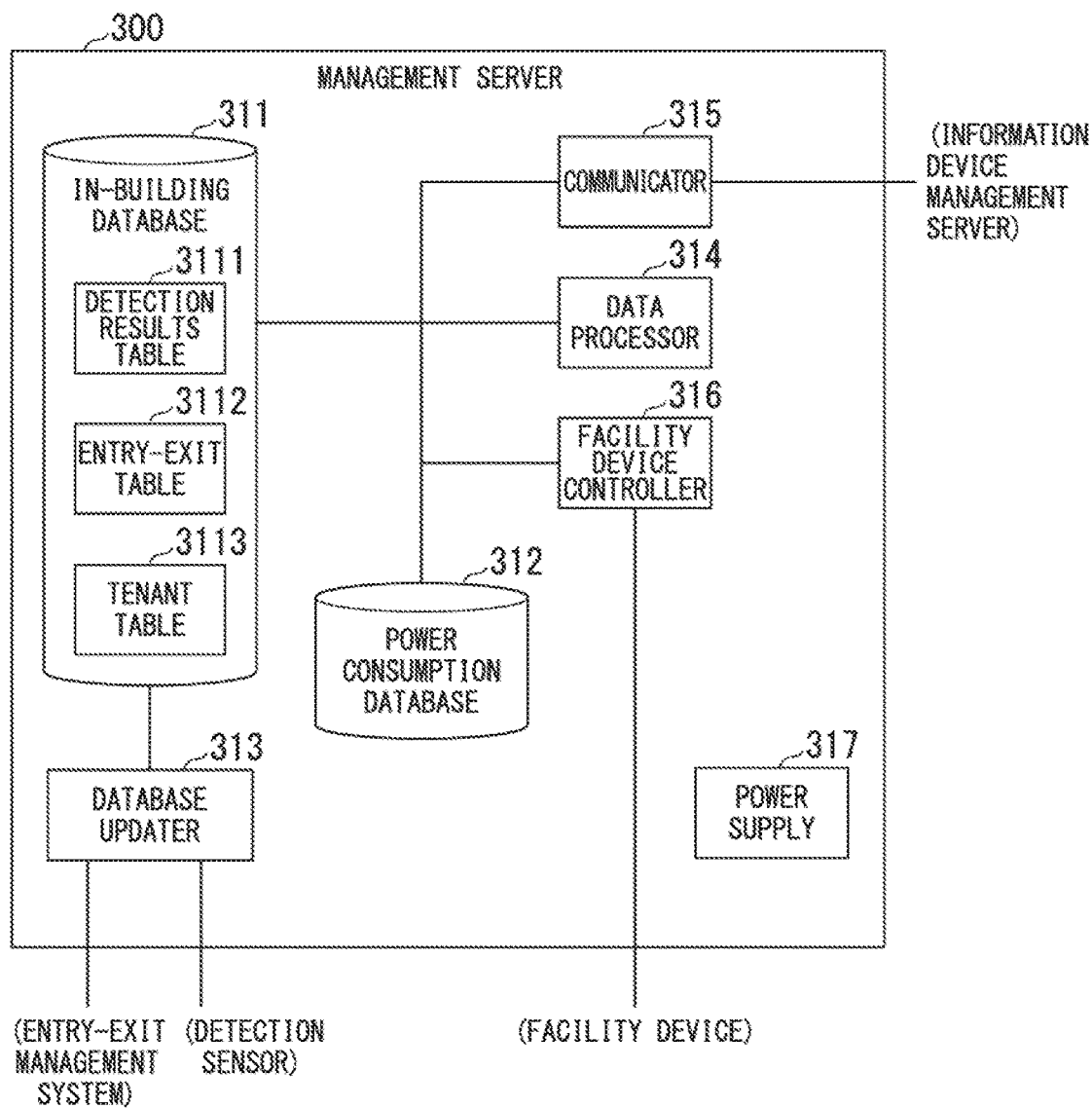
FIG. 20 is a block diagram illustrating an example of the configuration of an energy management server in the second embodiment.
FIG. 21 illustrates an example of a detection results table in the second embodiment.

FIG. 20 is a block diagram illustrating an example of the configuration of the energy management server 300 in the second embodiment. The energy management server 300 has an in-building database 311, a power consumption database 312, a database updater 313, a data processor 314, a communicator 315, a facility device controller 316, and a power supply 317. The in-building database 311 stores a detection results table 3111, an entry-exit table 3112 and a tenant table 3113. The detection results table 3111 stores information indicating the presence/absence of persons in each zone. The entry-exit table 3112 stores the state of entry-exit for each person using the building or the presence or absence of a person in the building. The tenant table 3113 stores information indicating a zone rented by each tenant. Hereinafter, the zone rented by the tenant is also referred as a zone belonging to the tenant or a zone used for the tenant.

FIG. 21 illustrates an example of the detection results table 3111. The detection results table 3111 includes columns for the Zone ID item and the Person Present/Absent item. Rows exist for each zone. The Zone ID item stores a zone ID that uniquely distinguishes a zone (for example, ZONE #1). The zone ID is also referred as a section ID. The Person Present/Absent item stores whether a person is present or absent in the zone indicated by the zone ID in the same row. Present indicates that at least one person is detected. Absent indicates that no person is detected. For example, the detection results table 3111 in FIG. 21 stores that a person is absent from the zone indicated by ZONE #2. Although the detection results table 3111 in FIG. 21 is an example of columns having the two items Zone D and Person Present/Absent, the detection results table 3111 may include columns of other items. For example, a Time column of the time that the Person Present/Absent item was updated, and a column of the number of persons when the detection sensor 3 can detect the number of persons may be included.

FIG. 22 illustrates an example of the entry-exit table 3112. The entry-exit table 3112 includes columns for Personal ID item and for the State of entry-exit item. Rows exist for each individual person who enters and exits the building. The Personal D item stores a personal ID that uniquely distinguishes a person (for example PERSON #1) who enters and exits the building. The Tenant ID item stores a tenant ID that uniquely identifies a tenant to which a person indicated by the personal ID of the same row belongs. The State item of the entry-exit state stores whether a person indicated by the personal ID of the same row is in the building or has already exited the building, with "In building" and "Exited building". The combination of the personal ID and the tenant ID is predetermined. The State item of the entry-exit state in the entry-exit table 3112 is updated on the basis of the entry-exit information. For example, the entry-exit table 3112 of FIG. 22 stores that the person distinguished by PERSON #2 and belonged to tenant distinguished by TENANT #1 is currently in the building. Although the entry-exit table 3112 as the example illustrated in FIG. 22 has columns of the three items indicating the personal ID, the tenant ID and the entry-exit state, the entry-exit table may include columns of other items. For example, it may include a column of the time at which the entry-exit state was updated.

FIG. 23 illustrates an example of the tenant table 3113. The tenant table 3113 includes columns for Zone ID item and for Tenant ID item. Rows exist for each zone in the building. The Zone ID item stores a zone ID that uniquely distinguishes a zone (for example ZONE #2). The Tenant ID item stores a tenant ID that uniquely identifies a tenant (for example TENANT #1) using the zone indicated by the zone ID of the same row. For example, the tenant table 3113 of FIG. 23 stores that the zone distinguished by ZONE #2 belongs to the tenant indicated by TENANT #1. A tenant uses at least one zone.

Figure 24:
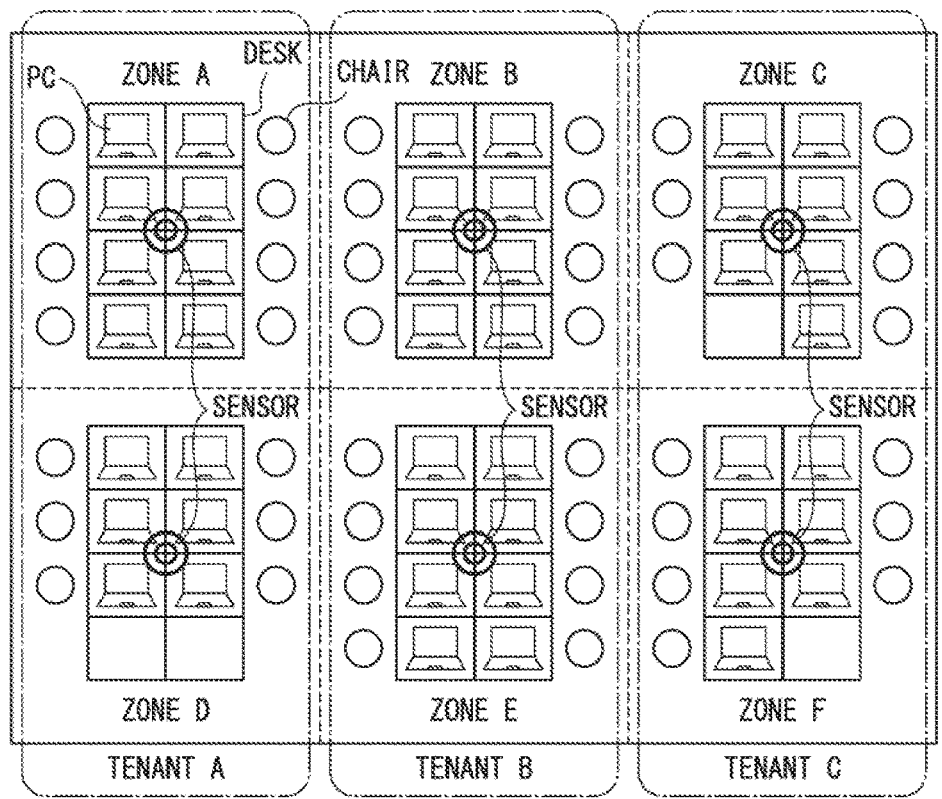
FIG. 24 is a drawing illustrating an example of zones in a building in the second embodiment.
Figure 25:
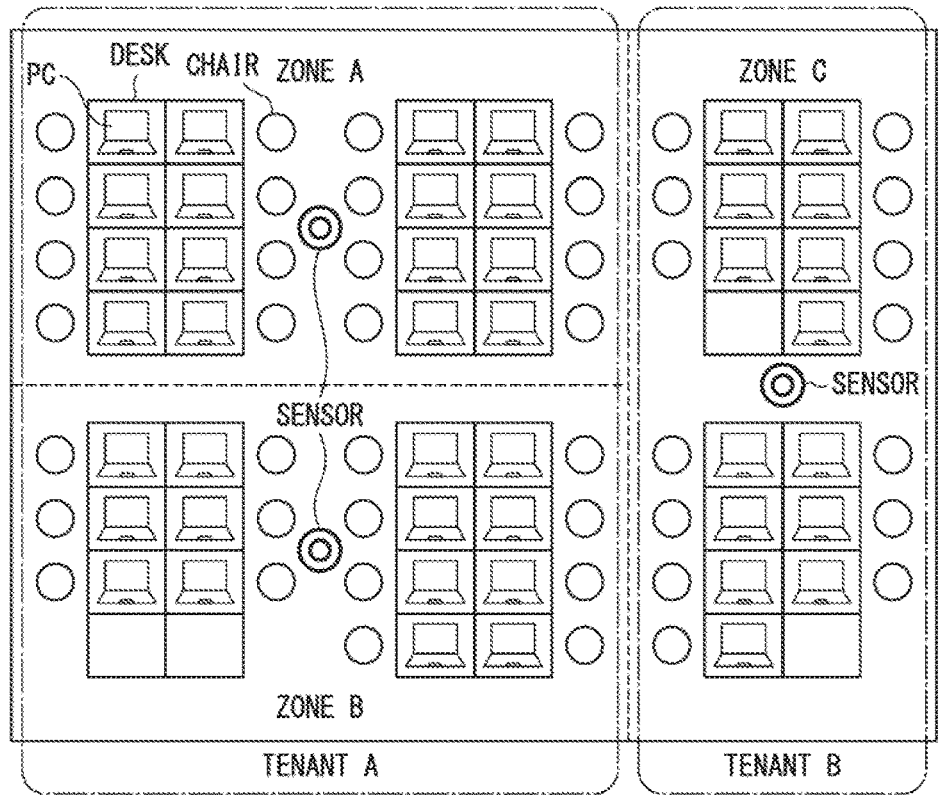
FIG. 25 is a drawing illustrating an example of zones in a building in the second embodiment.

The zones into which the region inside a building is divided will be described. FIG. 24 and FIG. 25 illustrate examples of zones in the building. In the example illustrated in FIG. 24, one floor in the building is divided into six zones and three tenants use two zones, respectively. FIG. 24 illustrates the case where the tenant A uses the zones A and D, the tenant B uses the zones B and E, and the tenant C uses the zones C and F. The detection sensors 3 for detecting a person is provided in each zone. The detection sensors 3 are, for example, mounted to the ceiling and sense the presence or absence of persons in each zone.

In the example illustrated in FIG. 25, one floor in the building is divided into three zones and two tenants use zones. FIG. 25 illustrates the case where the tenant A uses the zones A and B, and the tenant B uses the zone C. The detection sensors 3 for detecting a person is provided in each zone. The detection sensors 3 are, for example, mounted to the ceiling and sense the presence or absence of persons in each zone. The detection range of the detection sensors 3 in the example illustrated in FIG. 25 is wider than the detection range of the detection sensors 3 in the example illustrated in FIG. 24.

Referring back to FIG. 20, the description of the energy management server 300 will be continued. The power consumption database 312 stores, for each zone, the electric power consumption and the electric energy consumption within the building. The power consumption and the electric energy consumption of each zone are separated into the power consumption and the electric energy consumption of the facility devices 4 and the power consumption and the electric energy consumption of the information devices such as the PCs 6 and the shared devices 7 controlled by the information device management server 600. The electric energy consumption, for example, is stored with a collection unit of time of 3 hours, 12 hours, 1 day, or 1 week. The power consumption and the electric energy consumption of the facility devices 4 in the power consumption database 312 are collected with a fixed period and reflected in the power consumption database 312.

FIG. 26 illustrates an example of a power consumption database 312. The power consumption database 312 includes columns for each of the items of the zone IDs, the power of the information devices including PCs and shared devices, the power of facility devices including air-conditioning equipment and lighting devices, the total power, the electric energy of the information devices, the electric energy of the facility devices, and the total electric energy. Rows exist for each of the zones. The zone IDs are stored in the Zone ID items. The Information Device Power item includes items for PCs and shared devices and the like included in the information devices, and the values of the power consumed by PCs and shared devices and the like is stored therein. The facility device power item includes items for the air-conditioning equipment and lighting devices included in the facility devices, and the values of the power consumed by the air-conditioning equipment and light devices and the like is stored therein. The Total Power items stores total values of power consumed by the information devices and facility devices provided in the building. The Information Device Electric Energy item stores the value of the electric energy consumed by information devices in a period of time that is the collection unit. The Facility Device Electric Energy item stores the values of the electric energy consumed by facility devices in a period of time that is the collection unit.

Although in the power consumption database 312 illustrated in FIG. 26 the information devices are divided into PCs, shared devices, and other, other items may be included in the information devices. Also, although the facility devices are divided into air-conditioning equipment, lighting devices, and other, other items may be included in the facility devices. The values of power consumed by PCs and shared devices in the power consumption database 312, rather than being the value of the total of the power consumption of the PCs and shared devices belonging to a zone, may be the values of power consumed by the individual PCs or shared devices.

Referring back to FIG. 20, the description of the management system will be continued. When the database updater 313 acquires entry-exit information from the entry-exit management system 2, the database updater 313 updates the entry-exit table 3112, based on the entry-exit information. The entry-exit information includes a personal ID that uniquely identifies a person who has entered or exited the building and information indicating whether that person has entered or exited the building. The database updater 313 updates the state (entry-exit) in the entry-exit table 3112 corresponding with the personal ID included in the entry-exit information, based on the entry-exit information. When the database updater 313 acquires presence-absence information from the detection sensors 3 provided in each of the zones, the database updater 313 updates the detection results table 3111, based on the presence-absence information. The presence-absence information includes a zone ID that uniquely identifies the zone, and information indicating the presence or absence of a person or persons in that zone. The database updater 313 updates whether or not a person associated with the zone ID included in the presence-absence information is present/absence (Present or Absent), based on the presence-absence information.

The data processor 314 generates data, based on the presence-absence information acquired by the database updater 313, on the zone IDs of a plurality of zones of the building, and on the tenant table 3113. Specifically, the data processor 314 collects information stored in the detection results table 3111 and the entry-exit table 3112 and detects the zone IDs for which a change occurred in the information or personal IDs for the person. The data processor 314 may collect information at a fixed interval, or may collect information in response to a request from the information device management server 600. The data processor 314 outputs to the communicator 315 the collection results including the zone ID or the personal ID corresponding to information updated in the detection results table 3111 and the entry-exit table 3112 and makes a request to the communicator 315 to transmit the collection results. The data processor 314 may further include into the collection results the zone IDs of zones in which persons are present. The data processor 314 detects the tenant using the zone in which the state of detecting a person has changed based on the tenant table 3113 and adds the tenant ID of the detected tenant to the collection results. The data processor 314 collects the detection results table 3111 and the entry-exit table 3112 in the in-building database 311 at a fixed interval and generates the collection results as data. In this case, the collection results include information indicating the zones in which persons are present and the zones in which persons are not present, the personal IDs of persons currently in the building, and information indicating the tenant in which persons are present and the tenant in which persons are not present. The communicator 315 transmits to the information device management server 600 the collection results output from the data processor 314.

The facility device controller 316 controls the facility devices 4 in each zone of the building based on the detection results table 3111. For example, if there is no person in zones A and D, the facility device controller 316 stops facility devices 4 provided in zones A and D or lowers the operating level of the facility devices 4 so as to reduce the power consumption. The facility device controller 316 acquires the power and the electric energy consumed by the facility devices 4 in the building, and updates the power and the electric energy of the facility device in each zone stored in the power consumption database 312.

The power supply 317 supplies power received from an external generator or commercial power mains to the in-building database 311, the power consumption database 312, the database updater 313, the data processor 314, the communicator 315, and the facility device controller 316 provided in the energy management server 300. The power supply 317 may have a secondary battery or the like so that the power supply 317 can continue to supply of power, if the power supply 317 cannot receive power from the external generator or commercial power mains.

Figures 27, 28:
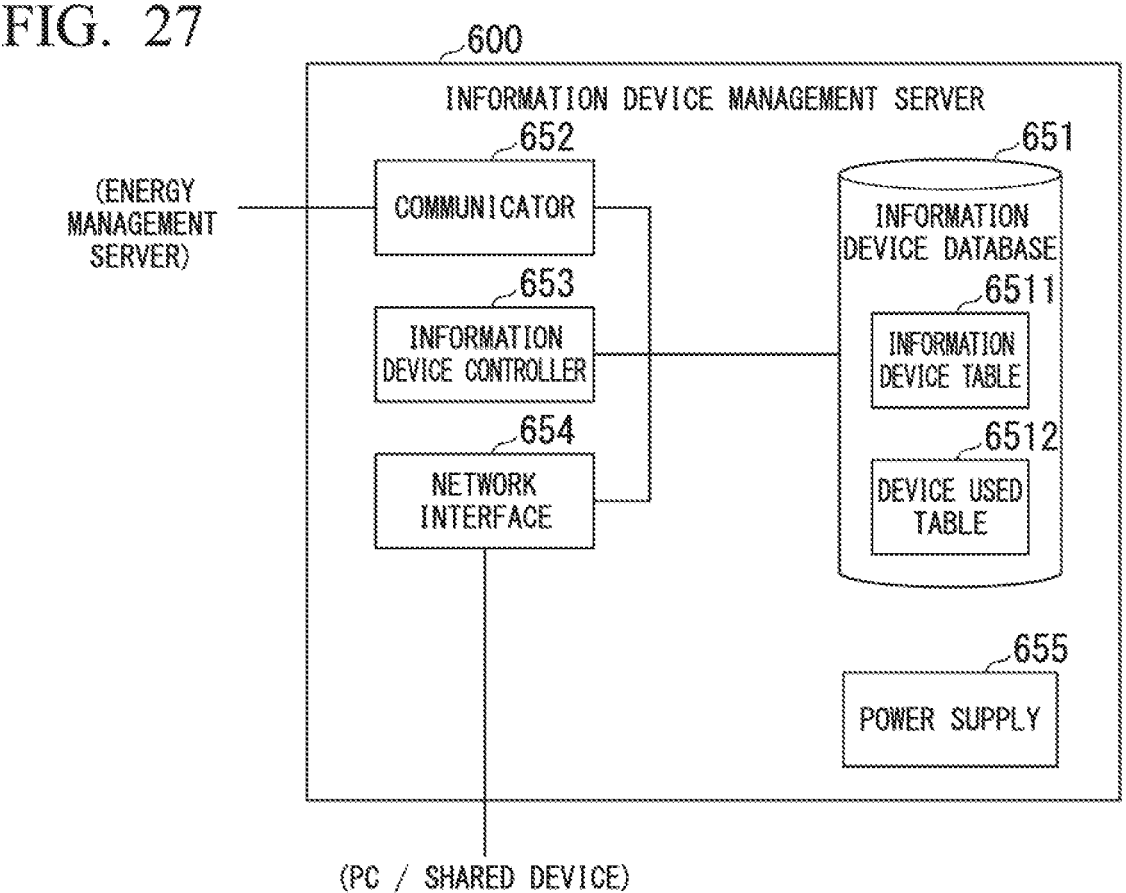
FIG. 27 is a block diagram illustrating an example of the configuration of an information device management apparatus in the second embodiment.
FIG. 28 illustrates an example of an information device table in the second embodiment.

FIG. 27 is a block diagram illustrating an example of the configuration of the information device management server 600. The information device management server 600 has an information device database 651, a communicator 652, an information device controller 653, a network interface 654, and a power supply 655. The information device database 651 stores an information device table 6511 and a device used table 6512. The information device table 6511 stores the zones and the tenants to which the PCs 6 and the shared devices 7 belong. Specifically, it stores combinations of information device IDs that uniquely distinguish the PCs 6 and the shared devices 7, zone IDs that indicate the zones to which the PCs 6 or shared devices 7 belong and tenant IDs that indicate the tenants which use the zones. For example, even if the PC 6 is a laptop computer that a person can carry around and use, the PC 6 belongs to some zone. The laptop PC 6 belongs to a tenant that uses a zone to which it belongs. For example, a laptop PC 6 is made to belong to the zone in which it is mainly used. That is, all of the PCs 6 and all of the shared devices 7 belong to a zone and a tenant. The device used table 6512 stores information indicating the PCs that are used by persons. Specifically, the device used table 6512 stores combinations of personal IDs of persons and information device IDs that uniquely distinguish the PCs 6.

FIG. 28 illustrates an example of an information device table 6511. The information device table 6511 includes columns for the Information Device ID item, for the Zone ID item and for the Tenant ID item. Rows exist for each information device. The Information Device ID item stores an information device ID that distinguishes an information device (for example PC #1). The Zone ID item stores a zone ID indicating the zone to which the information device distinguished by the information device ID of the same row belongs. The tenant ID item stores a tenant ID indicating the tenant to which the information device distinguished by the information device ID of the same row belongs. In other words, the Tenant ID item stores a tenant ID indicating the tenant using the zone to which the information device distinguished by the information device ID of the same row belongs. That is, the information device table 6511 stores combinations of information device IDs of information devices, zone IDs of zones to which the information devices belong and tenant IDs of tenants to which the information devices belong. For example, the information device table 6511 of FIG. 28 stores that the information device distinguished as SHARED DEVICE #2 is mainly used in the zone indicated by ZONE #1 and that the information device distinguished as SHARED DEVICE #2 belongs to the tenant indicated by TENANT #1. Although an example is illustrated in which one information device ID, one zone ID and one tenant ID are associated with each other in FIG. 28, a plurality of zone IDs may be associated with an information device ID.

Figures 29, 30:
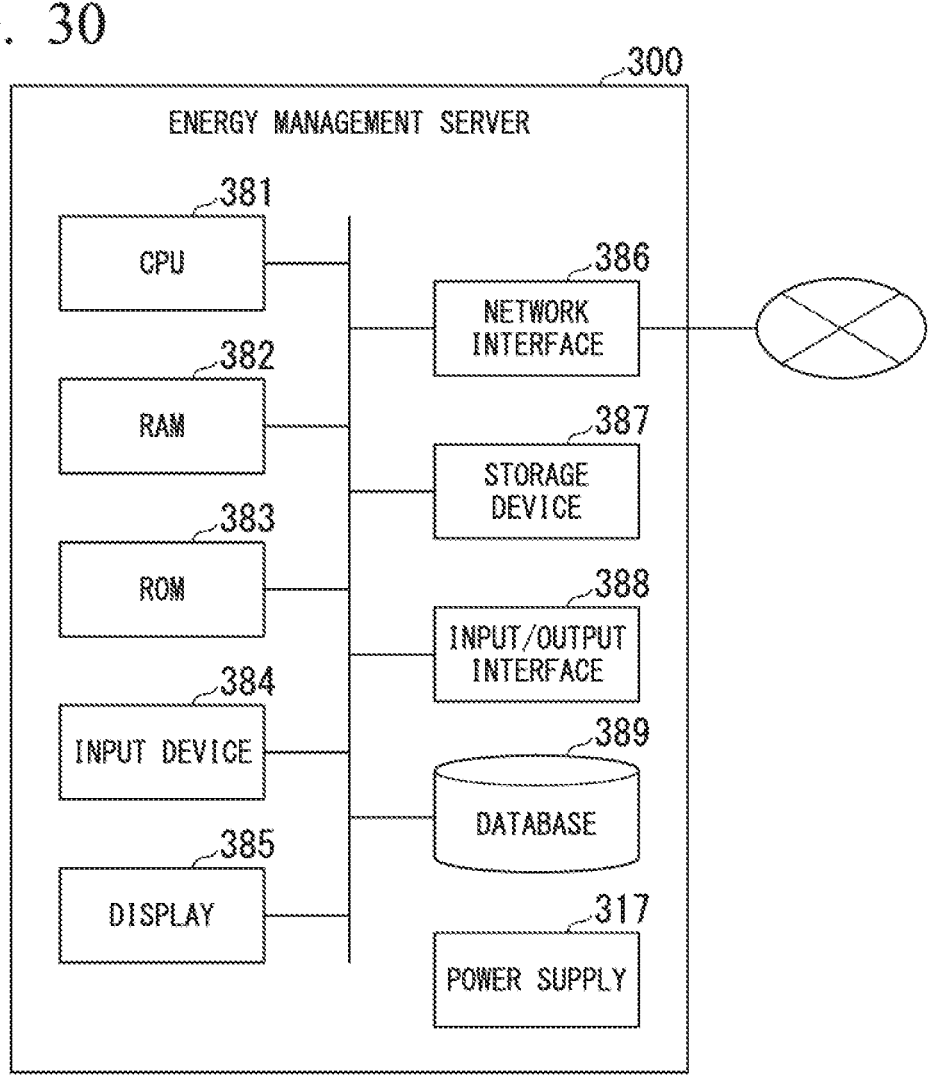
FIG. 29 illustrates an example of a device used table in the second embodiment.
FIG. 30 is a block diagram illustrating an example of the hardware configuration of an energy management server.

FIG. 29 illustrates an example of the device used table 6512. The device used table 6512 includes columns for the Personal ID item and the Information Device ID item. Rows exist for each person entering and exiting the building. The Personal ID item stores personal IDs (for example, PERSON #1). The Information Device II) item stores information device IDs that indicate information devices used by a person identified by the personal ID in the same row. For example, the device used table 6512 of FIG. 29 stores that the person distinguished as PERSON #1 uses the information device distinguished as PC #1. Although an example has been illustrated in which there is a one-to-one correspondence between the personal IDs and the information device IDs in FIG. 29, if a person uses a plurality of information devices, a plurality of information device IDs may be associated with a personal ID.

Referring back to FIG. 27, the description of the information device management server 600 will be continued. The communicator 652 communicates with the energy management server 300. The communicator 652 receives the collection results as data transmitted from the energy management server 300, and outputs the collection results to the information device controller 653. The information device controller 653, based on the information device table 6511 and the device used table 6512 stored in the information device database 651, and collection results as data, selects a PC 6 or a shared device 7 as a target for reduction of power consumption. The information device controller 653 controls the selected PC 6 or shared device 7 so as to suppress the power consumed by the PC 6 or the shared device 7. The information device controller 653 acquires from the PCs 6 and the shared devices 7 state information after controlling the PCs 6 or the shared devices 7. The information device controller 653 transmits the acquired state information to the energy management server 300, via the communicator 652. The state information includes information device IDs identifying PCs 6 or the shared devices 7 that were targets for reduction of power consumption, the zone IDs of zones to which the PCs 6 and the shared devices 7 belong, and information indicating reduced power consumption.

The network interface 654 communicates with PCs 6 and shared devices 7 located inside the building. The network interface 654 transmits the control information generated by the information device controller 653 to a PC 6 or a shared device 7. The network interface 654 receives state information from the PC 6 or the shared device 7 that is the control target and makes a request to the communicator 652 to transmit the received state information to the energy management server 300.

The power supply 655 supplies power received from an external generator or commercial power mains to the information device database 651, the communicator 652, the information device controller 653, and the network interface 654 of the information device management server 600. Similar to the power supply 317 provided in the energy management server 300, the power supply 655 may have a secondary battery or the like, so that the power supply 655 can continue to supply of power, if the power supply 655 cannot receive power from the external generator or commercial power mains.

FIG. 30 is a block diagram illustrating an example of the hardware configuration of the energy management server 300. The energy management server 300 has a CPU 381, a RAM 382, a ROM 383, an input device 384, a display 385, a network interface 386, a storage device 387, an input/output interface 388, a database 389, and a power supply 317. The CPU 381 reads out a program stored non-temporarily in the storage device 387, which is constituted by a HDD or SSD (solid-state drive), or in the ROM 383 into the RAM 382, and executes the read-out program. The CPU 381, by executing processing in response to operation by a user or administrator input using the input device 384, such as a mouse or keyboard, operates as the database updater 313, the data processor 314, and the facility device controller 316. The network interface 386 operates as the communicator 315. The database 389 operates as the in-building database 311 and the power consumption database 312.

The CPU 381, via the input/output interface 388, acquires entry-exit information from the entry-exit management system 2 and acquires presence-absence information from each of the detection sensors 3. The CPU 381 operating as the database updater 313, based on the acquired entry-exit information and presence-absence information, updates the information stored in the database 389 operating as the in-building database 311 and the power consumption database 312. The CPU 381 operating as the data processor 314 collects information stored in the database 389 operating as the in-building database 311 and the power consumption database 312. The network interface 386 operating as the communicator 315 transmits the collection results obtained by the collection to the information device management server 600. The display 385 displays information of the power consumption database 312 included in the database 389. The display 385, for example, displays the table illustrated in FIG. 26. By displaying for each zone the power consumed by the facility devices and the information devices, the energy management server 300 enables monitoring of the power consumed by all devices related to the building. In this manner, the energy management server 300 may be implemented by hardware having the CPU 381 that executes a program.

Similar to the energy management server 300, the information device management server 600 may be implemented by hardware having a CPU that executes a program. In that case, the CPU 381 operates as the information device controller 653, by executing processing in response to an operation by a user or administrator input to the input device 384 such as a mouse or keyboard.

Figure 31:
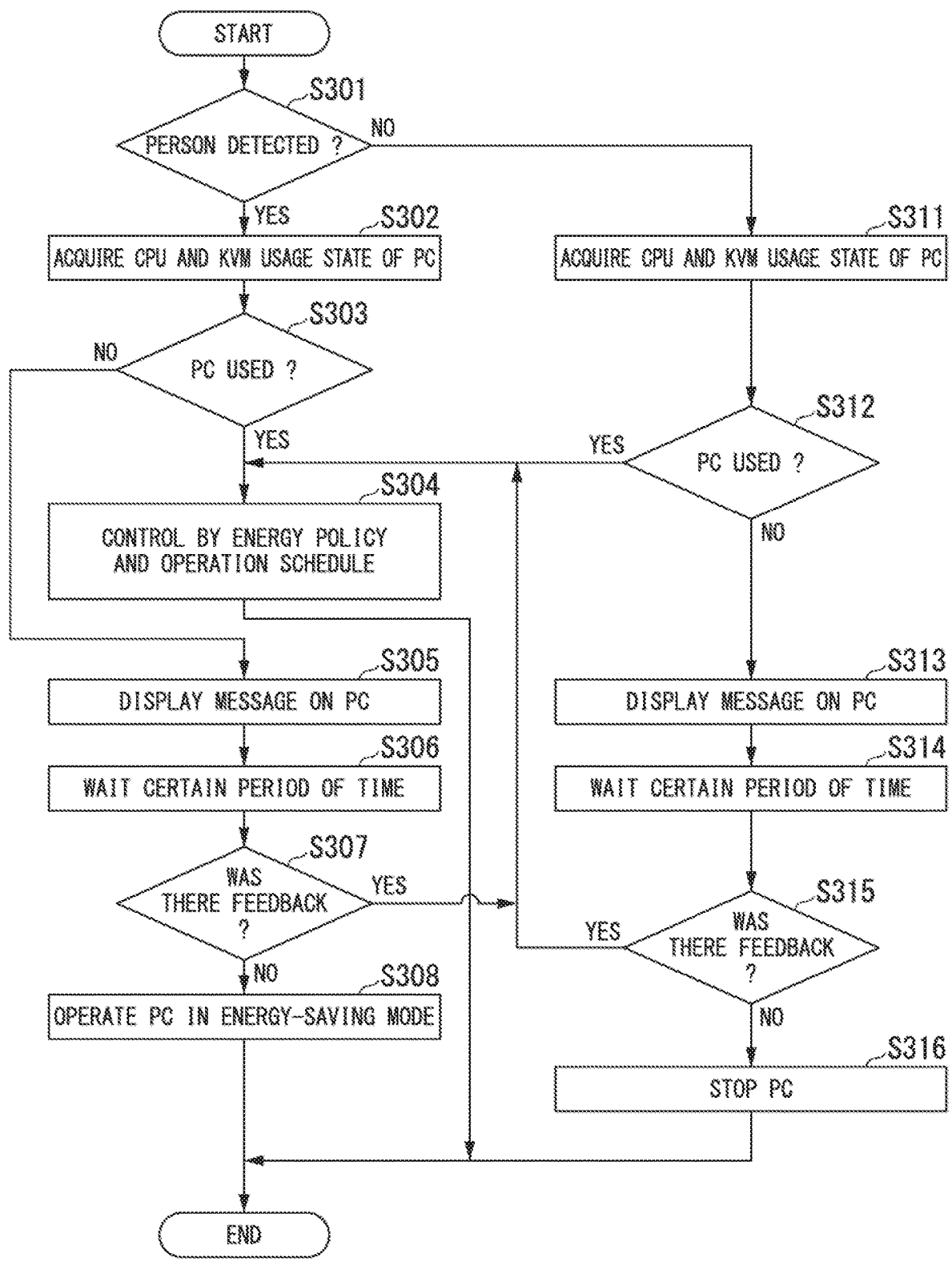
FIG. 31 is a flowchart illustrating the operation of a fourth power consumption reducing processing.

The processing by the information device management server 600 to reduce the power consumption of the PCs 6 and the shared devices 7 will now be described. FIG. 31 is a flowchart illustrating the operation of the fourth power consumption reducing processing. The fourth power consumption reducing processing is performed by the information device management server 600 to reduce the power consumption of a PC 6. Upon acquiring the collection results from the energy management server 300, the information device management server 600 performs the fourth power consumption reducing processing. In the fourth power consumption reducing processing the information device management server 600 uses information indicating the presence or absence of a person in one or more zones used for each tenant. The fourth power consumption reducing processing is performed for each tenant. That is, the processing target zone includes one or more zones used by the tenant.

In the information device management server 600, the information device controller 653 determines whether or not a person is detected in a processing target zone (step S301). If a person is detected in the processing target zone (YES at step S301), the information device controller 653 reads out an information device ID of a PC 6 belonging to the processing target zone from the information device table 6511, and acquires the usage state of the CPU and KVM in the PC 6 identified by the read-out information device ID (step S302). KVM, as used herein, means keyboard, video, and mouse.

Based on the usage state of the CPU and the KVM, the information device controller 653 determines whether or not the PC 6 is being used by a person (step S303). In the determination at step S303, for example, if the usage rate of the CPU exceeds a threshold or if the KVM is used at least one time over a certain period of time, the information device controller 653 determines that the PC is being used. If, however, the usage rate of the CPU is below the threshold and also the KVM has not been used for a certain period of time, the information device controller 653 determines that the PC is not being used.

If the PC 6 is determined to be in use (YES at step S303), the information device controller 653, based on a pre-established energy policy and an operation schedule with respect to PCs 6 and shared devices 7, performs control of the PC 6 (step S304) and ends the processing. In this case, the energy policy is, for example, a policy of reducing consumption energy of the information devices belonging to a zone if the power consumption of information devices in the zone exceeds a certain amount, or a policy of driving a PC 6 having a secondary battery using the secondary battery if the power consumption in a zone exceeds a certain amount. An operation schedule indicates operation according to the time in which, rather than reducing the power consumption of PCs 6 during working hours, the PCs 6 are stopped or placed in the stopped state outside of working hours.

If the determination at step S303 is that the PC is not being used (NO at step S303), the information device controller 653 determines that, although the PC 6 is not being used, there is a possibility that a PC 6 will be used because of a person being in the zone, and causes display on the PC 6 of a message indicating a change of the operating mode of the PC 6 to the energy-saving mode (step S305), and waits for a certain period of time (step S306). The information device controller 653 determines whether or not there is feedback from the PC 6 on which the message was displayed while waiting for the certain period of time (step S307).

If there had been feedback (YES at step S307), the information device controller 653 determines that the PC 6 will be used shortly and proceeds to the processing of step S304. If there has been no feedback (NO at step S307), the information device controller 653 determines that the PC 6 will not be used for a while, performs control to operate the PC 6 in the energy-saving operating mode (step S308), and ends the processing. In this case, the operating of the PC 6 in the energy-saving mode means, for example, changing the operating mode of the PC 6 to the sleep mode or the hibernation mode. In the step S308, the information device controller 653 may further cause the PC 6 to lower the brightness on the screen or stop the display on the screen.

If a person has not been detected in the processing target zone at step S301 (NO at step S301), the information device controller 653 reads out the information device ID of the PC 6 belonging to the processing target zone from the information device table 6511 and acquires the usage state of the CPU and KVM in the PC 6 identified by the read-out information device ID (step S311). Based on the usage state of the CPU and KVM, the information device controller 653 determines whether or not the PC 6 is being used by a person (step S312). If the determination is that the PC 6 is being used (YES at step S312), the information device controller 653 proceeds to the processing of step S304.

If the determination at step S312 is that the PC is not being used (NO at step S312), the information device controller 653 causes display on the PC 6 of a message indicating a change of the operating mode of the PC 6 to the energy-saving mode (step S313), and waits for a certain period of time (step S314). The information device controller 653 determines whether or not there is feedback from the PC 6 on which the message was displayed while waiting for the certain period of time (step S315).

If there had been feedback (YES at step S315), the information device controller 653 determines that the PC 6 will be used shortly and proceeds to the processing of step S304. If there had been no feedback (NO at step S315), the information device controller 653 determines that there is no person in the zone to which the PC 6 belongs and also that the PC 6 is not being used, performs control to stop the PC 6 (step S316), and ends the processing. In this case, stopping the PC 6 may mean ending all of the applications running on the PC 6 and shutting down the PC 6 to make the power consumption substantially zero. In the step S316, the information device controller 653 may perform control to operate the PC 6 in the energy-saving mode, similar to the control in the step S308. The information device controller 653 may further cause the PC 6 to lower the brightness on the screen or stop the display on the screen.

The fourth power consumption reducing processing illustrated in FIG. 31 is performed for each tenant. The processing from step S302 to step S316 is performed with respect to PCs 6 that is associated with the tenant ID included in the collection results among the PCs 6 stored in the information device table 6511. The information device management server 600 performs the fourth power consumption reducing processing, thereby enabling a reduction of the power consumption of PCs 6, based on the presence or absence of a person in each of the zones.

When no person is detected in all the zones belonging to a certain tenant, the information device management server 600 performs control to stop the PC 6 after verifying the usage state of the CPU and the KVM with respect to the PC 6 belonging to the zones belonging to the tenant. By verifying the usage state in this manner, the power consumption can be reduced without losing convenience for a person using a PC 6 temporarily in a zone other than the processing target zone. By the information device management server 600 verifying not only the results of the detection sensor 3 detecting a person but also the usage state of each PC 6 and KVM, it is possible to control the operating mode of the PCs 6 appropriately, even if the detection sensor 3 made an erroneous detection or if a person simply passing through a zone was detected.

In the fourth power consumption reducing processing, the information device management server 600 may use entry-exit information included in the collection results. For example, the information device management server 600 identifies, of PCs 6 belonging to a zone, of the plurality of zones, in which a person is not detected, a PC 6 currently being used by a person in the building, based on entry-exit information and the device used table 6512, and may exclude the identified PC 6 from the control targets.

Figure 32:
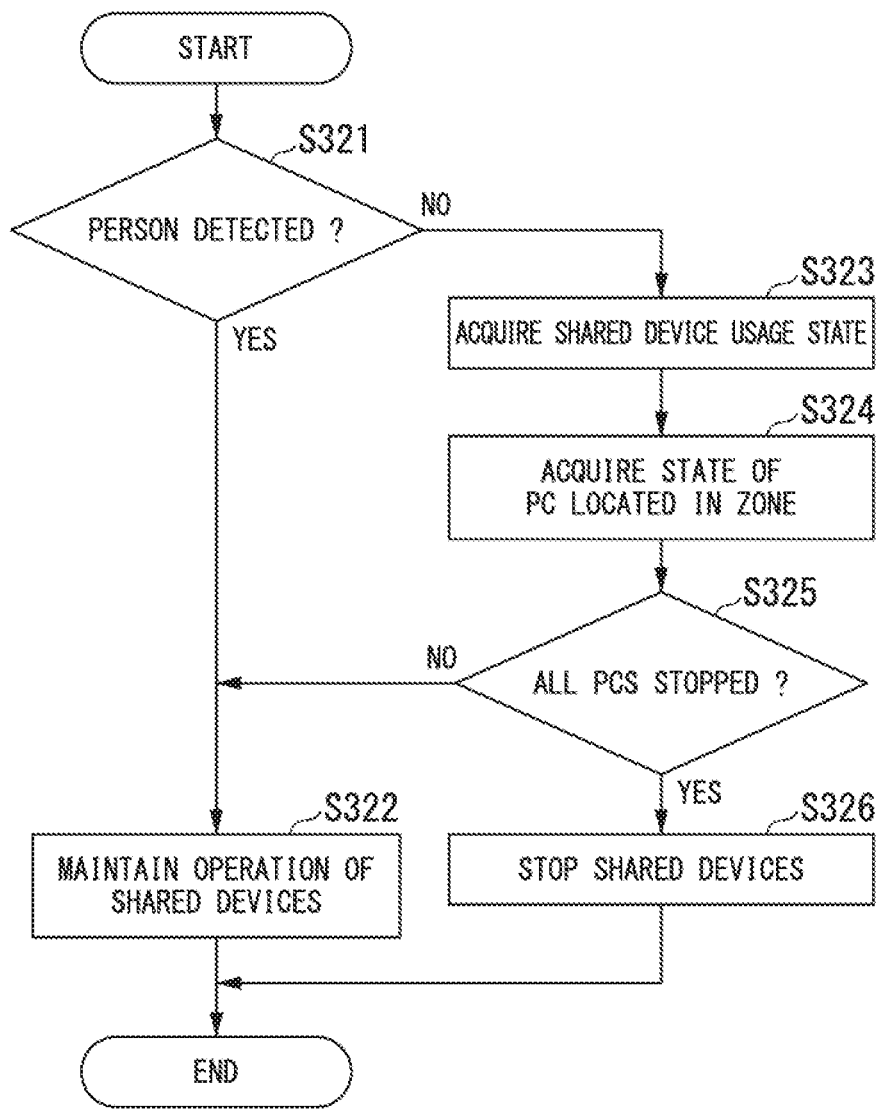
FIG. 32 is a flowchart illustrating the operation of a fifth power consumption reducing processing.

FIG. 32 is a flowchart illustrating the operation of the fifth power consumption reducing processing, which is performed by the information device management server 600 for the purpose of reducing the power consumption of the shared devices 7. Upon acquiring the collection results from the energy management server 300, the information device management server 600 performs the fifth power consumption reducing processing. In the fifth power consumption reducing processing, the information device management server 600 uses information indicating the presence or absence of a person in one or more zones used for each tenant. The fifth power consumption reducing processing is performed for each tenant. That is, the processing target zone includes one or more zones used by the tenant.

In the information device management server 600, the information device controller 653 determines whether or not a person is detected in a processing target zone (step S321). If a person is detected in the processing target zone (YES at step S321), the information device controller 653 determines that the shared devices 7 belonging to the processing target zone is to be operated as is (step S322) and ends the processing. The information device controller 653 identifies the shared device 7 belonging to the processing target zone by using the information device table 6511.

If a person is not detected in the processing target zone (NO at step S321), the information device controller 653 acquires the usage state of the shared device 7 belonging to the processing target zone (step S323). The information device controller 653 acquires the state of the PC 6 belonging to the processing target zone (step S324). In order to acquire the state of the PC 6, the information device controller 653 transmits a control signal for acquisition of the status of each of the PCs 6 via the network interface 654 and receives the response thereto.

The information device controller 653 determines whether or not all of the PCs 6 belonging to the processing target zone are stopped and also the shared devices 7 have not been used over a certain period of time (step S325). If all of the PCs 6 are stopped and also the shared devices 7 have not been used over a certain period of time (YES at step S325), the information device controller 653 stops the shared devices 7 belonging to the processing target zone (step S326) and ends the processing.

If at least one PC 6 belonging to the processing target zone is operating or the shared device 7 is used during the certain period of time (NO at step S325), the information device controller 653 proceeds to the processing of step S322. If a PC 6 belonging to the processing target zone is operating, there is a possibility that a person has temporarily left that zone and will return to the zone and use the shared device 7. For that reason, even if a person is not detected in the zone, the information device management server 600, based on the state of the PC 6 and the usage state of the shared device 7 in that zone, determines whether or not to stop the shared device 7. This enables the information device management server 600 to reduce the power consumption in a zone, while maintaining the convenience for the person.

Figure 33:
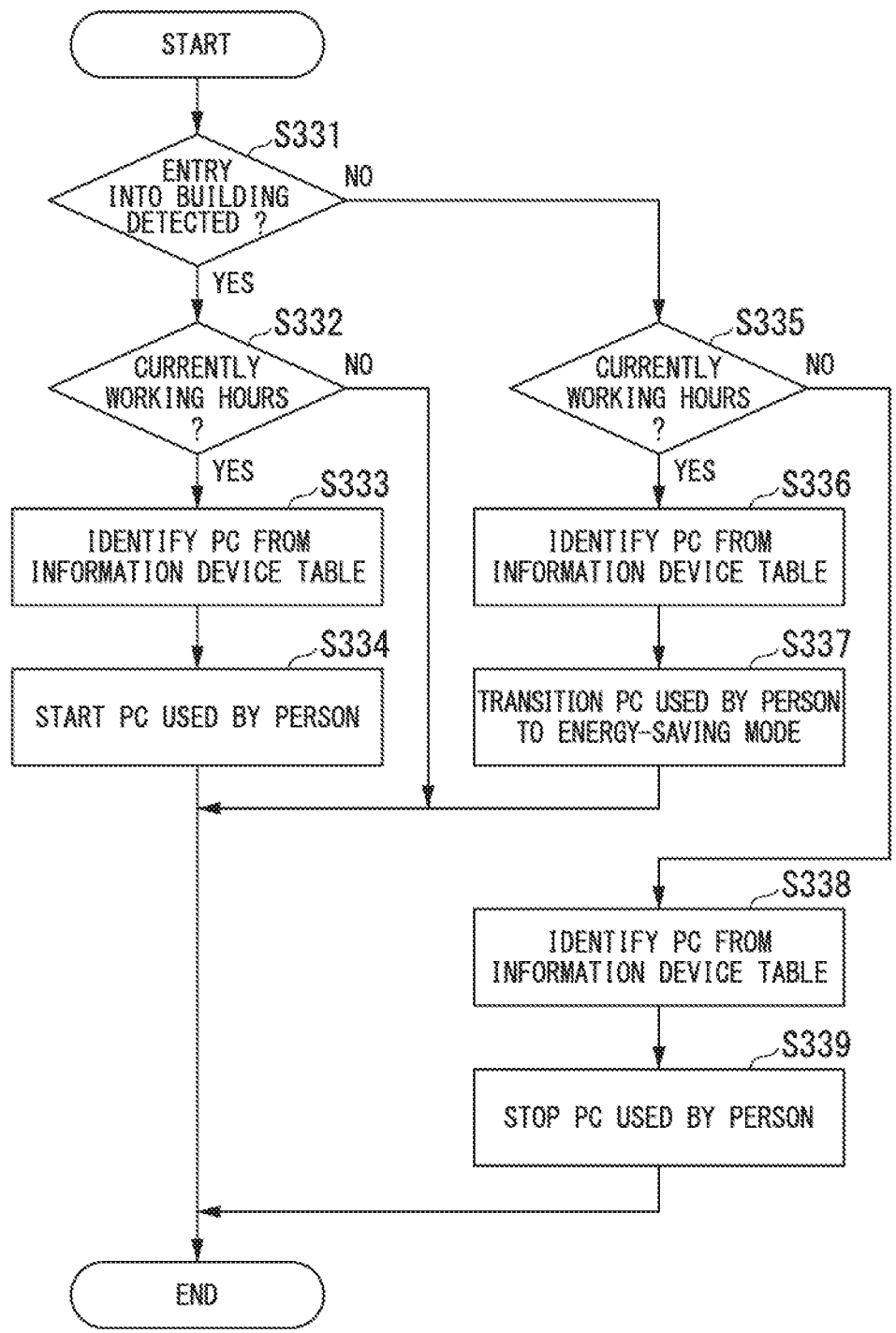
FIG. 33 is a flowchart illustrating the operation of a sixth power consumption reducing processing.

FIG. 33 is a flowchart illustrating the operation of the sixth power consumption reducing processing, which is performed by the information device management server 600 to reduce the power consumption of the PCs 6. Upon acquiring the collection results from the energy management server 300, the information device management server 600 starts the third power consumption reducing processing for each person, using the entry-exit information included in the collection results.

In the information device management server 600, the information device controller 653 determines whether or not the entry of a person into the building has been detected, based on the entry-exit information (step S331). If entry of a person into the building has been detected (YES at step S331), the information device controller 653 determines whether the current time is during working hours (step S332). Working hours are established beforehand and registered into the information device management server 600. Working hours are established, for example, as being from 9 AM until 6 PM on weekdays.

Working hours may be different for each tenant. When working hours are different for each tenant, the information device database 651 stores a table indicating combinations of a tenant ID and working hours of the tenant indicated by the tenant D. In this case, the information device controller 653 read out working hours corresponding to the tenant ID included in the collection results from the table and determine whether the current time is during working hours. The working hours read out from the table corresponds to the tenant ID associated with the personal ID of the person who entered the building. Working hours may be determined not only by time but also by a combination of day of the week and time or a combination of the date and time. Working hour may be determined only on the days of the week or only on days.

If the current time is within working hours (YES at step S332), the information device controller 653, based on the device based table 6512, identifies the PC 6 used by the person who entered the building (step S333). The information device controller 653 starts the PC 6 identified at step S333 (step S334) and ends the processing. If the current time is not within working hours (NO at step S332), the information device controller 653 ends the processing.

If exit of a person has been detected at step S331 (NO at step S331), the information device controller 653 determines whether or not the current time is within working hours (step S335). If the current time is within working hours (YES at step S335), the information device controller 653 identifies the PC 6 used by the person who has exited the building, based on the device used table 6512 (step S336). The information device controller 653 operates the PC 6 identified at step S333 in the energy-saving mode and ends the processing (step S337).

If the current time was not within working hours at step S335 (NO at step S335), the information device controller 653 identifies the PC 6 used by the person who has exited the building, based on the device used table 6512 (step S338). The information device controller 653 stops the PC 6 identified at step S338 (step S339) and ends the processing.

By the information device management server 600 performing the third power consumption reducing processing based on the entering and exiting of a person into and out of a building, the power consumed by the PCs 6 can be reduced, without losing the convenience for persons. Specifically, because a person who has exited the building during working hours might return to within the building during working hours, the information device management server 600 operates the PC 6 used by the person in the energy-saving mode without stopping, thereby providing convenience for the person and also reducing the power consumption. Because a person who exits the building outside of working hours has a low possibility of returning to within the building, the information device management server 600 stops the PC 6 used by the person, so as to reduce the power consumption. The information device management server 600 performs control based on working hours of each tenant. Through this control, the information device management server 600 can perform the power consumption reducing processing without losing the convenience for tenants even if working hours are different for each tenant.

Figure 34:
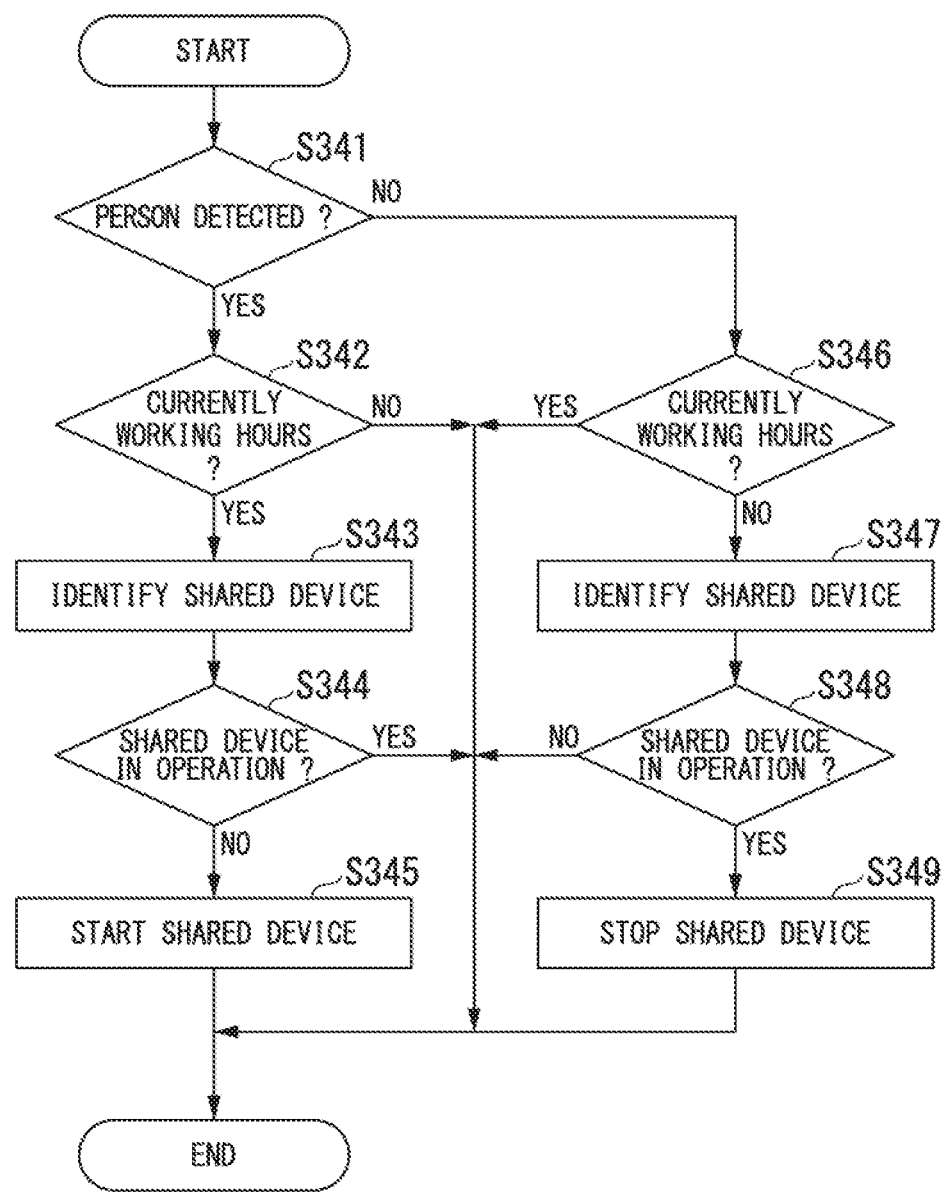
FIG. 34 is a flowchart illustrating the operation of a seventh power consumption reducing processing.

FIG. 34 is a flowchart illustrated the operation of the seventh power consumption reducing processing, which is performed by the information device management server 600 to reduce the power consumption of the shared device 7. Upon acquiring the collection results from the energy management server 300, the information device management server 600 performs the seventh power consumption reducing processing.

In the seventh power consumption reduction processing, the information device management server 600 uses information indicating the presence or absence of a person in one or more zones used for each tenant. The fifth power consumption reducing processing is performed for each tenant. That is, the processing target zone includes one or more zones used by the tenant.

In the information device management server 600, the information device controller 653 determines whether or not a person is detected in a processing target zone (step S341). If a person is detected in the processing target zone (YES at step S341), the information device controller determines whether or not the current time is during working hours of the tenant using the processing target zone (step S342). If the current time is not within the working hours (NO at step S342), the information device controller 653 ends the processing for the processing target zone.

If the current time is within the working hours (YES at step S342), the information device controller 653, based on the information device table 6511, identifies the shared device 7 belonging to the processing target zone (step S343). The information device controller 653 determines whether or not the identified shared device 7 is in operation (step S344). If the identified shared device 7 is in operation (YES at step S344), the information device controller 653 ends the processing for the processing target zone.

If the identified shared device 7 is rot in operation (NO at step S344), the information device controller 653 starts the identified shared device 7 (step S345) and ends the processing for the processing target zone.

If a person has not been detected in the processing target zone at step S341 (NO at step S341), the information device controller 653 determines whether or not the current time is during working hours of the tenant using the processing target zone (step S346). If the current time is within the working hours (YES at step S346), the information device controller 653 ends the processing for the processing target zone.

If the current time is not within the working hours (NO at step S346), the information device controller 653, based on the information device table 6511, identifies the shared device 7 belonging to the processing target zone (step S347). The information device controller 653 determines whether or not the identified shared device 7 is in operation (step S348). If the identified shared device 7 is no in operation (NO at step S348), the information device controller 653 ends the processing for the processing target zone.

If the identified shared device 7 is in operation (YES at step S3481 the information device controller 653 stops the identified shared device 7 (step S349) and ends the processing for the processing target zone. Stopping the shared device 7 may mean, for example, to stop the operation completely to make the power consumption substantially zero or to change the operating mode to the sleep mode to reduce the power consumption.

The information device management server 600 can reduce the power consumption of the shared devices 7 on the basis of the presence or absence of persons in the zone and the determination result on whether or not the current time is during working hours. When a person is detected in the zone during working hours, the information device management server 600 starts the shared device 7, thereby improving convenience.

Figure 35:
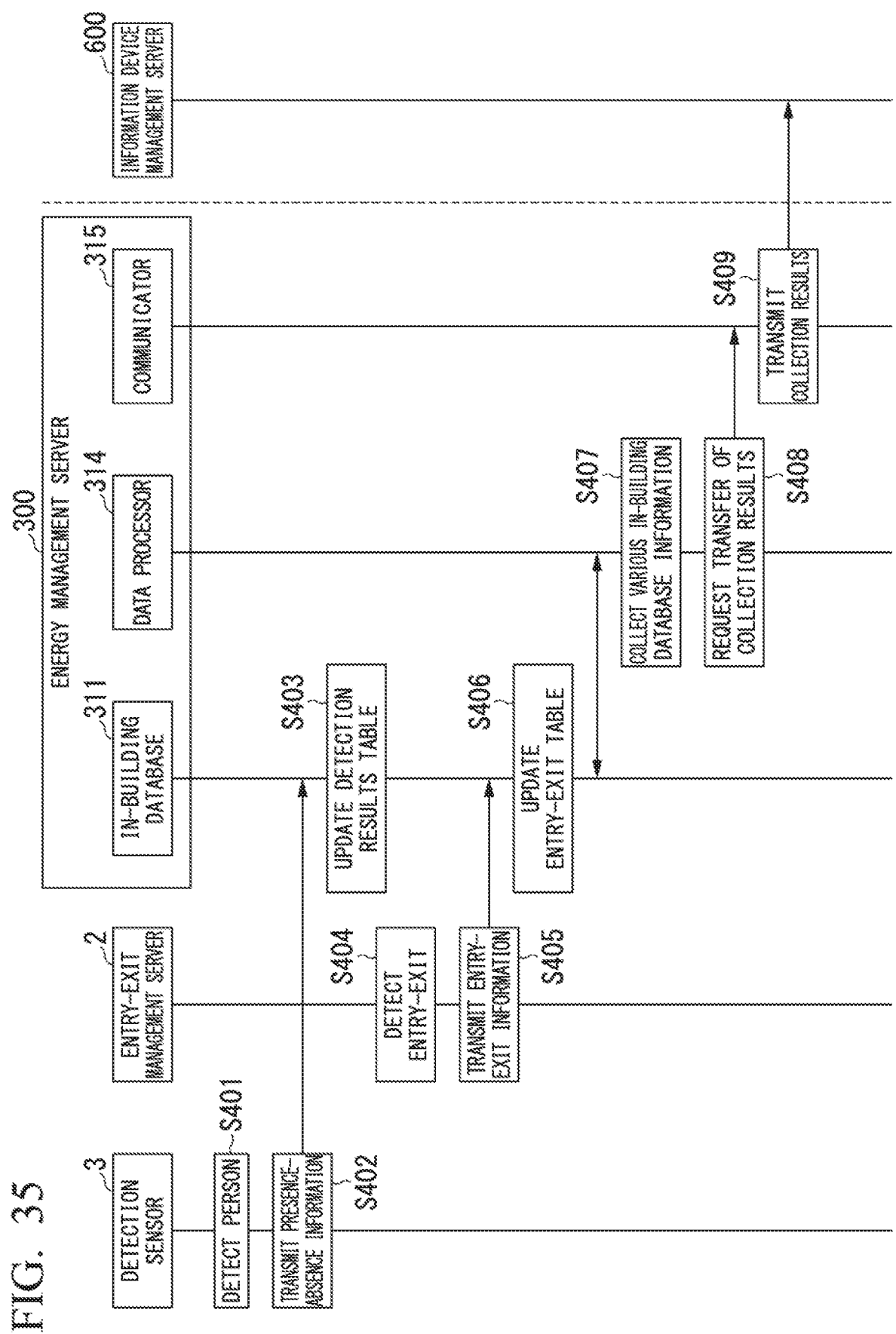
FIG. 35 is a first sequence diagram illustrating the operation in the overall management system of the second embodiment.
Figure 36:
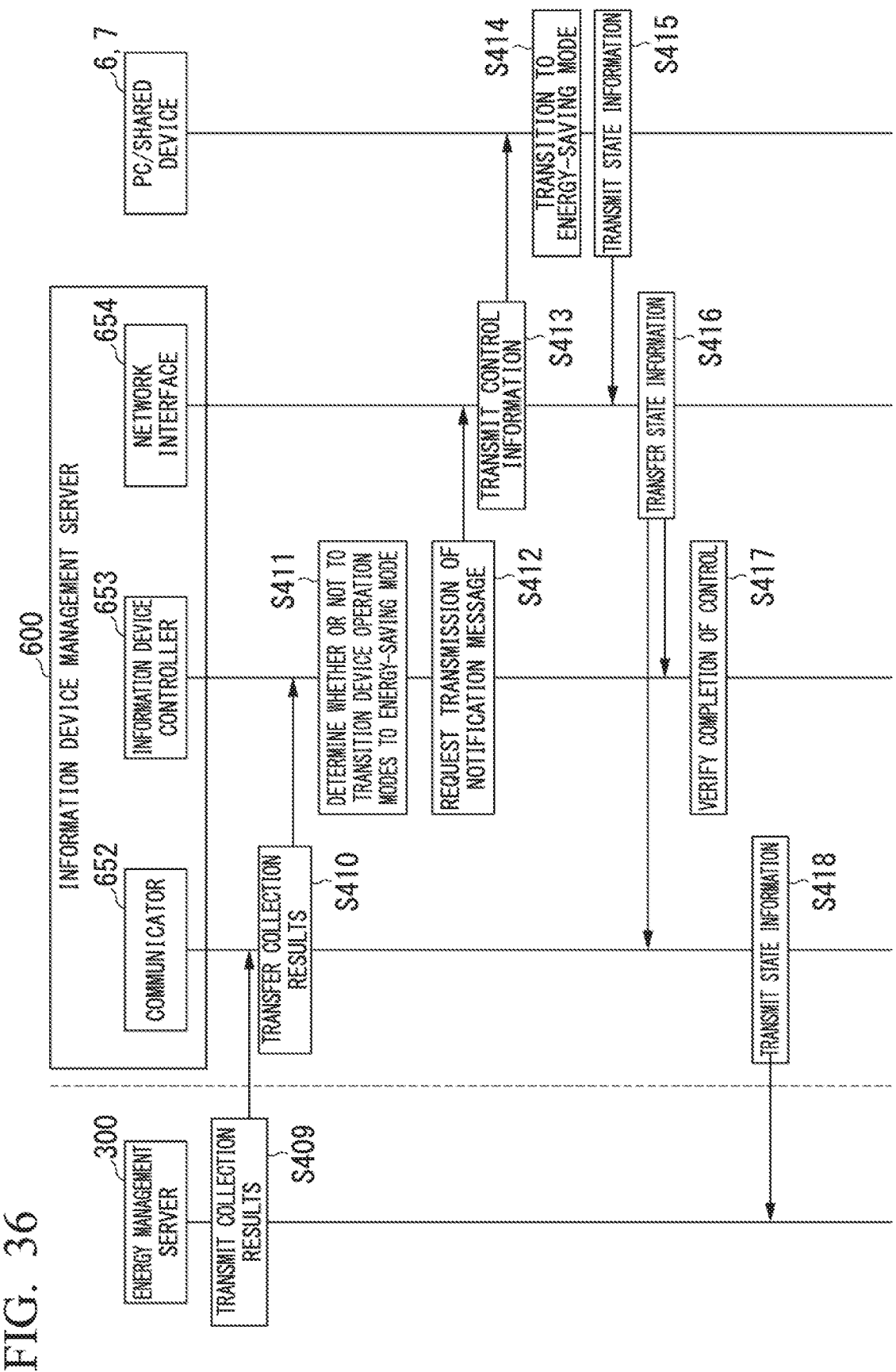
FIG. 36 is a second sequence diagram illustrating the operation in the overall management system of the second embodiment
Figure 37:
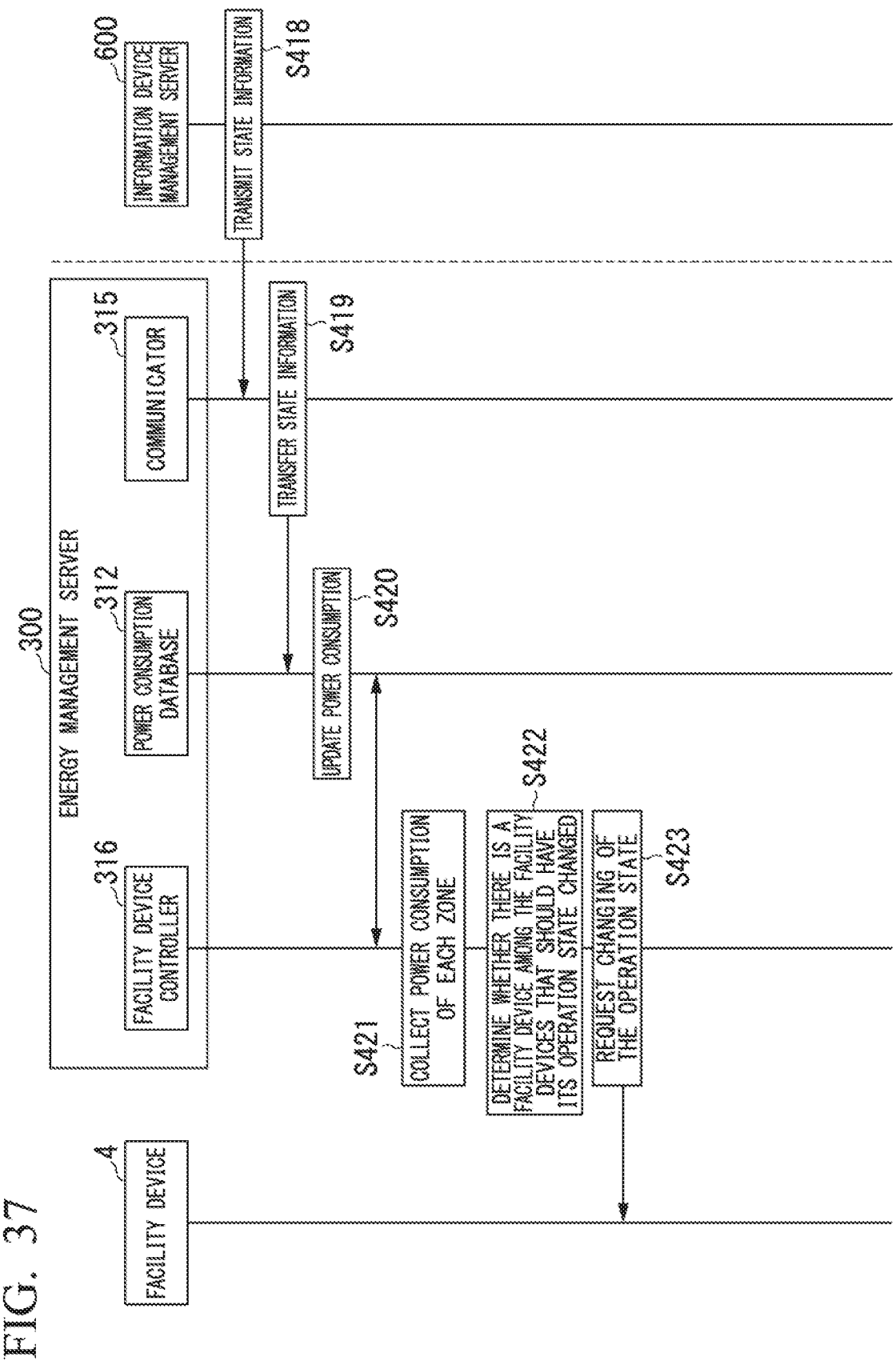
FIG. 37 is a third sequence diagram illustrating the operation in the overall management system of the second embodiment

The overall operation of a management system of the second embodiment will now be described, with references made to FIG. 35 to FIG. 39. FIG. 35, FIG. 36, and FIG. 37 are sequence diagrams illustrating the processing for the energy management server 300 to transmit the collection results to the information device management server 600 and the information device management server 600 to perform control of the PC 6 or shared device 7, based on the collection results.

When the detection sensor 3 detects a person within a zone (step S401), the detection sensor 3 transmits to the energy management server 300 presence-absence information that includes the zone ID indicating the zone in which the person has been detected and information indicating that a person has been detected (step S402). In the energy management server 300, the database updater 313, based on the presence-absence information received from the detection sensor 3, updates the detection results table 3111 (step S403). The detection sensor 3 may also transmit the presence-absence information to the energy management server 300 if there is a change from the state in which a person is detected within a zone to the state in which a person is not detected in the zone.

When the entry-exit management system 2 detects entry of a person into the building or exit of a person from the building (step S404), the entry-exit management system 2 transmits entry-exit information to the energy management server 300 (step S405). In the energy management server 300, the database updater 313 updates the entry-exit table 3112, based on the entry-exit information received from the entry-exit management system 2 (step S406).

When either one or both of the detection results table 3111 and the entry-exit table 3112 of the in-building database 311 is updated, the data processor 314 collects information of both tables to generate collection results (step S407). The collection results include a zone ID or a personal ID in which corresponding information is updated, updated information, and a tenant ID indicating a tenant to whom the person indicated by the personal ID belongs or to which the zone indicated by the zone ID belongs.

The data processor 314 requests the communicator 315 to transfer the collection results to the information device management server 600 (step S408). The communicator 315 transmits the collection results to the information device management server 600 (step S409).

When the data processor 314 updates the entry-exit table 3112, it may include in the collection results a list that includes the personal IDs of all persons in the building. All the persons in the building are obtained by searching for the personal IDs having the state "In building" in the entry-exit table 312.

In the information device management server 600, the communicator 652 transmits to the information device controller 653 the collection results received from the energy management server 300 (step S410). The information device controller 653, based on the collection results, determines whether or not to transition the operating mode of the PC 6 or the shared device 7 to the energy-saving mode or transition to the stopped condition (step S411). If the information device controller 653 selects control to transition to the energy-saving mode or to the stopped state, it requests the network interface 654 to transfer to the PC 6 or the shared device 7 control information indicating the selected control (step S412). The network interface 654 transmits control information to the PC 6 or the shared device 7 that is the control target (step S413). The operations in step S411 to step S413 correspond to the fifth power consumption reducing processing illustrated in FIG. 32 or the sixth power consumption reducing processing illustrated in FIG. 33.

The PC 6 or shared device 7, in accordance with the control information received from the information device management server 600, transitions to operation in the energy-saving mode (step 3414) and transmits to the information device management server 600 state information indicating the state of operating in the energy-saving mode (step S415). The state information includes, for example, information indicating the current power consumption and the operating mode.

In the information device management server 600, the network interface 654 transfers the state information received from the PC 6 or the shared device 7 to the information device controller 653 and the communicator 652 (step S416). Upon acquiring the state information, the information device controller 653 verifies that the control to transition to the energy-saving mode has been completed (step S417). If slate information has not been obtained within a certain period of time from the PC 6 or the shared device 7 controlled using the control information, the information device controller 653 may transmit the control information once again. The communicator 652, via the network interface 654, transmits the acquired state information to the energy management server 300 (step S418).

In the energy management server 300, the communicator 315 transfers to the power consumption database 312 the state information received from the information device management server 600 (step S419) The power consumption database 312, based on the state information, updates the power consumption in each zone in the building (step S420). The facility device controller 316 collects power consumption information of the PCs 6 and shared devices 7 in each zone (step S421) to determine whether or not there is a facility device 4 operating in a zone in which PCs 6 and shared devices 7 are not being used (step S422). If there is a facility device 4 operating in a zone determined that the PCs 6 and the shared devices 7 are not used, the facility device controller 316 makes a request to stop or lower the operating level to the facility device 4 operating in that zone (step S423).

A zone in which it is determined that a PC 6 and a shared device 7 are not used is, for example, a zone in which the total value of power consumption of the PCs 6 and shared devices 7 is less than a certain value, and a zone that is determined that no person is using. The energy management server 300, based on the operation state of the PCs 6 and the shared devices 7 controlled by the information device management server 600, can reduce the power consumption without losing person's convenience, by stopping or reducing the operating level of facility devices 4 in the zone. When a PC 6 or a shared device 7 is used in a zone belonging to the same tenant as a tenant to which the zone determined not to use a PC 6 and a shared device 7 belongs, the energy management server 300 may not stop facility devices 4 in the zones and reduce the operating level of facility devices 4 in the zones. That is, the energy management server 300 may control the facility device 4 for each tenant.

Figure 38:
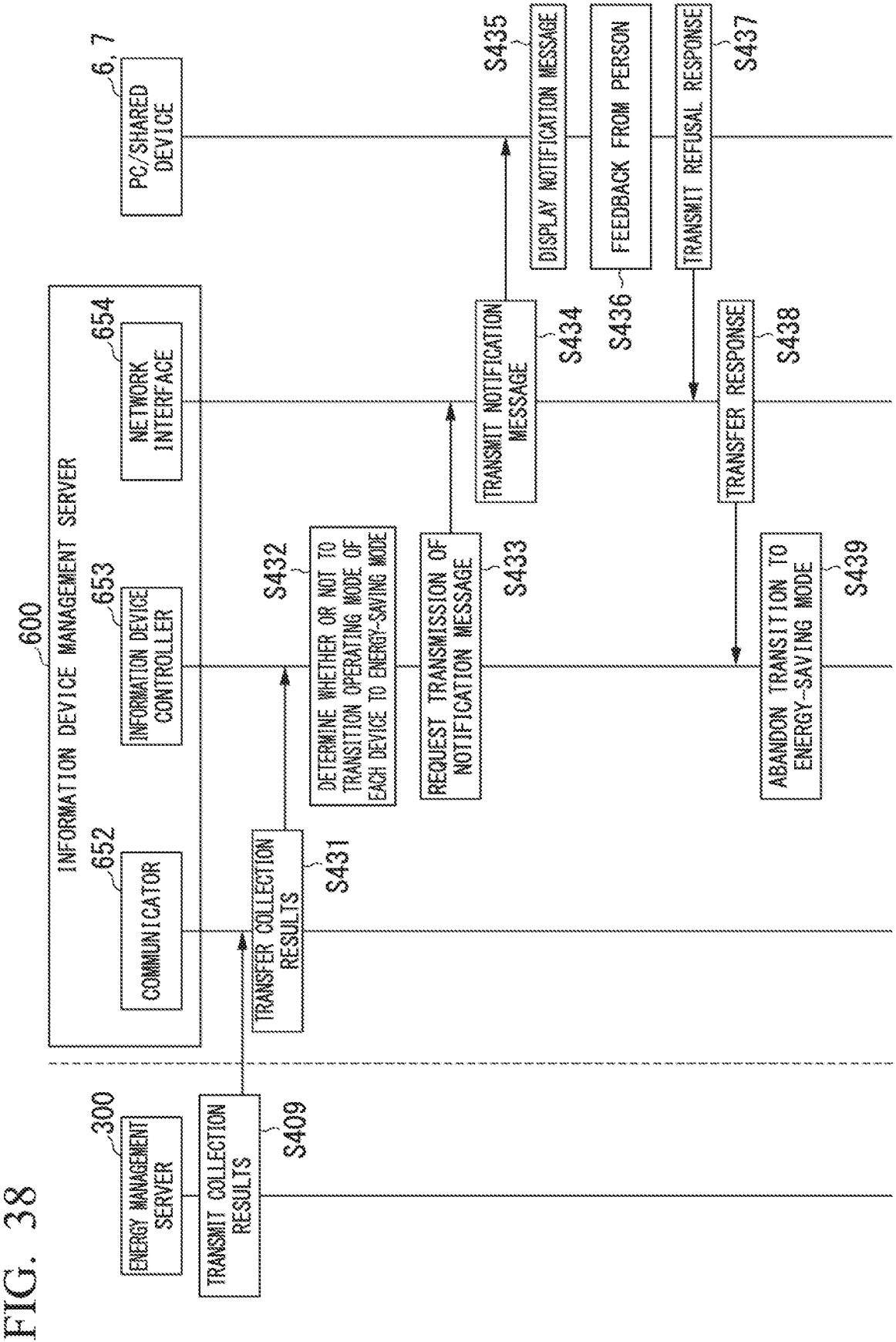
FIG. 38 is a fourth sequence diagram illustrating the operation in the overall management system of the second embodiment

FIG. 38 is a sequence diagram illustrating the processing of the information device management server 600 controlling PCs 6 or shared devices 7, based on the collection results. The sequence illustrated in FIG. 38 corresponds to the case in which, in the fourth power consumption reducing processing illustrated in FIG. 31, there is feedback from the PC 6. The operation up until the information device management server 600 receives the collection results from the energy management server 300 is the same as the operation from step S401 to step S409 illustrated in FIG. 35.

In the information device management server 600, the communicator 652 transfers to the information device controller 653 the collection results received from the energy management server 300 (step S431). The information device controller 653, based on the collection results, determines whether or not to transition the operating mode of the PC 6 and the shared device 7 to the energy-saving mode or stopped state (step S432). If the information device controller 653 selects control to transition to the energy-saving mode or control to the stopped state, it requests the network interface 654 to transfer a notification message indicating execution of the selected control (step S433). The network interface 654 transmits the notification message to the PC 6 or the shared device 7 that is the control target (step S434).

The PC 6 or shared device 7 displays the notification message received from the information device management server 600 (step S435) and waits for a certain period of time for acceptance of feedback from the person using the PC 6 or the shared device 7. When feedback by the person is accepted (step S436), the PC 6 or shared device 7 transmits to the information device management server 600 a reply that refuses the control (step S437). Feedback by a person is, for example, refusal by the person of the stopping or transitioning to the energy-saving mode of the PC 6 or shared device 7 in order to reduce the power consumption.

In the information device management server 600, the network interface 654 transfers the refusal response received from the PC 6 or the shared device 7 to the information device controller 653 (step S438). Upon acquiring the refusal response, the information device controller 653 abandons the transition to the energy-saving mode with respect to the PC 6 or the shared device 7 that transmitted the refusal response (step S439).

In order to reduce the power consumption, the information device management server 600 transmits a notification message to the PC 6 or the shared device 7 selected as the target for a change of operating mode to query the person using the PC 6 or the shared device 7, so that a power consumption reduction that loses the convenience for the person is not done.

Figure 39:
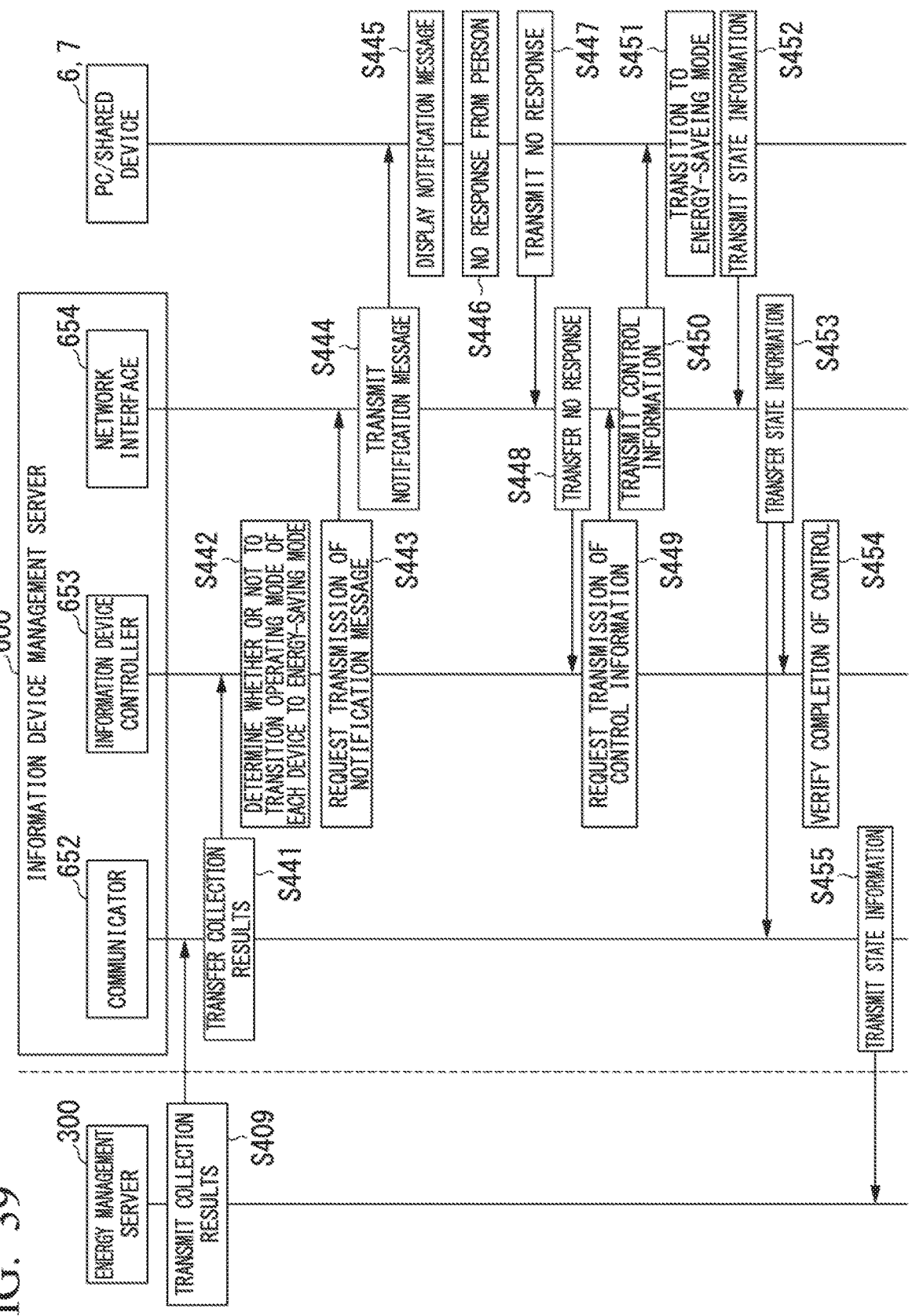
FIG. 39 is a fifth sequence diagram illustrating the operation in the overall management system of the second embodiment

FIG. 39 is a sequence diagram illustrating the processing of the information device management server 600 controlling a PC 6 or a shared device 7, based on the collection results. The sequence illustrated in FIG. 39 corresponds to the case in which, in the first power consumption reducing processing illustrated in FIG. 31, there is no feedback from the PC 6. The operation up until the information device management server 600 receives the collection results from the energy management server 300 is the same as the operation from step S401 to step S409 illustrated in FIG. 35.

In the information device management server 600, the communicator 652 transfers to the information device controller 653 the collection results received from the energy management server 300 (step S441). The information device controller 653, based on the collection results, determines whether or not to transition the operating mode of the PC 6 and the shared device 7 to the energy-saving mode or stopped state (step S442). If the information device controller 653 selects control to transition to the energy-saving mode or control to the stopped state, it requests the network interface 654 to transfer a notification message indicating execution of the selected control (step S443). The network interface 654 transmits the notification message to the PC 6 or the shared device 7 that is the control target (step S444).

The PC 6 or shared device 7 displays the notification message received from the information device management server 600 (step S445) and waits for a certain period of time for acceptance of feedback from the person using the PC 6 or the shared device 7. If there is no response from the person during the waiting time, the PC 6 or the shared device 7 (step S446) transmits to the information device management server 600 a notification indicating that there has been to response from the person (step S447).

In the information device management server 600, the network interface 654 transfers the notification received from the PC 6 or the shared device 7 to the information device controller 653 (step S448). Upon receiving the notification indicating that there had not been a feedback from the person, the information device controller 653 makes a request to the network interface 654 to transmit control information to the PC 6 or the shared device 7 that is the target of power consumption reduction (step S449), and the network interface 654 transmits the control information to the PC 6 or the shared device 7 (step S450).

The PC 6 or the shared device 7, in accordance with the control information received from the information device management server 600, transitions to operation in the energy-saving mode (step S451) and transmits to the information device management server 600 state information indicating the state of operating in the energy-saving mode (step S452).

In the information device management server 600, the network interface 654 transfers the state information received from the PC 6 or the shared device 7 to the information device controller 653 and the communicator 652 (step S453). Upon acquiring the state information, the information device controller 653 verifies that the control to transition to the energy-saving mode has been completed (step S454). If state information has not been obtained within a certain period of time from the PC 6 or the shared device 7 controlled using the control information, the information device controller 653 may transmit the control information once again. The communicator 652, via the network interface 654, transmits the acquired state information to the energy management server 300 (step S455). The operation in the energy management server 300 after step S455 is the same as the operation from step S419 to step S423 illustrated in FIG. 37.

In order to reduce the power consumption, the information device management server 600 transmits a notification message to the PC 6 or the shared device 7 selected as the target for changing the operating mode and, if there is no response after querying the person, performs control so as to transition the PC 6 or the shared device 7 to the energy-saving mode. This operation enables the information device management server 600 to reduce the power consumption without losing convenience for the person.

The management system of the second embodiment uses information indicating the presence or absence of a person is each of a plurality of zones regarding a building and information indicating the entry and exit to and from the building to suppress the power consumed by information devices such as PCs 6 and shared devices 7 located in each of the zones, enabling reduction of the energy amount consumed regarding the building. By controlling printers, copiers, and multifunction printers provided in zone as the shared devices 7, the management system can reduce the amount of heat generated by the printers, the copiers, and the multifunctional printers, thereby reducing the load on air-conditioning equipment and also reducing the power consumed by the air-conditioning equipment.

At times of the day in which the power used within the building is at a peak, the information device controller 653 may perform power control so as to operate by energy stored in the secondary batteries those of the PCs 6 and the shared devices 7 provided with the secondary batteries. Also, the information device controller 653 may perform power control at times of the day having high electricity fees. The criteria or policy when performing such power control may set by the administrator or the operator of the information device management server 600, or may be set by the information device controller 653, based on the usage state of the KVM and CPU of each PC 6. If the information device controller 653 sets the criteria, for example, a PC 6 having a low frequency of use of the KVM and CPU is stopped, rather than being transitioned to the energy-saving mode.

The data processor 314 may, based on the power consumption or electric energy consumption stored in the power consumption database 312, make request the information device management server 600 to reduce the power consumption of a zone used for a tenant. For, example, when total value of the power consumption of the facility devices 4, PCs 6 and shared devices 7 in one or more zones belonging to a tenant exceeds a threshold, the reduction in power consumption is requested for the one or more zones. When the total value of the power consumption of the facility devices 4, PCs 6 and shared devices 7 in one or more zones belonging to a tenant is greater than the total value of the power consumption of the facility devices 4, PCs 6 and shared devices 7 in one or more zones belonging to other tenants by a certain rate or more, the reduction in power consumption is requested for the one or more zones belonging to the tenant.

After the information device management server 600 reduces the power consumption with respect to PCs 6 and shared devices 7, the facility device controller 316 may control the facility devices 4 based on the degree of reduction of power consumption in zones belonging to each tenant. For example, if the degree of reduction by the information device management server 600 of the power consumption of the of the PCs 6 and the shared devices 7 is smaller than a threshold, the facility device controller 316 may perform control that reduces the power consumption of the facility devices 4 in one or more zones used for the tenant to which the PCs 6 and the shared devices 7 belong.

The description has been for the case in which, in the information device table 6511, one zone ID is associated with an information device ID. However, a plurality of zone IDs may be associated with one information device ID. For example, if the frequency with which a person who uses a laptop computer is in a plurality of zones is high, by associating a plurality of zones with the information device ID of that computer, power consumption can be reduced, while ensuring the convenience for that person. Zone IDs of a plurality of zones used by a tenant to which a person using a laptop computer belongs may be associated with the computer.

In the second embodiment, the description has been for a configuration in which, in the energy management server 300, the database updater 313 stores presence-absence information obtained from the detection sensors 3 into the detection results table 3111, and the data processor 314 collects information stored in the detection results table 3111 and transmits the obtained information to the information device management server 600. However, the energy management server 300 may transmit to the information device management server 600 presence-absence information obtained from each detection sensor 3. If the information device management server 600 receives presence-absence information, a sensor table into which are stored the combination of a sensor ID that uniquely identifies a detection sensor 3 and the information device ID of an information device located in the person-detection range of the detection sensor 3 may be stored into the information device database 651. By having the sensor table, the information device management server 600 can control the information devices based on the presence-absence information.

Figure 40:
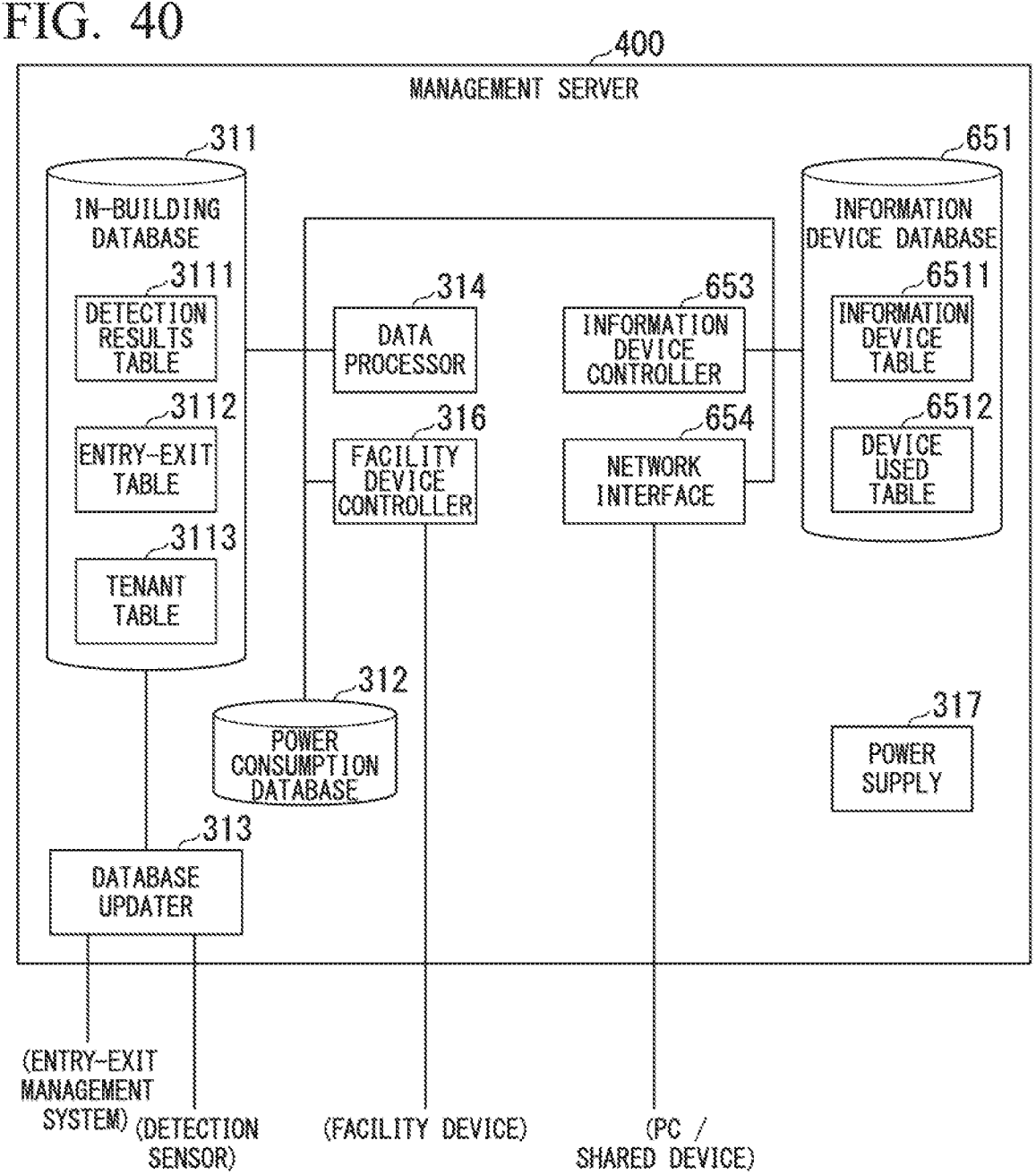
FIG. 40 is a block diagram illustrating an example of the configuration of a management server in the second embodiment.

In the management system according to the second embodiment, similarly to the management system of the first embodiment illustrated in FIG. 18, the energy management server 300 and the information device management server 600 may be configured as one management server. FIG. 40 is a block diagram illustrating an example of the configuration of the management server in the second embodiment. The management server 400 is provided in the management system instead of the energy management server 300 and the information device management server 600. The management server 400 has an in-building database 311, a power consumption database 312, a database updater 313, a data processor 314, a facility device controller 316, a power supply 317, an information device database 651, an information device controller 653, and a network interface 654. By configuring the energy management server 300 and the information device management server 600 as one server, the communicators 315 and 652 for communicating between an energy management server 300 and an information device management server 600 are omitted. The power supply 655 is also omitted. By using the management server 400, one server may execute processing performed by the energy management server 300 and the information device management server 600.

In the first and second embodiments, the description has been for the case in which the division of the region in the building that defines zones to which PCs 6 belong is the same as the division of the region in the building that defines zones to which shared devices 7 belong. However, the way of defining zones for the PCs 6 and the way of defining zones for the shared devices 7 may be different. For example, in the example of the zones illustrated in FIG. 4, while each PC 6 belongs to one of the zones A to F, the shared devices 7 may belong to any one of the zone a in which the zones A and B are combined, the zone b in which the zones C and F are combined, and the zone c in which the zones D and E are combined. For example, in the case where the shared device 7 is a printer or a multifunction peripheral used by the PCs 6 belonging to the zones A and B, in the case where the shared device 7 is a network switch connected to the PCs 6 belonging to the zones A and B, or the like, the way to define such zones is effective.

According to at least one of the above-described embodiments, by having a database updater that acquires presence-absence information indicating the presence or absence of a person in each zone, regarding a plurality of zones regarding a building and that updates an in-building database, a data processor that generates collection results as data, based on the presence-absence information and zone identifiers, and a communicator that transmits data to the information device management server, the information device management server can control information devices in each zone based on the data and reduce the amount of energy consumed in the building.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An energy management apparatus in a management system including an information device management apparatus, the information device management apparatus having a first storage storing an information device table indicating a relationship between an information device identifier for identifying at least one information device and a zone identifier for each of zones related to a building, the information device table including a plurality of entries, each entry being uniquely identified by a combination of a device identifier, a zone identifier and a tenant identifier associated together, the information device management apparatus controlling the information device based on data received from the energy management apparatus and the information device table, the energy management apparatus comprising:

processing circuitry configured to:
acquire presence-absence information indicating a presence or absence of a person based on information from image sensors capturing each of the zones;
generate the data based on the presence-absence information and the zone identifier;
transmit the data to the information device management apparatus and
control a facility device provided in the building based on an operation state of the at least one information device that the information device management apparatus controls based on the data, the information device table and a usage state of the at least one information device.

2. An information device management apparatus in a management system including an energy management apparatus, the energy management apparatus acquiring presence-absence information indicating a presence or absence of a person based on information from image sensors capturing each of zones related a building, the energy management apparatus generating data based on the presence-absence information and a zone identifier of each of the zones, the information management apparatus comprising:

processing circuitry configured to receive the data from the energy management apparatus;
a storage coupled to the processing circuitry and configured to store an information device table indicating a relationship between an information device identifier for identifying at least one information device, a zone identifier for identifying a zone to which the at least one information device belongs, and a tenant identifier associated with the zone identifier, the information device table including a plurality of entries, each entry being uniquely identified by a combination of a device identifier, a zone identifier and a tenant identifier associated together, wherein
the processing circuitry is further configured to:
determine an information device of the at least one information device, identified by an information device identifier having a relationship with the zone identifier included in the data in the information device table,
acquire a usage state of the determined information device when detecting no person in a zone identified by the zone identifier included in the data, and
stop the determined information device when no operation is performed on the determined information device for a predetermined period.

3. The information device management apparatus according to claim 2, wherein
the processing circuitry is further configured to cause the determined information device to display a message asking for rejection of stopping the determined information device when no operation is performed on the determined information device for a predetermined period, and stop the determined information device when no response of rejection is received from the determined information device.

4. The information device management apparatus according to claim 2, wherein
the data includes a personal identifier for identifying a person in the building,
the storage is further configured to store a device used table indicating a relationship between the personal identifier of the person and the information device identifier of the at least one information device used by the person, and
the processing circuitry is further configured to determine, based on the device used table, information devices belonging to a zone in which a person is not detected and exclude the at least one information device used by a person in the building among the determined information devices from targets of control.

5. The information device management apparatus according to claim 2, wherein the processing circuitry is further configured to transmit a zone identifier of a zone to which the information device belongs to the energy management apparatus.

6. A management system comprising:
an energy management apparatus; and
an information device management apparatus,
wherein the energy management apparatus comprises
processing circuitry configured to
acquire, regarding zones related to a building, presence-absence information indicating a presence or absence of a person based on information from image sensors capturing each of the zones;
generate data based on the presence-absence information and a zone identifier for each of the zones;
transmit the data to the information device management apparatus; and
control a facility device provided in the building on a basis of an operation state of at least one information device that the information device management apparatus controls based on the data and a usage state of the at least one information device, and
the information device management apparatus comprises
processing circuitry configured to receive the data from the energy management apparatus,
a storage configured to store an information device table indicating a relationship between an information device identifier for identifying the at least one information device and the zone identifier to which the at least one information device belongs, the information device table including a plurality of entries, each entry being uniquely identified by a combination of a device identifier, a zone identifier and a tenant identifier associated together, wherein the processing circuitry is further configured to:
determine an information device of the at least one information device identified by an information device identifier having a relationship with the zone identifier included in the data in the information device table,
acquire a usage state of the determined information device when detecting no person in a zone identified by the zone identifier included in the data, and
stop the determined information device when no operation is performed on the determined information device for a predetermined period.

7. A power consumption reduction method performed by an energy management apparatus in a management system including an information device management apparatus, the information device management apparatus having a storage storing an information device table indicating a relationship between an information device identifier for identifying at least one information device and a zone identifier for each of zones, the information device table including a plurality of entries, each entry being uniquely identified by a combination of a device identifier, a zone identifier and a tenant identifier associated together, the information device management apparatus controlling the at least one information device based on data received from the energy management apparatus and the information device table, the power consumption reduction method comprising:
  acquiring, regarding the zones related to a building, presence-absence information indicating a presence or absence of a person based on information from image sensors capturing each of the zones;
  generating the data based on the presence-absence information and the zone identifier,
  transmitting the data to the information device management apparatus; and
  controlling a facility device provided in the building on a basis of an operation state of the at least one information device that the information device management apparatus controls based on the data, the information device table and a usage state of the at least one information device.

8. A power consumption reduction method performed by an information device management apparatus in a management system including an energy management apparatus, the energy management apparatus acquiring presence-absence information indicating a presence or absence of a person based on information from image sensors capturing each of zones related to a building, the energy management apparatus generating data based on the presence-absence information and a zone identifier of each of the zones, the power consumption reduction method comprising:
  receiving the data from the energy management apparatus;
  determining an information device of at least one information device, identified by an information device identifier having a relationship with the zone identifier included in the data in an information device table, the information device table indicating a relationship between an information device identifier for identifying one device of the at least one information device and a zone identifier for identifying one zone of the zones to which the one device belongs, the information device table including a plurality of entries, each entry being uniquely identified by a combination of a device identifier, a zone identifier and a tenant identifier associated together;
  acquiring a usage state of the determined information device when detecting no person in a zone identified by the zone identifier included in the data; and
  stopping the determined information device when no operation is performed on the determined information device for a predetermined period.

9. The power consumption reduction method according to claim 7, further comprising:
  receiving, from the information device management apparatus, state information indicating an amount of electric power consumed by the at least one information device controlled by the information device management apparatus after the information device management apparatus controls the at least one information device based on the data, the information device table and the usage state of the at least one information device.

10. A non-transitory computer-readable recoding medium having a program executed by a computer provided in an energy management apparatus in a management system including an information device management apparatus, the information device management apparatus having a storage storing an information device table indicating a relationship between an information device identifier for identifying at least one information device and a zone identifier for each of zones, the information device table including a plurality of entries, each entry being uniquely identified by a combination of a device identifier, a zone identifier and a tenant identifier associated together, the information device management apparatus controlling the information device based on data received from the energy management apparatus and the information device table, the program for causing the computer to execute the steps of:
  acquiring, regarding the zones related to a building, presence-absence information indicating a presence or absence of a person based on information from image sensors capturing each of the zones;
  generating the data based on the presence-absence information and the zone identifier,
  transmitting the data to the information device management apparatus; and
  controlling a facility device provided in the building on a basis of an operation state of the at least one information device that the information device management apparatus controls based on the data, the information device table and a usage state of the at least one information device.

11. A non-transitory computer-readable recoding medium having a program executed by a computer provided in an information device management apparatus in a management system including an energy management apparatus, the energy management apparatus acquiring presence-absence information indicating a presence or absence of a person based on information from image sensors capturing each of zones related to a building, the energy management apparatus generating data based on the presence-absence information and a zone identifier of each of the zones, the program for causing the computer to execute the steps of:
  receiving the data from the energy management apparatus; and
  determining an information device of at least one information device, identified by an information device identifier having a relationship with the zone identifier included in the data in an information device table, the information device table including a plurality of entries, each entry being uniquely identified by a combination of a device identifier, a zone identifier and a tenant identifier associated together;
  acquiring a usage state of the determined information device when detecting no person in a zone identified by the zone identifier included in the data; and
  stopping the determined information device when no operation is performed on the determined information device for a predetermined period.

12. An energy management apparatus in a management system including an information device management apparatus, the information device management apparatus having a first storage storing an information device table indicating a relationship between an information device identifier for identifying at least one information device and a section identifier for each of sections used by tenants related to a building, the information device table including a plurality of entries, each entry being uniquely identified by a combination of a device identifier, a zone identifier and a tenant identifier associated together, the information device management apparatus controlling the at least one information device based on data received from the energy management apparatus and the information device table, the energy management apparatus comprising:

processing circuitry configured to:
acquire, regarding the sections used by the tenants, presence-absence information indicating a presence or absence of a person based on information from image sensors capturing each of the sections;
generate the data based on the presence-absence information and the section identifier;
transmit the data to the information device management apparatus; and
control a facility device provided in the building on a basis of an operation state of the at least one information device that the information device management apparatus controls based on the data, the information device table and a usage state of the at least one information device.

13. An information device management apparatus in a management system including an energy management apparatus, the energy management apparatus acquiring presence-absence information indicating a presence or absence of a person based on information from image sensors capturing each of sections used by tenants related to a building, the energy management apparatus generating data based on the presence-absence information and a section identifier of each of the sections, the information management apparatus comprising:

processing circuitry configured to receive the data from the energy management apparatus; and
a storage coupled to the processing circuitry and configured to store an information device table indicating a relationship between an information device identifier for identifying at least one information device and a section identifier for identifying a section to which the at least one information device belongs, the information device table including a plurality entries, each entry being uniquely identified by a combination of a device identifier, a zone identifier and a tenant identifier associated together, wherein
the processing circuitry is further configured to:
determine an information device of the at least one information device, identified by an information device identifier having a relationship with a zone identifier included in the data in the information device table,
acquire a usage state of the determined information device when detecting no person in a zone identified by the zone identifier included in the data, and
stop the determined information device when no operation is performed on the determined information device for a predetermined period.

14. An information device management apparatus in a management system including an energy management apparatus, the energy management apparatus acquiring presence-absence information indicating a presence or absence of a person based on information from image sensors capturing each of zones related a building, the energy management apparatus generating data based on the presence-absence information and a zone identifier of each of the zones, the information management apparatus comprising:

processing circuitry configured to receive the data from the energy management apparatus;
a storage coupled to the processing circuitry and configured to store an information device table indicating a relationship between an information device identifier for identifying at least one information device and a zone identifier for identifying a zone to which the at least one information device belongs, the information device table including a plurality of entries, each entry being uniquely identified by a combination of a device identifier, a zone identifier and a tenant identifier associated together, wherein
the processing circuitry is further configured to:
determine an information device of the at least one information device, identified by an information device identifier having a relationship with the zone identifier included in the data in the information device table, and
stop a shared device belonging to a zone identified the zone identifier included in the data when the determined information device is stopped.

15. An information device management apparatus in a management system including an energy management apparatus, the energy management apparatus generating data, which includes entry-exit information indicating at least one of entry of a person into a building and exit of a person from the building, the information device management apparatus comprising:

processing circuitry configured to receive the data from the energy management apparatus;
a storage coupled to the processing circuitry and configured to store a device used table indicating a relationship between an information device identifier for identifying at least one information device and a personal identifier identifying a person entering into and exiting from the building, the device used table including a plurality of entries, each entry being uniquely identified by a combination of a device identifier, a zone identifier and a tenant identifier associated together, wherein
the processing circuitry is further configured to:
determine an information device of the at least one information device, identified by an information device identifier having a relationship with a personal identifier identifying a person being out of the building,
when a current time is during working hours, cause the determined information device to operate in a sleep-mode or hibernation-mode, which consumes less power than when the determined information device is being used, and
when the current time is not during the working hours, cause the determined information device to stop.

* * * * *